(12) United States Patent
Martinez et al.

(10) Patent No.: US 11,174,275 B2
(45) Date of Patent: Nov. 16, 2021

(54) METHODS FOR THE PREPARATION OF CYCLOPENTAOXASILINONES AND CYCLOPENTAOXABORININONES AND THEIR USE

(71) Applicant: DREXEL UNIVERSITY, Philadelphia, PA (US)

(72) Inventors: Dionicio Solorio Martinez, Philadelphia, PA (US); Austin Gregory Gallagher, Philadelphia, PA (US); Huan Tian, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 16/997,603

(22) Filed: Aug. 19, 2020

(65) Prior Publication Data
US 2021/0054003 A1    Feb. 25, 2021

Related U.S. Application Data

(60) Provisional application No. 62/889,363, filed on Aug. 20, 2019.

(51) Int. Cl.
*C07F 7/20* (2006.01)
*C07F 7/18* (2006.01)

(52) U.S. Cl.
CPC ............. *C07F 7/20* (2013.01); *C07F 7/1876* (2013.01)

(58) Field of Classification Search
None
See application file for complete search history.

(56) References Cited

U.S. PATENT DOCUMENTS

| | | | |
|---|---|---|---|
| 2015/0152216 A1* | 6/2015 | Hoye | C08G 61/02 526/171 |
| 2017/0210766 A1* | 7/2017 | Hoye | C07C 67/343 |

OTHER PUBLICATIONS

A. Gallagher et al., ChemRxiv (2019) 1-6, 2019, URL: https://chemrxiv.org (Year: 2019).*
A. Gallagher et al., 21 Organic Letters, 8646-8651 (2019) (Year: 2019).*
S. Ishaq et al., 36 Synthetic Communications, 547-557 (2006) (Year: 2006).*
G. Micalizio et al., 41 Angew. Chem. Int. Ed., 3272-3276 (2002) (Year: 2002).*
G. Micalizio et al., 41 Angew. Chem. Int. Ed., 152-154 (2002) (Year: 2002).*
S. Ishaq et al., New Substrates for Pauson-Khand Reaction, Doctoral Thesis (2005) (Year: 2005).*
T. Sugihara et al., Synlett, 771-773 (1999) (Year: 1999).*
D. Lange, Pauson-Khand Cycloaddition via Boron and Silicon Tethered 1,7-Enynes, Master Thesis (2017) (Year: 2017).*
S. Chen et al., 10 Catalyst, 1-25 (2020) (Year: 2020).*
X. Verdaguer et al., 122 Journal of the American Chemical Society, 10242-10243 (2000) (Year: 2000).*
J. Escorihuela et al., Beilstein Journal of Organic Chemistry, 1662-1682 (2020) (Year: 2020).*
S. Laschat et al., Synlett, 2547-2570 (2005) (Year: 2005).*
Brummond, et al., "A silicon-tethered allenic Pauson-Khand reaction", Tetrahedron Lett., 43, 2002, 3735-3738.
Cai, et al., "Lithium binaphtholate-catalyzed enantioselective enyne addition to ketones: access to enynylated tertiary alcohols", J. Org. Chem., 79, 2014, 5484-5493.
Del Valle, et al., "Lewis Base Promoters in the Pauson-Khand Reaction: A Different Scenario", Angew. Chem. Int. Ed., 44, 2005, 5717-5719.
Dobbs, et al., "The use of silicon-based tethers for the Pauson-Khand reaction", Beilstein J. Org. Chem., 3, No. 21, 2007.
Itami, et al., "A Pyridylsilyl Group Expands the Scope of Catalytic Intermolecular Pauson-Khand Reactions", Angew. Chem. Int. Ed., 41, 2002, 3481-3484.
Itami, et al., "Catalytic Intermolecular Pauson-Khand-Type Reaction: Strong Directing Effect of Pyridylsilyl and Pyrimidylsilyl Groups and Isolation of Ru Complexes Relevant to Catalytic Reaction", J. Am. Chem., 126, 2004, 11058-11066.
Kagoshima, et al., "A New Cycloisomerization Reaction: Formation of Eight-Membered-Ring Compounds from 3-Sila 1,7-Enynes", Organometallics, 15, 1996, 5439-5441.
Kavanagh, et al., "Iridium-Mediated Isomerization—Cyclization of Bicyclic Pauson-Khand Derived Allylic Alcohols", J. Org. Chem., 2008, 73, 8601-8604.
Krafft, et al., "Effect of coordinating ligands on the Pauson-Khand cycloaddition: trapping of an intermediate", J. Am. Chem. Soc., 115, 1993, 7199-7207.
Melson, Jr., et al., "Divergent Synthesis and Real-Time Biological Annotation of Optically Active Tetrahydrocyclo-penta[c]pyranone Derivatives", Org. Lett., 18, 2016, 6280-6283.
Parasram, et al., "Endo-Selective Pd-Catalyzed Silyl Methyl Heck Reaction", J. Am. Chem. Soc., 136, 2014, 17926-17929.
Reichwein, et al., "Cyclocarbonylation of silicon tethered enynes derived from propargylic alcohols and vinylsilanes: a new reductive Pauson-Khand reaction with a traceless tether", Tetrahedron Lett., 43, 2002, 3739-3741.
Reichwein, et al., "On the mechanism of the silicon-tethered reductive Pauson-Khand reaction", Tetrahedron, 58, 2002, 3813-3822.
Rodríguez Rivero, et al., "Asymmetric intermolecular Pauson-Khand reactions of unstrained olefins: the (o-dimethylamino)phenylsulfinyl group as an efficient chiral auxiliary", J. Am. Chem. Soc., 125, 2003, 14992-14993.
Rodríguez Rivero, et al., "Vinyl Sulfoxides as Stereochemical Controllers in Intermolecular Pauson-Khand Reactions: Applications to the Enantioselective Synthesis of Natural Cyclopentanoids", Chem. Eur. J., 2004, 10, 2004, 5443-5459.

(Continued)

*Primary Examiner* — Alexander R Pagano
(74) *Attorney, Agent, or Firm* — Saul Ewing Arnstein & Lehr LLP; Kathryn Doyle; Justin Crotty

(57) ABSTRACT

In various aspects and embodiments the invention provides a method of preparing a cyclopentaoxasilinone, the method comprising contacting a siloxy-tethered 1,7-enyne with a thioether promoter. In another aspect, the invention provides a method of preparing a cyclopentaoxaborininone, the method comprising contacting a boronic ester-tethered 1,7-enyne with a thioether promoter.

15 Claims, 19 Drawing Sheets

(56) References Cited

OTHER PUBLICATIONS

Sezer, et al., "Conformational control on remote stereochemistry in the intramolecular Pauson-Khand reactions of enynes tethered to homoallyl and homopropargyl alcohols", Tetrahedron Asymmetry, 17, 2006, 2981-2986.

Stumpf, et al., "Asymmetric Addition of Bis(homoally)zinc to the Propargyl Aldehyde Dicobalt Hexacarbonyl Complexes in the Presence of Chiral Disulfonamide Followed by Pauson-Khand Reaction", Bull. Korean Chem. Soc., 25, 2004, 1621-1622.

Sugihara, et al., "Rate Enhancement of the Pauson-Khand Reaction by Primary Amines", Angew. Chem., Int. Ed. Engl., 36, 1997, 2801-2804.

Turlington, et al., "Lithium binaphtholate-catalyzed enantioselective enyne addition to ketones: access to enynylated tertiary alcohols", J. Org. Chem., 75, 2010, 6941-6952.

Yamanaka, et al., "Density Functional Studies on the Pauson-Khand Reaction", J. Am. Chem. Soc., 123, 2001, 1703-1708.

Torres Herrera, et al., "Silicon and Boron Tethered Diastereoselective Pauson-Khand Reactions," 259th ACS National Meeting, Mar. 22-26, 2020, Poster (1 page).

* cited by examiner

Experiments were carried out on [a] 0.334 mmol scale (0.1M solution). [b] Isolated yields averaged over ≥ 3 runs. [c] 83% average recovery of 4-FBnSMe.

Experiments were carried out on [a] 0.334 mmol scale (0.1M solution). [b] Isolated yields averaged over ≥ 3 runs. [c] 83% average recovery of 4-FBnSMe.

METHODS FOR THE PREPARATION OF CYCLOPENTAOXASILINONES AND CYCLOPENTAOXABORININONES AND THEIR USE

CROSS-REFERENCE TO RELATED APPLICATIONS

This application claims the benefit of priority under 35 U.S.C. § 119(e) to U.S. Provisional Patent Application No. 62/889,363 filed Aug. 20, 2019 and which is incorporated herein by reference in its entirety.

BACKGROUND OF THE INVENTION

Stereoselective strategies for the synthesis of stereoenriched and highly functionalized cyclopentenones are highly sought after because they enable assembly of structural components present in a broad range biologically active natural products.

There is a need in the art for a stereoselective method of making cyclopentaoxasilinones and cyclopentaoxaborininones which can then be oxidized to form stereospecific cyclopentenones. The present invention satisfies this unmet need.

BRIEF DESCRIPTION OF THE DRAWINGS

The following detailed description of exemplary embodiments of the invention will be better understood when read in conjunction with the appended drawings. For the purpose of illustrating the invention, non-limiting embodiments are shown in the drawings. It should be understood, however, that the invention is not limited to the precise arrangements and instrumentalities of the embodiments shown in the drawings.

DETAILED DESCRIPTION

Figure 1:
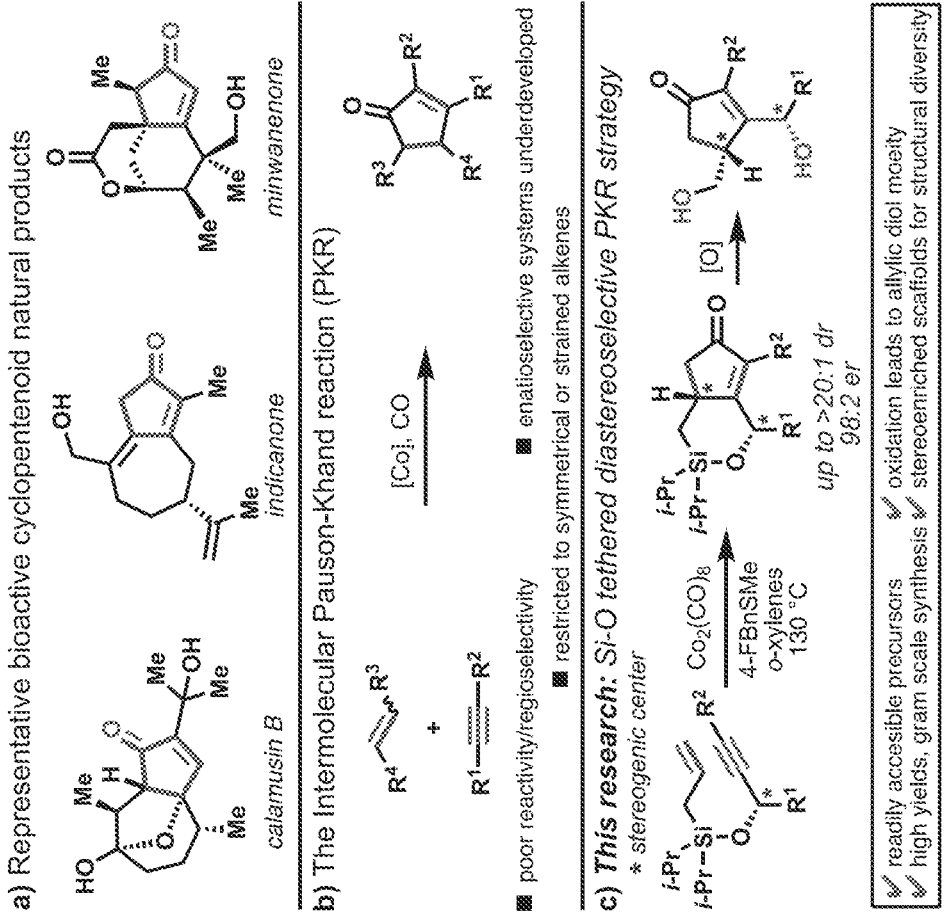
FIG. 1 depicts (a) biologically active cyclopentanoid natural products, (b) challenges associated with the intermolecular Pauson-Khand reaction (PKR), and (c) this research: a siloxy-tethered diastereoselective PKR strategy.

The present invention provides in one aspect a method of preparing a cyclopentaoxasilinone, the method comprising contacting a siloxy-tethered 1,7-enyne with a thioether promoter. In another aspect, the invention relates to a method of preparing a cyclopentaoxaborininone, the method comprising contacting a boronic ester-tethered 1,7-enyne with a thioether promoter. In some embodiments, the siloxy-tethered 1,7-enyne or boronic ester-tethered 1,7-enyne has specific stereochemistry. In some embodiments, the one diastereomer of the resulting cyclopentaoxasilinone or cyclopentaoxaborininone is formed selectively and preferentially over the other diastereomer.

The skilled artisan will understand that the invention is not limited to the cyclopentaoxasilinones and cyclopentaoxaborininones discussed herein. Further, the skilled artisan will understand that the cyclopentaoxasilinones and cyclopentaoxaborininones discussed herein can undergo additional chemical transformations including, but not limited to, oxidations, epoxidations, and reductions. Still further, the skilled artisan will understand that, when these transformations are performed on a cyclopentaoxasilinone and cyclopentaoxaborininone which is exclusively or preferentially one diastereomer, the transformation will form a stereospecific product.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, selected methods and materials are described.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B."

"About" as used herein when referring to a measurable value such as an amount, a temporal duration, and the like, is meant to encompass variations of 20% or 10%, in certain embodiments ±5%, in certain embodiments 1%, in certain embodiments 0.1% from the specified value, as such variations are appropriate to perform the disclosed methods.

As used herein, the term "alkenyl," employed alone or in combination with other terms, means, unless otherwise stated, a stable monounsaturated or diunsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkoxy" employed alone or in combination with other terms means, unless otherwise stated, an alkyl group having the designated number of carbon atoms, as defined elsewhere herein, connected to the rest of the molecule via an oxygen atom, such as, for example, methoxy, ethoxy, 1-propoxy, 2-propoxy (or isopropoxy) and the higher homologs and isomers. A specific example is ($C_1$-$C_3$)alkoxy, such as, but not limited to, ethoxy and methoxy.

As used herein, the term "alkyl" by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. A specific embodiment is ($C_1$-$C_6$)alkyl, such as, but not limited to, ethyl, methyl, isopropyl, isobutyl, n-pentyl, n-hexyl, and cyclopropylmethyl.

As used herein, the term "alkynyl" employed alone or in combination with other terms means, unless otherwise stated, a stable straight chain or branched chain hydrocarbon group with a triple carbon-carbon bond, having the stated number of carbon atoms. Non-limiting examples include ethynyl and propynyl, and the higher homologs and isomers. The term "propargylic" refers to a group exemplified by —$CH_2$—C≡CH. The term "homopropargylic" refers to a group exemplified by —$CH_2CH_2$—C≡CH.

As used herein, the term "aromatic" refers to a carbocycle or heterocycle with one or more polyunsaturated rings and having aromatic character, i.e., having (4n+2) delocalized π (pi) electrons, where 'n' is an integer.

As used herein, the term "aryl" employed alone or in combination with other terms means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl and naphthyl. Aryl groups also include, for example, phenyl or naphthyl rings fused with one or more saturated or partially saturated carbon rings (e.g., bicyclo[4.2.0]octa-1,3,5-trienyl, or indanyl), which can be substituted at one or more carbon atoms of the aromatic and/or saturated or partially saturated rings.

As used herein, the term "aryl-($C_1$-$C_6$)alkyl" refers to a functional group wherein a one-to-six carbon alkylene chain is attached to an aryl group, e.g., —$CH_2CH_2$-phenyl or —$CH_2$-phenyl (or benzyl). Specific examples are aryl-$CH_2$— and aryl-CH($CH_3$)—. The term "substituted aryl-($C_1$-$C_6$)alkyl" refers to an aryl-($C_1$-$C_6$)alkyl functional group in which the aryl group is substituted. A specific example is substituted aryl($CH_2$)—. Similarly, the term "heteroaryl-($C_1$-$C_6$)alkyl" refers to a functional group wherein a one-to-three carbon alkylene chain is attached to a heteroaryl group, e.g., —$CH_2CH_2$-pyridyl. A specific example is heteroaryl-($CH_2$)—. The term "substituted heteroaryl-($C_1$-$C_6$)alkyl" refers to a heteroaryl-($C_1$-$C_6$)alkyl functional group in which the heteroaryl group is substituted. A specific example is substituted heteroaryl-($CH_2$)—.

As used herein, the term "cycloalkyl" by itself or as part of another substituent refers to, unless otherwise stated, a cyclic chain hydrocarbon having the number of carbon atoms designated (i.e., $C_3$-$C_6$ refers to a cyclic group comprising a ring group consisting of three to six carbon atoms) and includes straight, branched chain or cyclic substituent groups. Examples of ($C_3$-$C_6$)cycloalkyl groups are cyclopropyl, cyclobutyl, cyclopentyl and cyclohexyl. Cycloalkyl rings can be optionally substituted. Non-limiting examples of cycloalkyl groups include: cyclopropyl, 2-methyl-cyclopropyl, cyclopropenyl, cyclobutyl, 2,3-dihydroxycyclobutyl, cyclobutenyl, cyclopentyl, cyclopentenyl, cyclopentadienyl, cyclohexyl, cyclohexenyl, cycloheptyl, cyclooctanyl, decalinyl, 2,5-dimethylcyclopentyl, 3,5-dichlorocyclohexyl, 4-hydroxycyclohexyl, 3,3,5-trimethylcyclohex-1-yl, octahydropentalenyl, octahydro-1H-indenyl, 3a,4,5,6,7,7a-hexahydro-3H-inden-4-yl, decahydroazulenyl; bicyclo[6.2.0]decanyl, decahydronaphthalenyl, and dodecahydro-1H-fluorenyl. The term "cycloalkyl" also includes bicyclic hydrocarbon rings, non-limiting examples of which include, bicyclo[2.1.1]hexanyl, bicyclo[2.2.1]heptanyl, bicyclo[3.1.1]heptanyl, 1,3-dimethyl[2.2.1]heptan-2-yl, bicyclo[2.2.2]octanyl, and bicyclo[3.3.3]undecanyl.

As used herein, the term "halide" refers to a halogen atom bearing a negative charge. The halide anions are fluoride ($F^-$), chloride ($Cl^-$), bromide ($Br^-$), and iodide ($I^-$).

As used herein, the term "halo" or "halogen" alone or as part of another substituent refers to, unless otherwise stated, a fluorine, chlorine, bromine, or iodine atom.

As used herein, the term "heteroalkenyl" by itself or in combination with another term refers to, unless otherwise stated, a stable straight or branched chain monounsaturated or diunsaturated hydrocarbon group consisting of the stated number of carbon atoms and one or two heteroatoms selected from the group consisting of O, N, and S, and wherein the nitrogen and sulfur atoms may optionally be oxidized and the nitrogen heteroatom may optionally be quaternized. Up to two heteroatoms may be placed consecutively. Examples include —CH═CH—O—$CH_3$, —CH═CH—$CH_2$—OH, —$CH_2$—CH═N—$OCH_3$, —CH═CH—N($CH_3$)—$CH_3$, and —$CH_2$—CH═CH—$CH_2$—SH.

As used herein, the term "heteroalkyl" by itself or in combination with another term refers to, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —$OCH_2CH_2CH_3$, —$CH_2CH_2CH_2OH$, —$CH_2CH_2NHCH_3$, —$CH_2SCH_2CH_3$, and —$CH_2CH_2S$(═O)$CH_3$. Up to two heteroatoms may be consecutive, such as, for example, —$CH_2NH$—$OCH_3$, or —$CH_2CH_2SSCH_3$.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

As used herein, the term "heterocycle" or "heterocyclyl" or "heterocyclic" by itself or as part of another substituent refers to, unless otherwise stated, an unsubstituted or substituted, stable, mono- or multi-cyclic heterocyclic ring system that comprises carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In certain embodiments, the heterocycle is a heteroaryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin, and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl, and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

"Instructional material," as that term is used herein, includes a publication, a recording, a diagram, or any other medium of expression that can be used to communicate the usefulness of the nucleic acid, peptide, and/or compound of the disclosure in the kit for identifying or alleviating or treating the various diseases or disorders recited herein.

"Isolated" means altered or removed from the natural state. For example, a nucleic acid or a polypeptide naturally present in a living animal is not "isolated," but the same nucleic acid or polypeptide partially or completely separated from the coexisting materials of its natural state is "isolated." An isolated nucleic acid or protein can exist in substantially purified form, or can exist in a non-native environment such as, for example, a host cell.

As used herein, the term "substituted" refers to that an atom or group of atoms has replaced hydrogen as the substituent attached to another group.

As used herein, the term "substituted alkyl," "substituted cycloalkyl," "substituted alkenyl," or "substituted alkynyl" refers to alkyl, cycloalkyl, alkenyl, or alkynyl, as defined elsewhere herein, substituted by one, two or three substituents independently selected from the group consisting of halogen, —OH, alkoxy, tetrahydro-2-H-pyranyl, —NH$_2$, —NH(C$_1$-C$_6$ alkyl), —N(C$_1$-C$_6$ alkyl)$_2$, 1-methyl-imidazol-2-yl, pyridin-2-yl, pyridin-3-yl, pyridin-4-yl, —C(=O)OH, —C(=O)O(C$_1$-C$_6$)alkyl, trifluoromethyl, —C≡N, —C(=O)NH$_2$, —C(=O)NH(C$_1$-C$_6$)alkyl, —C(=O)N((C$_1$-C$_6$)alkyl)$_2$, —SO$_2$NH$_2$, —SO$_2$NH(C$_1$-C$_6$ alkyl), —SO$_2$N(C$_1$-C$_6$ alkyl)$_2$, —C(=NH)NH$_2$, and —NO$_2$, in certain embodiments containing one or two substituents independently selected from halogen, —OH, alkoxy, —NH$_2$, trifluoromethyl, —N(CH$_3$)$_2$, and —C(=O)OH, in certain embodiments independently selected from halogen, alkoxy and —OH. Examples of substituted alkyls include, but are not limited to, 2,2-difluoropropyl, 2-carboxycyclopentyl and 3-chloropropyl.

For aryl, aryl-(C$_1$-C$_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In certain embodiments, the substituents vary in number between one and four. In other embodiments, the substituents vary in number between one and three. In yet another embodiments, the substituents vary in number between one and two. In yet other embodiments, the substituents are independently selected from the group consisting of C$_1$-C$_6$ alkyl, —OH, C$_1$-C$_6$ alkoxy, halo, cyano, amino, acetamido and nitro. As used herein, where a substituent is an alkyl or alkoxy group, the carbon chain may be branched, straight or cyclic.

Unless otherwise noted, when two substituents are taken together to form a ring having a specified number of ring atoms (e.g., R$^2$ and R$^3$ taken together with the nitrogen to which they are attached to form a ring having from 3 to 7 ring members), the ring can have carbon atoms and optionally one or more (e.g., 1 to 3) additional heteroatoms independently selected from nitrogen, oxygen, or sulfur. The ring can be saturated or partially saturated, and can be optionally substituted.

Whenever a term or either of their prefix roots appear in a name of a substituent the name is to be interpreted as including those limitations provided herein. For example, whenever the term "alkyl" or "aryl" or either of their prefix roots appear in a name of a substituent (e.g., arylalkyl, alkylamino) the name is to be interpreted as including those limitations given elsewhere herein for "alkyl" and "aryl" respectively.

In certain embodiments, substituents of compounds are disclosed in groups or in ranges. It is specifically intended that the description include each and every individual subcombination of the members of such groups and ranges. For example, the term "C$_{1-6}$ alkyl" is specifically intended to individually disclose C$_1$, C$_2$, C$_3$, C$_4$, C$_5$, C$_6$, C$_1$-C$_6$, C$_1$-C$_5$, C$_1$-C$_4$, C$_1$-C$_3$, C$_1$-C$_2$, C$_2$-C$_6$, C$_2$-C$_5$, C$_2$-C$_4$, C$_2$-C$_3$, C$_3$-C$_6$, C$_3$-C$_5$, C$_3$-C$_4$, C$_4$-C$_6$, C$_4$-C$_5$, and C$_5$-C$_6$ alkyl.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Methods

In one aspect, the invention provides a method of preparing a cyclopentaoxasilinone, the method comprising contacting a siloxy-tethered 1,7-enyne with a thioether promoter. In another aspect, the invention relates to a method of preparing a cyclopentaoxaborininone, the method comprising contacting a boronic ester-tethered 1,7-enyne with a thioether promoter.

The thioether promoter can be any thioether compound known to a person of skill in the art. In one embodiment, the thioether promoter is 4-fluorobenzyl methyl sulfide (4-FBnSMe). In another embodiment, the thioether promoter is furfuryl methyl sulfide. In various embodiments, the thioether promoter is isolated and reused. The thioether promoter may be used for any other purpose and all are within the spirit of the invention, however in various embodiments the thioether promoter is used in a second reaction preparing a cyclopentaoxasilinone from a siloxy-tethered 1,7-enyne starting material or preparing a cyclopentaoxaborininone from a boronic ester-tethered 1,7-enyne starting material.

In some embodiments, the step of contacting a siloxy-tethered 1,7-enyne with a thioether promoter is preceded by the step of contacting the siloxy-tethered 1,7-enyne with a transition metal source and a source of carbon monoxide. In one embodiment, the transition metal source provides a Co, Rh, Mo, Ru, W, Fe, Ni, Zr, Ir, or Pd metal. In one embodiment, the transition metal source and the source of carbon monoxide is transition metal carbonyl. In one embodiment, the siloxy-tethered 1,7-enyne is contacted with dicobalt octacarbonyl. In some embodiments, the step of contacting a boronic ester-tethered 1,7-enyne with a thioether promoter is preceded by the step of contacting the boronic ester-tethered 1,7-enyne with a transition metal source and a source of carbon monoxide. In one embodiment, the transition metal source provides a Co, Rh, Mo, Ru, W, Fe, Ni, Zr, Ir, or Pd metal. In one embodiment, the transition metal source and the source of carbon monoxide is transition metal carbonyl. In one embodiment, the boronic ester-tethered 1,7-enyne is contacted with dicobalt octacarbonyl.

In some embodiments, the invention provides a catalytic method of preparing a cyclopentaoxasilinone, the method comprising the step of contacting a siloxy-tethered 1,7-enyne with a thioether promoter in the presence of carbon monoxide gas. In some embodiments, the siloxy-tethered 1,7-enyne is contacted with a 4-FBnSMe promoter presence of carbon monoxide gas. In some embodiments, the step of contacting a siloxy-tethered 1,7-enyne with a thioether promoter in the presence of carbon monoxide gas is preceded by the step of contacting the siloxy-tethered 1,7-enyne with a transition metal carbonyl. In some embodiments, the transition metal carbonyl is dicobalt octacarbonyl.

The compounds used in the methods of the invention may possess one or more stereocenters, and each stereocenter may exist independently in either the (R) or (S) configuration. In certain other embodiments, compounds described herein are present in optically active or racemic forms. The compounds described herein encompass racemic, optically-active, regioisomeric and stereoisomeric forms, or combinations thereof that possess the therapeutically useful properties described herein. Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase. In certain other embodiments, a mixture of one or more isomer is utilized as described herein. In other embodiments, compounds described herein contain one or more chiral centers. These compounds are prepared by any means, including stereoselective synthesis, enantioselective synthesis and/or separation of a mixture of enantiomers and/or diastereomers. Resolution of compounds and isomers thereof is achieved by any means including, by way of non-limiting example, chemical processes, enzymatic processes, fractional crystallization, distillation, and chromatography.

1,7-Enynes

In one embodiment, the step of contacting a siloxy-tethered 1,7-enyne or a boronic ester-tethered 1,7-enyne with a thioether promoter to form a cyclopentaoxasilinone or cyclopentaoxaborininone comprises the step of contacting a siloxy-tethered 1,7-enyne or boronic ester-tethered 1,7-enyne of Formula (Ia) with a thioether promoter Formula (Ia)

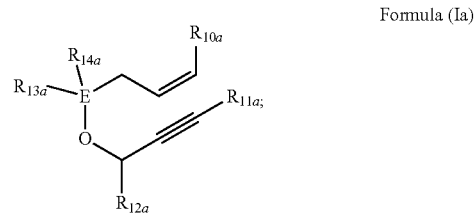

wherein

E is Si or B$^-$;

$R_{10a}$ and $R_{11a}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, C(=O)OR$_{15a}$, and combinations thereof;

$R_{12a}$ is selected from the group consisting of hydrogen, deuterium, $C_1$-$C_6$ alkyl, $C_1$-$C_6$ alkenyl, $C_6$-$C_{12}$ aryl, and combinations thereof;

$R_{13a}$ and $R_{14a}$ are each independently selected from the group consisting of hydrogen, deuterium, $C_1$-$C_6$ alkyl, $C_1$-$C_6$ alkenyl, $C_1$-$C_6$ alkoxy, hydroxy, and combinations thereof, wherein $R_{13a}$ and $R_{14a}$ may optionally fuse or join to form a ring; and $R_{15a}$ is selected from the group consisting of hydrogen, deuterium, and $C_1$-$C_6$ alkyl.

In one embodiment, E is Si. In another embodiment, E is B$^-$. In some embodiments wherein E is B$^-$, the compound of Formula (Ia) is associated with an alkali metal counterion. In one embodiment, the alkali metal counterion is selected from the group consisting of a sodium cation, a lithium cation, and a potassium cation. In one embodiment, the alkali metal counterion is a lithium cation.

In one embodiment, $R_{10a}$ is hydrogen.

In one embodiment, $R_{11a}$ is hydrogen. In another embodiment, $R_{11a}$ is methyl. In another embodiment, $R_{11a}$ is isopropyl. In another embodiment, $R_{11a}$ is ethenyl. In another embodiment, $R_{11a}$ is methoxy. In another embodiment, $R_{11a}$ is ethoxy. In another embodiment, $R_{11a}$ is halogen. In another embodiment, $R_{11a}$ is trimethylsilyl. In another embodiment, $R_{11a}$ is phenyl. In another embodiment, $R_{11a}$ is —CH$_2$—O-MOM (wherein MOM is methoxymethyl acetyl). In another embodiment, $R_{11a}$ is thienyl. In another embodiment, $R_{11a}$ is pyridinyl. In another embodiment, $R_{11a}$ is pyrimidinyl. In another embodiment, $R_{11a}$ is

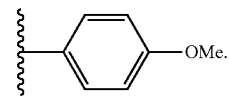

In another embodiment, $R_{11a}$ is

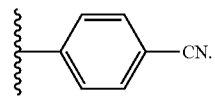

In another embodiment, $R_{11a}$ is

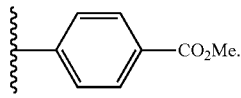

In another embodiment, $R_{11a}$ is

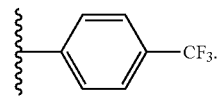

In another embodiment, $R_{11a}$ is

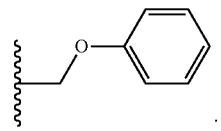 [SMILES: *COc1ccccc1]

In another embodiment, $R_{11a}$ is

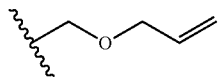

In one embodiment, $R_{12a}$ is hydrogen. In another embodiment, $R_{12a}$ is propyl. In another embodiment, $R_{12a}$ is butyl. In another embodiment, $R_{12a}$ is isobutyl. In another embodiment, $R_{12a}$ is pentyl. In another embodiment, $R_{12a}$ is propenyl. In another embodiment, $R_{12a}$ is butylenyl. In some embodiments, $R_{12a}$ is alpha butylenyl. In some embodiments, $R_{12a}$ is isobutylenyl. In another embodiment, $R_{12a}$ is pentenyl. In some embodiments, $R_{12a}$ is 1-pentenyl. In another embodiment, $R_{12a}$ is phenyl. In another embodiment, $R_{12a}$ is —CH$_2$-phenyl. In another embodiment, $R_{12a}$ is —(CH$_2$)$_2$-phenyl. In another embodiment, $R_{12a}$ is

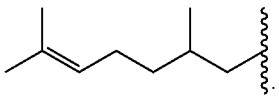 [SMILES: *CC(C)CCC=C(C)C]

In one embodiment, $R_{13a}$ and $R_{14a}$ are each $C_1$-$C_6$ alkyl. In one embodiment, $R_{3a}$ and $R_{14a}$ are each isopropyl. In another embodiment, E is B$^-$ and $R_{13a}$ and $R_{14a}$ together with E, form

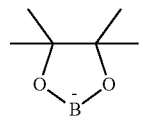

In one embodiment, $R_{15a}$ is $C_1$-$C_6$ alkyl. In one embodiment, $R_{15a}$ is methyl.

In one embodiment, the boronic ester-tethered 1,7-enyne is a compound of Formula (Ib):

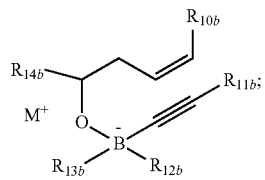

Formula (Ib)

wherein

M$^+$ is an alkali metal cation;

$R_{10b}$ and $R_{11b}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, C(=O)OR$_{15b}$, and combinations thereof, $R_{12b}$ and $R_{13b}$ are each independently selected from the group consisting of $C_1$-$C_6$ alkoxy, hydroxy, and combinations thereof, wherein $R_{12b}$ and $R_{13b}$ may optionally fuse or join to form a ring;

$R_{14b}$ is selected from the group consisting of hydrogen, deuterium, $C_1$-$C_6$ alkyl, $C_1$-$C_6$ alkenyl, $C_6$-$C_{12}$ aryl, and combinations thereof; and $R_{15b}$ is selected from the group consisting of hydrogen, deuterium, and $C_1$-$C_6$ alkyl.

In one embodiment, M is selected from the group consisting of sodium, lithium, and potassium. In one embodiment M is lithium.

In one embodiment, $R_{10b}$ is hydrogen.

In one embodiment, $R_{11b}$ is hydrogen. In another embodiment, $R_{11b}$ is methyl. In another embodiment, $R_{11b}$ is isopropyl. In another embodiment, $R_{11b}$ is ethenyl. In another embodiment, $R_{11b}$ is methoxy. In another embodiment, $R_{11b}$ is ethoxy. In another embodiment, $R_{11b}$ is halogen. In another embodiment, $R_{11b}$ is trimethylsilyl. In another embodiment, $R_{11b}$ is phenyl. In another embodiment, $R_{11b}$ is —CH$_2$—O-MOM (wherein MOM is methoxymethyl acetyl). In another embodiment, $R_{11b}$ is thienyl. In another embodiment, $R_{11b}$ is pyridinyl. In another embodiment, $R_{11b}$ is pyrimidinyl. In another embodiment, $R_{11b}$ is

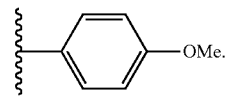

In another embodiment, $R_{11b}$ is

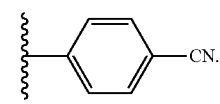 [SMILES: *c1ccc(C#N)cc1]

In another embodiment, $R_{11b}$ is

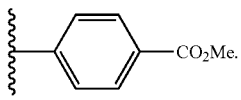

In another embodiment, $R_{11b}$ is

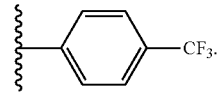 [SMILES: *c1ccc(C(F)(F)F)cc1]

In another embodiment, $R_{11b}$ is

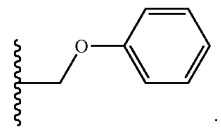 [SMILES: *COc1ccccc1]

In another embodiment, $R_{11b}$ is

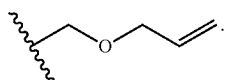 [SMILES: *COCC=C]

In one embodiment, $R_{12b}$ and $R_{15b}$ are each $C_1$-$C_6$ alkoxy. In another embodiment, B⁻ together with $R_{12b}$ and $R_{13b}$ form

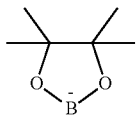

In one embodiment, $R_{14b}$ is hydrogen. In another embodiment, $R_{14b}$ is propyl. In another embodiment, $R_{14b}$ is butyl. In another embodiment, $R_{14b}$ is isobutyl. In another embodiment, $R_{14b}$ is pentyl. In another embodiment, $R_{14b}$ is propenyl. In another embodiment, $R_{14b}$ is butylenyl. In some embodiments, $R_{14b}$ is alpha butylenyl. In some embodiments, $R_{14b}$ is isobutylenyl. In another embodiment, $R_{14b}$ is pentenyl. In some embodiments, $R_{14b}$ is 1-pentenyl. In another embodiment, $R_{14b}$ is phenyl. In another embodiment, $R_{14b}$ is —CH$_2$-phenyl. In another embodiment, $R_{14b}$ is —(CH$_2$)$_2$-phenyl. In another embodiment, $R_{14b}$ is

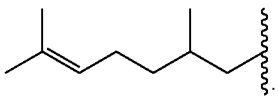

In one embodiment, $R_{15b}$ is $C_1$-$C_6$ alkyl. In one embodiment, $R_{15b}$ is methyl.

In some embodiments, the compound of Formula (Ia) or Formula (Ib) comprises a stereocenter. In one embodiment, $R_{12a}$ of Formula (Ia) has specific stereochemistry. In one embodiment, $R_{14b}$ of Formula (Ib) has specific stereochemistry.

Cyclopentaoxasilinone and Cyclopentaoxaborininone

In one embodiment, the step of contacting a siloxy-tethered 1,7-enyne or a boronic ester-tethered 1,7-enyne with a thioether promoter forms a cyclopentaoxasilinone or cyclopentaoxaborininone of Formula (II):

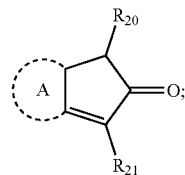

Formula (II)

wherein A is

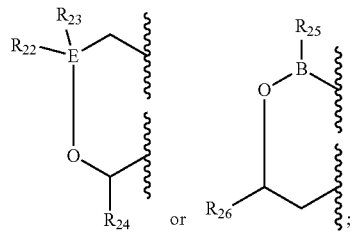

E is Si or B;

$R_{20}$ and $R_{21}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, nitrile, C(=O)OR$_{27}$, and combinations thereof;

$R_{22}$, $R_{23}$, and $R_{25}$ are each present or absent, valency permitting, and each $R_{22}$, $R_{23}$, and $R_{25}$ present is independently selected from the group consisting of hydrogen, deuterium, $C_1$-$C_6$ alkyl, $C_1$-$C_6$ alkenyl, $C_1$-$C_6$ alkoxy, hydroxy, and combinations thereof, $R_{24}$ and $R_{26}$ are each independently selected from the group consisting of hydrogen, deuterium, $C_1$-$C_6$ alkyl, $C_1$-$C_6$ alkenyl, $C_6$-$C_{12}$ aryl, and combinations thereof, and $R_{27}$ is selected from the group consisting of hydrogen, deuterium, and $C_1$-$C_6$ alkyl.

In one embodiment, $R_{20}$ is hydrogen.

In one embodiment, $R_{21}$ is hydrogen. In another embodiment, $R_{21}$ is methyl. In another embodiment, $R_{21}$ is isopropyl. In another embodiment, $R_{21}$ is ethenyl. In another embodiment, $R_{21}$ is methoxy. In another embodiment, $R_{21}$ is ethoxy. In another embodiment, $R_{21}$ is halogen. In another embodiment, $R_{21}$ is trimethylsilyl. In another embodiment, $R_{21}$ is phenyl. In another embodiment, $R_{21}$ is —CH$_2$—O-MOM (wherein MOM is methoxymethyl acetyl). In another embodiment, $R_{21}$ is thienyl. In another embodiment, $R_{21}$ is pyridinyl. In another embodiment, $R_{21}$ is pyrimidinyl. In another embodiment, $R_{21}$ is

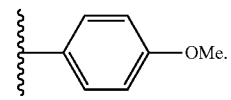

In another embodiment, $R_{21}$ is

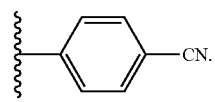

In another embodiment, $R_{21}$ is

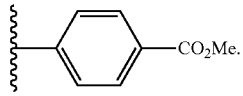

In another embodiment, $R_{21}$ is

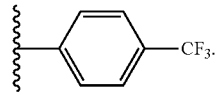

In another embodiment, $R_{21}$ is

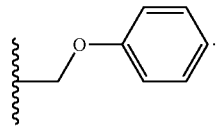

In another embodiment, $R_{21}$ is

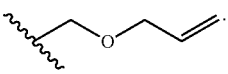 [SMILES: *COCC=C]

In one embodiment, $R_{22}$ and $R_{23}$ are each $C_1$-$C_6$ alkyl. In one embodiment, $R_{22}$ and $R_{23}$ are each isopropyl. In another embodiment, E is B, $R_{22}$ is hydroxy, and $R_{23}$ is absent.

In one embodiment, $R_{24}$ is hydrogen. In another embodiment, $R_{24}$ is propyl. In another embodiment, $R_{24}$ is butyl. In another embodiment, $R_{24}$ is isobutyl. In another embodiment, $R_{24}$ is pentyl. In another embodiment, $R_{24}$ is propenyl. In another embodiment, $R_{24}$ is butylenyl. In some embodiments, $R_{24}$ is alpha butylenyl. In some embodiments, $R_{24}$ is isobutylenyl. In another embodiment, $R_{24}$ is pentenyl. In some embodiments, $R_{24}$ is 1-pentenyl. In another embodiment, $R_{24}$ is phenyl. In another embodiment, $R_{24}$ is —CH$_2$-phenyl. In another embodiment, $R_{24}$ is —(CH$_2$)$_2$-phenyl. In another embodiment, $R_{24}$ is

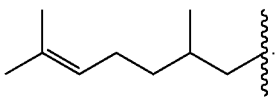 [SMILES: *CC(C)CCC=C(C)C]

In one embodiment, $R_{25}$ is $C_1$-$C_6$ alkoxy. In another embodiment, $R_{25}$ is hydroxy.

In one embodiment, $R_{26}$ is hydrogen. In another embodiment, $R_{26}$ is propyl. In another embodiment, $R_{26}$ is butyl. In another embodiment, $R_{26}$ is isobutyl. In another embodiment, $R_{26}$ is pentyl. In another embodiment, $R_{26}$ is propenyl. In another embodiment, $R_{26}$ is butylenyl. In some embodiments, $R_{26}$ is alpha butylenyl. In some embodiments, $R_{26}$ is isobutylenyl. In another embodiment, $R_{26}$ is pentenyl. In some embodiments, $R_{26}$ is 1-pentenyl. In another embodiment, $R_{26}$ is phenyl. In another embodiment, $R_{26}$ is —CH$_2$-phenyl. In another embodiment, $R_{26}$ is —(CH$_2$)$_2$-phenyl. In another embodiment, $R_{26}$ is

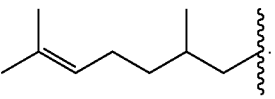 [SMILES: *CC(C)CCC=C(C)C]

In one embodiment, $R_{27}$ is $C_1$-$C_6$ alkyl. In one embodiment, $R_{27}$ is methyl.

In some embodiments, the compound of Formula (II) is a compound of Formula (IIa):

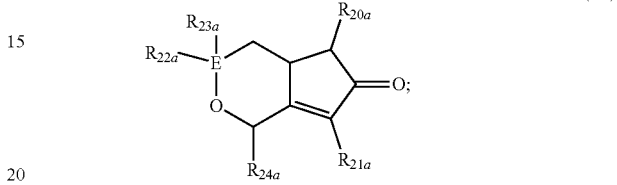

Formula (IIa)

wherein

E is Si or B;

$R_{20a}$ is hydrogen or deuterium;

$R_{21a}$ selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, C(=O)OR$_{25a}$, and combinations thereof, $R_{22a}$ and $R_{23a}$ are each present or absent, valency permitting, and each $R_{22a}$ and $R_{23a}$ present is independently selected from the group consisting of hydrogen, deuterium, $C_1$-$C_6$ alkyl, $C_1$-$C_6$ alkenyl, $C_1$-$C_6$ alkoxy, hydroxy, and combinations thereof, $R_{24a}$ is selected from the group consisting of hydrogen, deuterium, $C_1$-$C_6$ alkyl, $C_1$-$C_6$ alkenyl, $C_6$-$C_{12}$ aryl, and combinations thereof, and $R_{25a}$ is selected from the group consisting of hydrogen, deuterium, and $C_1$-$C_6$ alkyl.

In one embodiment, $R_{20a}$ is hydrogen.

In one embodiment, $R_{21a}$ is hydrogen. In another embodiment, $R_{21a}$ is methyl. In another embodiment, $R_{21a}$ is isopropyl. In another embodiment, $R_{21a}$ is ethenyl. In another embodiment, $R_{21a}$ is methoxy. In another embodiment, $R_{21a}$ is ethoxy. In another embodiment, $R_{21a}$ is halogen. In another embodiment, $R_{21a}$ is trimethylsilyl. In another embodiment, $R_{21a}$ is phenyl. In another embodiment, $R_{21a}$ is —CH$_2$—O-MOM (wherein MOM is methoxymethyl acetyl). In another embodiment, $R_{21a}$ is thienyl. In another embodiment, $R_{21a}$ is pyridinyl. In another embodiment, $R_{21a}$ is pyrimidinyl. In another embodiment $R_{21a}$ is

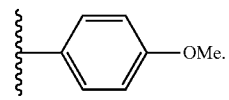

In another embodiment, $R_{21a}$ is

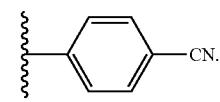

In another embodiment, $R_{21a}$ is

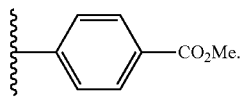

In another embodiment, $R_{21a}$ is

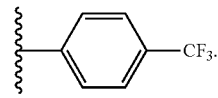

In another embodiment, $R_{21a}$ is

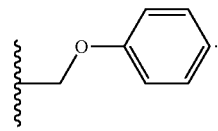

In another embodiment, $R_{21a}$ is

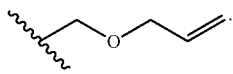 [SMILES: *COCC=C]

In one embodiment, $R_{22a}$ and $R_{23a}$ are each $C_1$-$C_6$ alkyl. In one embodiment, $R_{22a}$ and $R_{23a}$ are each isopropyl. In another embodiment, E is B, $R_{22a}$ is hydroxy, and $R_{23a}$ is absent.

In one embodiment, $R_{24a}$ is hydrogen. In another embodiment, $R_{24a}$ is propyl. In another embodiment, $R_{24a}$ is butyl. In another embodiment, $R_{24a}$ is isobutyl. In another embodiment, $R_{24a}$ is pentyl. In another embodiment, $R_{24a}$ is propenyl. In another embodiment, $R_{24a}$ is butylenyl. In some embodiments, $R_{24a}$ is alpha butylenyl. In some embodiments, $R_{24a}$ is isobutylenyl. In another embodiment, $R_{24a}$ is pentenyl. In some embodiments, $R_{24a}$ is 1-pentenyl. In another embodiment, $R_{24a}$ is phenyl. In another embodiment, $R_{24a}$ is —$CH_2$-phenyl. In another embodiment, $R_{24a}$ is —$(CH_2)_2$-phenyl. In another embodiment, $R_{24a}$ is

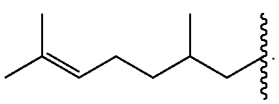 [SMILES: *CC(C)CCC=C(C)C]

In one embodiment, $R_{25a}$ is $C_1$-$C_6$ alkyl. In one embodiment, $R_{25a}$ is methyl.

In some embodiments, the PKR reaction of the siloxy-tethered 1,7-enyne or boronic ester-tethered 1,7-enyne of Formula (Ia) preferentially forms one isomer of Formula (IIa) over other isomers of Formula (IIa). In one embodiment, the PKR reaction of the siloxy-tethered 1,7-enyne or boronic ester-tethered 1,7-enyne of Formula (Ia) preferentially forms one isomer at position $R_{24a}$ of Formula (IIa) over the other isomer. In some embodiments, the PKR reaction of the siloxy-tethered 1,7-enyne or boronic ester-tethered 1,7-enyne of Formula (Ia) preferentially conserves the stereochemistry of the 1,7-enyne of Formula (Ia) in the cyclopentaoxasilinone or cyclopentaoxaborininone of Formula (IIa). In some embodiments, the PKR reaction of the siloxy-tethered 1,7-enyne or boronic ester-tethered 1,7-enyne of Formula (Ia) preferentially conserves the stereochemistry of $R_{12a}$ of Formula (Ia) at position $R_{24a}$ of Formula (IIa).

In another embodiment, the compound of Formula (II) is a compound of Formula (IIb):

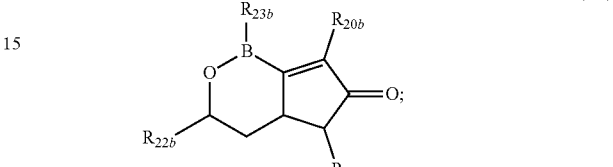

Formula (IIb)

wherein $R_{20b}$ and $R_{21b}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, nitrile, C(=O)O$R_{24b}$, and combinations thereof;

$R_{22b}$ is selected from the group consisting of hydrogen, deuterium, $C_1$-$C_6$ alkyl, $C_1$-$C_6$ alkenyl, $C_6$-$C_{12}$ aryl, and combinations thereof;

$R_{23b}$ is selected from the group consisting of hydrogen, deuterium, $C_1$-$C_6$ alkyl, $C_1$-$C_6$ alkenyl, $C_1$-$C_6$ alkoxy, hydroxy, and combinations thereof; and $R_{24b}$ is selected from the group consisting of hydrogen, deuterium, and $C_1$-$C_6$ alkyl.

In one embodiment, $R_{20b}$ is hydrogen. In another embodiment, $R_{20b}$ is methyl. In another embodiment, $R_{20b}$ is isopropyl. In another embodiment, $R_{20b}$ is ethenyl. In another embodiment, $R_{20b}$ is methoxy. In another embodiment, $R_{20b}$ is ethoxy. In another embodiment, $R_{20b}$ is halogen. In another embodiment, $R_{20b}$ is trimethylsilyl. In another embodiment, $R_{20b}$ is phenyl. In another embodiment, $R_{20b}$ is —$CH_2$—O—MOM (wherein MOM is methoxymethyl acetyl). In another embodiment, $R_{20b}$ is thienyl. In another embodiment, $R_{20b}$ is pyridinyl. In another embodiment, $R_{20b}$ is pyrimidinyl. In another embodiment, $R_{20b}$ is

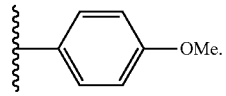

In another embodiment, $R_{20b}$ is

In another embodiment, $R_{20b}$ is

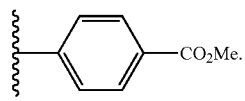

In another embodiment, $R_{20b}$ is

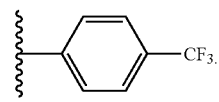

In another embodiment, $R_{20b}$ is

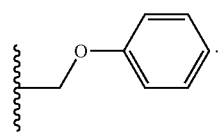

In another embodiment, $R_{20b}$ is

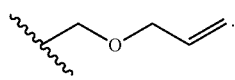 [SMILES: *COCC=C]

In one embodiment, $R_{21b}$ is hydrogen.

In one embodiment, $R_{22b}$ is hydrogen. In another embodiment, $R_{22b}$ is propyl. In another embodiment, $R_{22b}$ is butyl. In another embodiment, $R_{22b}$ is isobutyl. In another embodiment, $R_{22b}$ is pentyl. In another embodiment, $R_{22b}$ is propenyl. In another embodiment, $R_{22b}$ is butylenyl. In some embodiments, $R_{22b}$ is alpha butylenyl. In some embodiments, $R_{22b}$ is isobutylenyl. In another embodiment, $R_{22b}$ is pentenyl. In some embodiments, $R_{22b}$ is 1-pentenyl. In another embodiment, $R_{22b}$ is phenyl. In another embodiment, $R_{22b}$ is —CH$_2$-phenyl. In another embodiment, $R_{22b}$ is —(CH$_2$)$_2$-phenyl. In another embodiment, $R_{22b}$ is

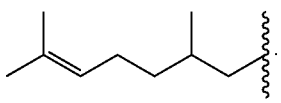 [SMILES: *CC(C)CCC=C(C)C]

In one embodiment, $R_{23b}$ is C$_1$-C$_6$ alkoxy. In another embodiment, $R_{23b}$ is hydroxy.

In one embodiment, $R_{24b}$ C$_1$-C$_6$ alkyl. In one embodiment, $R_{24b}$ is methyl.

In some embodiments, the PKR reaction of the boronic ester-tethered 1,7-enyne of Formula (Ib) preferentially forms one isomer of Formula (IIb) over other isomers of Formula (IIb). In one embodiment, the PKR reaction of the boronic ester-tethered 1,7-enyne of Formula (Ia) preferentially forms one isomer at position $R_{22a}$ of Formula (IIb) over the other isomer. In some embodiments, the PKR reaction of the boronic ester-tethered 1,7-enyne of Formula (Ib) preferentially conserves the stereochemistry of the 1,7-enyne of Formula (Ib) in the cyclopentaoxaborininone of Formula (IIb). In some embodiments, the PKR reaction of the boronic ester-tethered 1,7-enyne of Formula (Ib) preferentially conserves the stereochemistry of $R_{14b}$ of Formula (Ib) at position $R_{22a}$ of Formula (IIb).

In one embodiment, the compound of Formula (II), Formula (IIa), and/or Formula (Ib) is selected from the group consisting of:

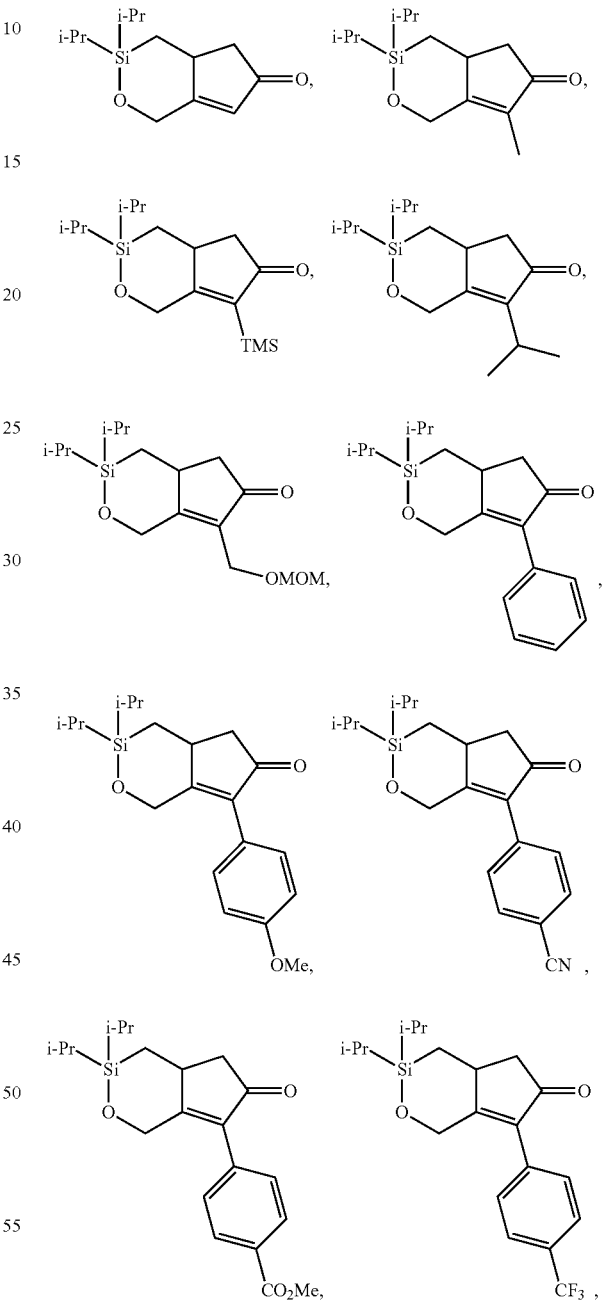

and combinations thereof; wherein i-Pr is isopropyl, TMS is trimethylsilyl, MOM is methoxymethyl acetyl, and Me is methyl. In some embodiments, the substitutent at $R_{21a}$ in the above compounds has specific stereochemistry.

In another embodiment, the compound of Formula (II), Formula (IIa), and/or Formula (IIb) is selected from the group consisting of:

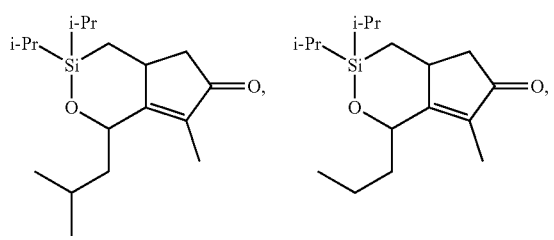
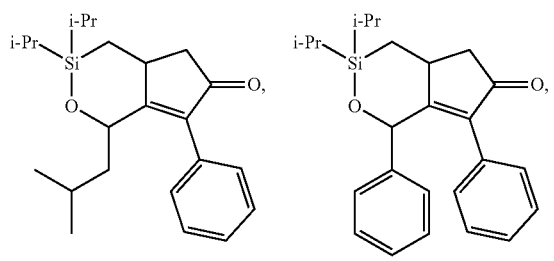
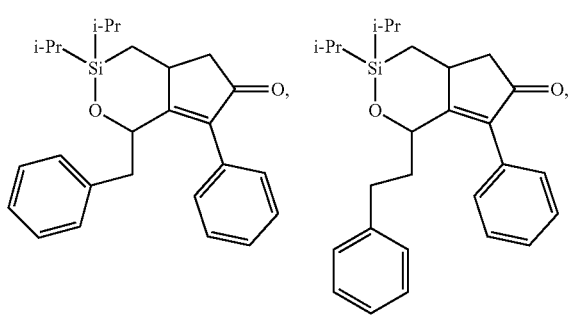
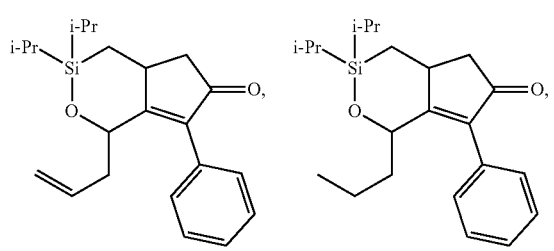
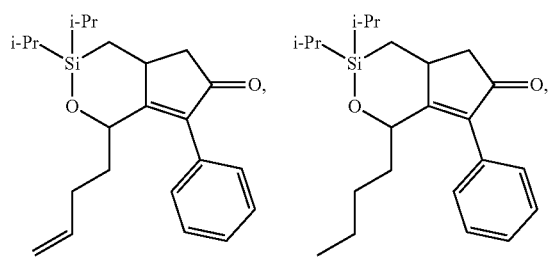
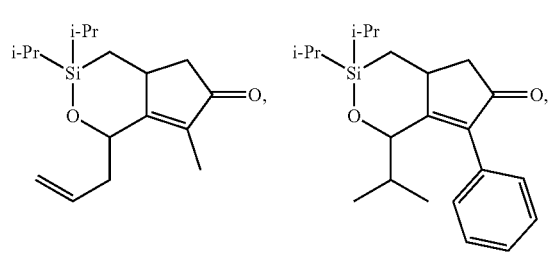
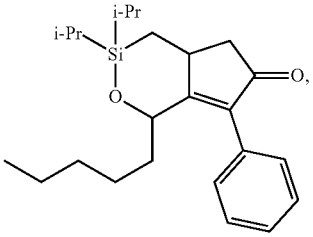
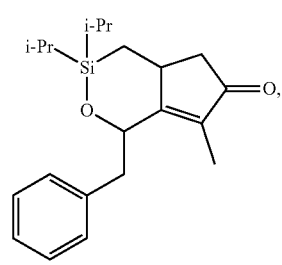
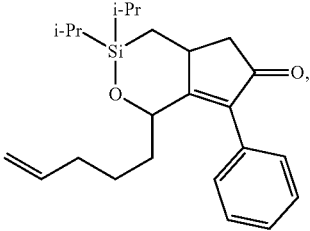
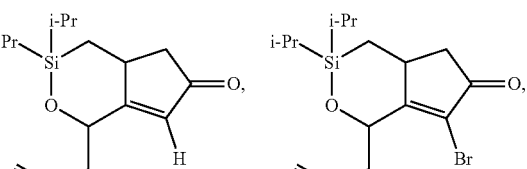
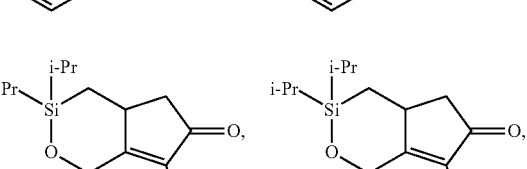
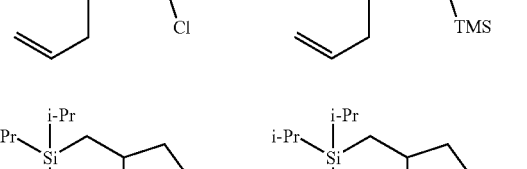
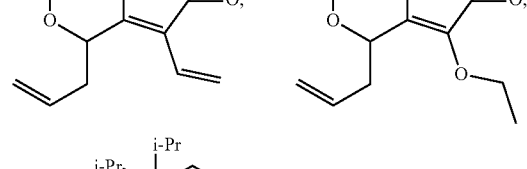
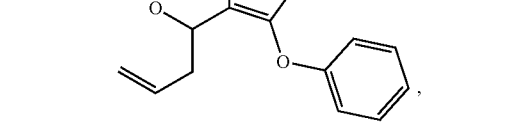

-continued

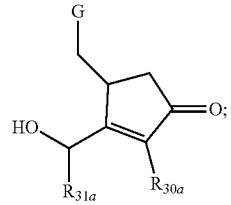

and combinations thereof, wherein TMS is trimethylsilyl. In some embodiments, the substituent at $R_{21a}$ in the above compounds has specific stereochemistry.

In some embodiments, the substituent at $R_{24a}$ in the above compounds has specific stereochemistry. In some embodiments, the substituent on the sp³ carbon atom adjacent to the oxygen is preferentially an R stereocenter. In another embodiment, the substituent on the sp³ carbon atom adjacent to the oxygen is preferentially an S stereocenter.

Transformations of Cyclopentaoxasilinone or Cyclopentaborininone

In some embodiments, the step of contacting a siloxy-tethered 1,7-enyne or a boronic ester-tethered 1,7-enyne with a thioether promoter further comprises the step of reacting the cyclopentaoxasilinone or cyclopentaoxaborininone with one or more additional reagents.

In some embodiments, the cyclopentaoxasilinone or cyclopentaoxaborininone is reacted with a reagent that oxidizes the cyclopentaoxasilinone or cyclopentaoxaborininone, thereby forming a cyclopentenone. The reagent(s) used to oxidize the cyclopentaoxasilinone or cyclopentaoxaborininone can be any oxidation reagent(s) known to a person of skill in the art. In one embodiment, the cyclopentaoxasilinone or cyclopentaoxaborininone is reacted with tert-butyl hydroperoxide in order to oxidize the cyclopentaoxasilinone or cyclopentaoxaborininone. In another embodiment, the cyclopentaoxasilinone or cyclopentaoxaborininone is reacted with hydrogen peroxide in order to oxidize the cyclopentaoxasilinone or cyclopentaoxaborininone.

In one embodiment, a compound of Formula (IIa) is oxidized to form a cyclopentenone of Formula (IIIa):

Formula (IIIa)

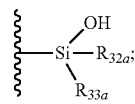

wherein

G is OH, B—OH, or

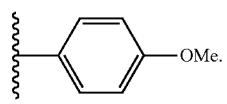 [SMILES: *c1ccc(OC)cc1]

$R_{30a}$ selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, C(=O)$OR_{34a}$, and combinations thereof, $R_{31a}$ is selected from the group consisting of hydrogen, deuterium, $C_1$-$C_6$ alkyl, $C_1$-$C_6$ alkenyl, $C_6$-$C_{12}$ aryl, and combinations thereof;

$R_{32a}$ and $R_{33a}$ are each independently selected from the group consisting of hydrogen, deuterium, $C_1$-$C_6$ alkyl, $C_1$-$C_6$ alkenyl, $C_1$-$C_6$ alkoxy, hydroxy, and combinations thereof, and $R_{34a}$ is selected from the group consisting of hydrogen, deuterium, and $C_1$-$C_6$ alkyl.

In one embodiment, $R_{30a}$ is hydrogen. In another embodiment, $R_{30a}$ is methyl. In another embodiment, $R_{30a}$ is isopropyl. In another embodiment, $R_{30a}$ is ethenyl. In another embodiment, $R_{30a}$ is methoxy. In another embodiment, $R_{30a}$ is ethoxy. In another embodiment, $R_{30a}$ is halogen. In another embodiment, $R_{30a}$ is trimethylsilyl. In another embodiment, $R_{30a}$ is phenyl. In another embodiment, $R_{30a}$ is —CH$_2$—O—MOM (wherein MOM is methoxymethyl acetyl). In another embodiment, $R_{30a}$ is thienyl. In another embodiment, $R_{30a}$ is pyridinyl. In another embodiment, $R_{30a}$ is pyrimidinyl. In another embodiment, $R_{30a}$ is In another embodiment, R$_{30a}$ is

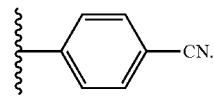

In another embodiment, R$_{30a}$ is

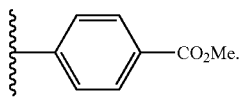

In another embodiment, R$_{30a}$ is

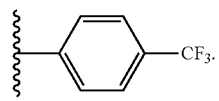

In another embodiment, R$_{30a}$ is

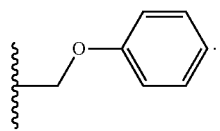

In another embodiment, R$_{30a}$ is

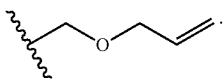 [SMILES: *COCC=C]

In one embodiment, R$_{31a}$ is hydrogen. In another embodiment, R$_{31a}$ is propyl. In another embodiment, R$_{31a}$ is butyl. In another embodiment, R$_{31a}$ is isobutyl. In another embodiment, R$_{31a}$ is pentyl. In another embodiment, R$_{31a}$ is propenyl. In another embodiment, R$_{31a}$ is butylenyl. In some embodiments, R$_{31a}$ is alpha butylenyl. In some embodiments, R$_{31a}$ is isobutylenyl. In another embodiment, R$_{31a}$ is pentenyl. In some embodiments, R$_{31a}$ is 1-pentenyl. In another embodiment, R$_{31a}$ is phenyl. In another embodiment, R$_{31a}$ is —CH$_2$-phenyl. In another embodiment, R$_{31a}$ is —(CH$_2$)$_2$-phenyl. In another embodiment, R$_{31a}$ is

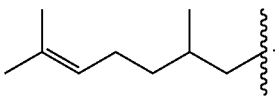 [SMILES: *CC(C)CCC=C(C)C]

In one embodiment, G is OH. In another embodiment, G is B—OH. In another embodiment, G is

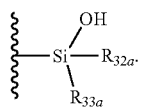

In some embodiments, G is

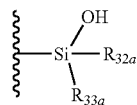

wherein each of R$_{32a}$ and R$_{33a}$ are C$_1$-C$_6$ alkyl. In some embodiments, G is

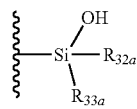

wherein each of R$_{32a}$ and R$_{33a}$ is isopropyl.

In one embodiment, R$_{34a}$ is C$_1$-C$_6$ alkyl. In one embodiment, R$_{34a}$ is methyl.

In one embodiment, the cyclopentaoxasilinone of Formula (IIa) is reacted with tert-butyl hydroperoxide, potassium hydride, and tetra-n-butylammonium fluoride in order to oxidize the cyclopentaoxasilinone and form an allylic alcohol substituted cyclopentenone of Formula (IIIa) wherein G is OH. In another embodiment, the cyclopentaoxasilinone of Formula (IIa) is reacted with tert-butyl hydroperoxide, cesium hydroxide, and tetra-n-butylammonium fluoride in order to oxidize the cyclopentaoxasilinone and form an allylic alcohol substituted cyclopentenone of Formula (IIIa) wherein G is OH. In another embodiment, the cyclopentaoxasilinone of Formula (IIa) is reacted with hydrogen peroxide, potassium fluoride, and potassium bicarbonate in order to oxidize the cyclopentaoxasilinone and form an allylic alcohol substituted cyclopentenone of Formula (IIIa) wherein G is OH. In another embodiment, the cyclopentaoxasilinone of Formula (IIa) is reacted with tert-butyl hydroperoxide, potassium hydride, and tetra-n-butylammonium fluoride in order to oxidize the cyclopentaoxasilinone and form an allylic alcohol substituted cyclopentenone of Formula (IIIa) wherein G is

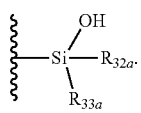

In one embodiment, R$_{32a}$ and R$_{33a}$ are each C$_1$-C$_6$ alkyl. In one embodiment, R$_{32a}$ and R$_{33a}$ are each isopropyl.

In some embodiments, the cyclopentenone of Formula (IIIa) has specific stereochemistry. In one embodiment, R$_{31a}$ of Formula (IIIa) has specific stereochemistry. In one embodiment, the substituent of Formula (IIIa) comprising G has specific stereochemistry. In some embodiments, the cyclopentenone of Formula (IIIa) is obtained as a single diastereomer from a stereospecific compound of Formula (IIa).

In one embodiment, a cyclopentaoxaborininone of Formula (IIb) is oxidized to form a cyclopentenone of Formula (IIIb):

Formula (IIIb)

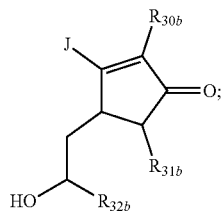

wherein

J is OH or

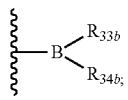

$R_{30b}$ and $R_{31b}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, nitrile, C(=O)O$R_{35b}$, and combinations thereof;

$R_{32b}$ is selected from the group consisting of hydrogen, deuterium, $C_1$-$C_6$ alkyl, $C_1$-$C_6$ alkenyl, $C_6$-$C_{12}$ aryl, and combinations thereof;

$R_{33b}$ and $R_{34b}$ are each independently selected from the group consisting of hydrogen, deuterium, $C_1$-$C_6$ alkyl, $C_1$-$C_6$ alkenyl, $C_1$-$C_6$ alkoxy, hydroxy, and combinations thereof, and $R_{35b}$ is selected from the group consisting of hydrogen, deuterium, and $C_1$-$C_6$ alkyl.

In one embodiment, $R_{30b}$ is hydrogen. In another embodiment, $R_{30b}$ is methyl. In another embodiment, $R_{30b}$ is isopropyl. In another embodiment, $R_{30b}$ is ethenyl. In another embodiment, $R_{30b}$ is methoxy. In another embodiment, $R_{30b}$ is ethoxy. In another embodiment, $R_{30b}$ is halogen. In another embodiment, $R_{30b}$ is trimethylsilyl. In another embodiment, $R_{30b}$ is phenyl. In another embodiment, $R_{30b}$ is —CH$_2$—O-MOM (wherein MOM is methoxymethyl acetyl). In another embodiment, $R_{30b}$ is thienyl. In another embodiment, $R_{30b}$ is pyridinyl. In another embodiment, $R_{30b}$ is pyrimidinyl. In another embodiment, $R_{30b}$ is

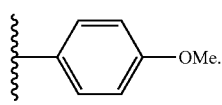

In another embodiment, $R_{30b}$ is

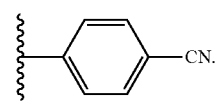

In another embodiment, $R_{30b}$ is

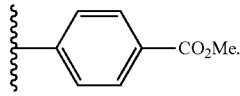

In another embodiment, $R_{30b}$ is

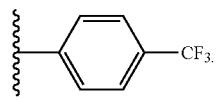

In another embodiment, $R_{30b}$ is

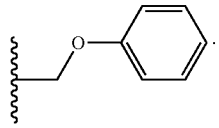 [SMILES: *COc1ccccc1]

In

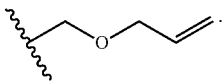 [SMILES: *COCC=C]

another embodiment, $R_{30b}$ is

In one embodiment, $R_{31b}$ is hydrogen.

In one embodiment, $R_{32b}$ is hydrogen. In another embodiment, $R_{32b}$ is propyl. In another embodiment, $R_{32b}$ is butyl. In another embodiment, $R_{32b}$ is isobutyl. In another embodiment, $R_{32b}$ is pentyl. In another embodiment, $R_{32b}$ is propenyl. In another embodiment, $R_{32b}$ is butylenyl. In some embodiments, $R_{32b}$ is alpha butylenyl. In some embodiments, $R_{32b}$ is isobutylenyl. In another embodiment, $R_{32b}$ is pentenyl. In some embodiments, $R_{32b}$ is 1-pentenyl. In another embodiment, $R_{32b}$ is phenyl. In another embodiment, $R_{32b}$ is —CH$_2$-phenyl. In another embodiment, $R_{32b}$ is —(CH$_2$)$_2$-phenyl. In another embodiment, $R_{32b}$ is

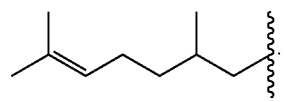 [SMILES: *CC(C)CCC=C(C)C]

In one embodiment, $R_{33b}$ and $R_{34b}$ are each is $C_1$-$C_6$ alkoxy. In another embodiment, $R_{33b}$ and $R_{34b}$ are each is hydroxy.

In one embodiment, $R_{35b}$ $C_1$-$C_6$ alkyl. In one embodiment, $R_{35b}$ is methyl.

In one embodiment, the cyclopentaoxaborininone of Formula (IIb) is reacted with tert-butyl hydroperoxide, potassium hydride, and tetra-n-butylammonium fluoride in order to oxidize the cyclopentaoxaborininone and form an ethanol substituted cyclopentenone of Formula (IIIb) wherein J is OH. In another embodiment, the cyclopentaoxaborininone of Formula (IIb) is reacted with tert-butyl hydroperoxide, cesium hydroxide, and tetra-n-butylammonium fluoride in order to oxidize the cyclopentaoxaborininone and form an ethanol substituted cyclopentenone of Formula (IIIb) wherein J is OH. In another embodiment, the cyclopentaoxaborininone of Formula (IIb) is reacted with hydrogen peroxide, potassium fluoride, and potassium bicarbonate in order to oxidize the cyclopentaoxaborininone and form an ethanol substituted cyclopentenone of Formula (IIIb) wherein J is OH. In another embodiment, the cyclopentaoxaborininone of Formula (IIb) is reacted with tert-butyl hydroperoxide, potassium hydride, and tetra-n-butylammonium fluoride in order to oxidize the cyclopentaoxaborininone and form an ethanol substituted cyclopentenone of Formula (IIb) wherein J is

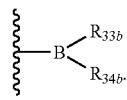

In one embodiment, $R_{33b}$ and $R_{34b}$ are each hydroxy.

In some embodiments, the cyclopentenone of Formula (IIIb) has specific stereochemistry. In one embodiment, $R_{32b}$ of Formula (IIIb) has specific stereochemistry. In one embodiment, the substituent of Formula (IIIb) comprising $R_{32b}$ has specific stereochemistry. In one embodiment, $R_{31b}$ of Formula (IIIb) has specific stereochemistry. In some embodiments, the cyclopentenone of Formula (IIIb) is obtained as a single diastereomer from the reaction of a stereospecific compound of Formula (IIb).

In some embodiments, the cyclopentaoxasilinone or cyclopentaoxaborininone of Formula (IIa) or Formula (IIb) is reacted with a reagent that converts the alkene of the cyclopentaoxasilinone or cyclopentaoxaborininone to an epoxide. The reagent(s) used to epoxidize the cyclopentaoxasilinone or cyclopentaoxaborininone can be any reagent(s) known to a person of skill in the art that can be used to form an epoxide from an alkene. In one embodiment, the cyclopentaoxasilinone or cyclopentaoxaborininone is reacted with hydrogen peroxide and a base in order to epoxidize the alkene. In one embodiment, the base is sodium hydroxide. In some embodiments, the compound resulting from the epoxidation of the cyclopentaoxasilinone or cyclopentaoxaborininone has specific stereochemistry. In one embodiment, the epoxide resulting from the epoxidation reaction has specific stereochemistry with respect to one or more $sp^3$ hybridized carbons in the compound. In some embodiments, a single diastereomer is formed from the epoxidation of a stereospecific cyclopentaoxasilinone or cyclopentaoxaborininone.

In yet another embodiment, the ketone of the cyclopentaoxasilinone or cyclopentaoxaborininone of Formula (IIa) or Formula (IIb) is reacted with a reagent that reduces the ketone to an alcohol. The reagent(s) used to reduce the ketone can be any reagent(s) known to a person of skill in the art that can be used to form an alcohol upon reduction of a ketone. In one embodiment, the cyclopentaoxasilinone or cyclopentaoxaborininone is reacted with cerium (III) chloride and sodium borohydride in order to reduce the ketone. In some embodiments, the compound resulting from the reduction of the ketone has specific stereochemistry. In some embodiments, the alcohol formed from the reduction of the ketone has specific stereochemistry. In some embodiments, the alcohol formed from the reduction of the ketone has specific stereochemistry in relation to one or more $sp^3$ hybridized carbons in the compound. In some embodiments, a single diastereomer results from the reduction of a stereospecific compound of Formula (IIa) or Formula (IIb) comprising the ketone.

In yet another embodiment, the cyclopentaoxasilinone or cyclopentaoxaborininone of Formula (IIa) or Formula (IIb) is reacted with a reagent that reduces the ketone to an alcohol and reduces the alkene which is conjugated to the ketone, forming an alkane. The reagent(s) used to reduce both the ketone and alkene of the cyclopentaoxasilinone or cyclopentaoxaborininone can be any reagent(s) known to a person of skill in the art that can be used to reduce both ketones and their conjugated alkenes. In one embodiment, the cyclopentaoxasilinone or cyclopentaoxaborininone is reacted with sodium borohydride in order to reduce the ketone and the alkene. In some embodiments, the compound resulting from the reduction of the ketone and alkene has specific stereochemistry. In some embodiments, the alcohol formed from the reduction of the ketone has specific stereochemistry. In some embodiments, the alcohol formed from the reduction of the ketone has specific stereochemistry in relation to one or more $sp^3$ hybridized carbons in the compound. In some embodiments, a single diastereomer results from the reduction of a stereospecific compound of Formula (IIa) or Formula (IIb) comprising the alkene conjugated ketone.

Preparation of the Siloxy-Tethered 1,7-Enyne or Boronic Ester-Tethered 1,7-Enyne In some embodiments, the step of contacting a siloxy-tethered 1,7-enyne with a thioether promoter is preceded by the step of preparing the siloxy-tethered 1,7-enyne.

In one embodiment, the step of preparing the siloxy-tethered 1,7-enyne comprises the step of reacting a propargyl alcohol with a chloroalkylsilane. In another embodiment, the step of contacting a boronic ester-tethered 1,7-enyne with a thioether promoter is preceded by the step of preparing the boronic ester-tethered 1,7-enyne. In one embodiment, the step of preparing the boronic ester-tethered 1,7-enyne comprises the step of reacting a propargyl alcohol with a boronic ester substituted alkene.

In one embodiment, the propargyl alcohol is a compound of Formula (IV):

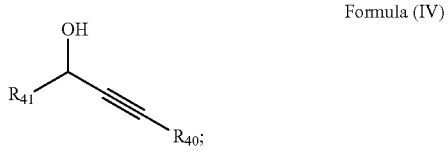

wherein $R_{40}$ is selected from the group consisting of hydrogen, deuterium, $C_1$-$C_6$ alkyl, $C_1$-$C_6$ alkenyl, halogen, $C_1$-$C_6$ alkoxy, $C_6$-$C_{12}$ aryloxy, $C_6$-$C_{12}$ aryl, $C_4$-$C_{10}$ heteroaryl, trialkylsilane, hydroxy, halogen, nitrile, C(=O)$OR_{42}$, and combinations thereof, $R_{41}$ is selected from the group consisting of hydrogen, deuterium, $C_1$-$C_6$ alkyl, $C_1$-$C_6$ alkenyl, $C_6$-$C_{12}$ aryl, and combinations thereof; and $R_{42}$ is selected from the group consisting of hydrogen, deuterium, and $C_1$-$C_6$ alkyl.

In one embodiment, $R_{40}$ is hydrogen. In another embodiment, $R_{40}$ is methyl. In another embodiment, $R_{40}$ is isopropyl. In another embodiment, $R_{40}$ is ethenyl. In another embodiment, $R_{40}$ is methoxy. In another embodiment, $R_{40}$ is ethoxy. In another embodiment, $R_{40}$ is halogen.

In another embodiment, $R_{40}$ is trimethylsilyl. In another embodiment, $R_{40}$ is phenyl. In another embodiment, $R_{40}$ is —$CH_2$—O-MOM (wherein MOM is methoxymethyl acetyl). In another embodiment, $R_{40}$ is thienyl. In another embodiment, $R_{40}$ is pyridinyl. In another embodiment, $R_{40}$ is pyrimidinyl. In another embodiment, $R_{40}$ is

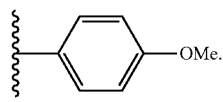 [SMILES: *c1ccc(OC)cc1]

In another embodiment, $R_{40}$ is

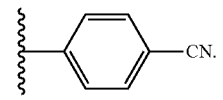

In another embodiment, $R_{40}$ is

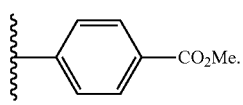

In another embodiment, $R_{40}$ is

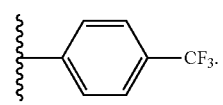 [SMILES: *c1ccc(C(F)(F)F)cc1]

In another embodiment, $R_{40}$ is

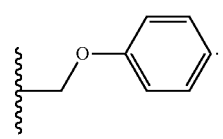 [SMILES: *COc1ccccc1]

In another embodiment, $R_{40}$ is

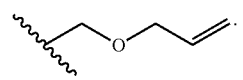 [SMILES: *COCC=C]

In one embodiment, $R_{41}$ is hydrogen. In another embodiment, $R_{41}$ is propyl. In another embodiment, $R_{41}$ is butyl. In another embodiment, $R_{41}$ is isobutyl. In another embodiment, $R_{41}$ is pentyl. In another embodiment, $R_{41}$ is propenyl. In another embodiment, $R_{41}$ is butylenyl. In some embodiments, $R_{41}$ is alpha butylenyl. In some embodiments, $R_{41}$ is isobutylenyl. In another embodiment, $R_{41}$ is pentenyl. In some embodiments, $R_{41}$ is 1-pentenyl. In another embodiment, $R_{41}$ is phenyl. In another embodiment, $R_{41}$ is —CH$_2$-phenyl. In another embodiment, $R_{41}$ is —(CH$_2$)$_2$-phenyl. In another embodiment, $R_{41}$ is

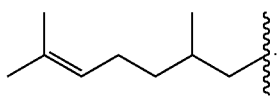 [SMILES: *CC(C)CCC=C(C)C]

In one embodiment, $R_{42}$ is $C_1$-$C_6$ alkyl. In one embodiment, $R_{42}$ is methyl.

In one embodiment, the chloroalkylsilane or boronic ester substituted alkene is a compound of Formula (V):

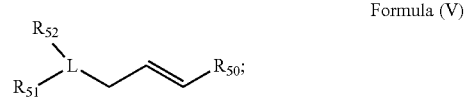

Formula (V)

wherein
L is B or Si—$R_{53}$;
$R_{50}$ is selected from the group consisting of hydrogen, deuterium, $C_1$-$C_6$ alkyl, hydroxy, halogen, $C_1$-$C_6$ alkoxy, nitrile, and combinations thereof;
$R_{51}$ and $R_{52}$ are each independently selected from the group consisting of hydrogen, deuterium, $C_1$-$C_6$ alkyl, $C_1$-$C_6$ alkenyl, $C_1$-$C_6$ alkoxy, hydroxy, and combinations thereof, wherein $R_{51}$ and $R_{52}$ can bond or fuse to form a ring; and
$R_{53}$ is chlorine.

In one embodiment, $R_{50}$ is hydrogen.

In one embodiment, L is Si—$R_{53}$ wherein $R_{51}$ and $R_{52}$ are each $C_1$-$C_6$ alkyl. In one embodiment, $R_{51}$ and $R_{52}$ are each isopropyl.

In some embodiments, the compound of Formula (IV) and the compound of Formula (V) are reacted to form a siloxy-tethered 1,7-enyne of Formula (Ia). In one embodiment, the compound of Formula (IV) is contacted with a compound of Formula (V), wherein L is Si—$R_{53}$, in the presence of 4-dimethylaminopyridine and triethylamine. In one embodiment, the stereochemistry of the propargyl alcohol of Formula (IV) is maintained in the 1,7-enyne of Formula (Ia).

In another embodiment, L is B wherein $R_{51}$ and $R_{52}$ bond or fuse to form a ring. In one embodiment, the ring formed from L with $R_{51}$ and $R_{52}$ is

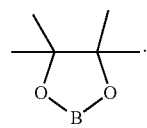

In some embodiments, the compound of Formula (IV) and the compound of Formula (V) are reacted to form a boronic ester-tethered 1,7-enyne of Formula (Ib). In one embodiment, the compound of Formula (IV) is contacted with a compound of Formula (V), wherein L is B, in the presence of n-butyllithium. In one embodiment, the stereochemistry of the propargyl alcohol of Formula (IV) is maintained in the 1,7-enyne of Formula (Ib).

In another embodiment, the boronic ester-tethered 1,7-enyne is prepared by reacting a boronic ester substituted alkyne with an alcohol substituted alkene.

In one embodiment, the boronic ester substituted alkyne is a compound of Formula (VI):

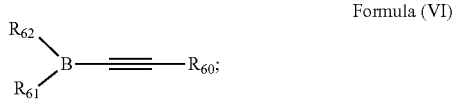

Formula (VI)

wherein $R_{60}$ is selected from the group consisting of hydrogen, deuterium, $C_1$-$C_6$ alkyl, $C_1$-$C_6$ alkenyl, halogen, $C_1$-$C_6$ alkoxy, $C_6$-$C_{12}$ aryloxy, $C_6$-$C_{12}$ aryl, $C_4$-$C_{10}$ heteroaryl, trialkylsilane, hydroxy, halogen, nitrile, C(=O)OR$_{63}$, and combinations thereof, $R_{61}$ and $R_{62}$ are each independently selected from the group consisting of $C_1$-$C_6$ alkoxy, hydroxy, and combinations thereof, wherein $R_{61}$ and $R_{62}$ can bond or fuse to form a ring; and $R_{63}$ is selected from the group consisting of hydrogen, deuterium, and $C_1$-$C_6$ alkyl.

In one embodiment, $R_{60}$ is hydrogen. In another embodiment, $R_{60}$ is methyl. In another embodiment, $R_{60}$ is isopropyl. In another embodiment, $R_{60}$ is ethenyl. In another embodiment, $R_{60}$ is methoxy. In another embodiment, $R_{60}$ is ethoxy. In another embodiment, $R_{60}$ is halogen.

In another embodiment, $R_{60}$ is trimethylsilyl. In another embodiment, $R_{60}$ is phenyl. In another embodiment, $R_{60}$ is —CH$_2$—O-MOM (wherein MOM is methoxymethyl acetyl). In another embodiment, $R_{60}$ is thienyl. In another embodiment, $R_{60}$ is pyridinyl. In another embodiment, $R_{60}$ is pyrimidinyl. In another embodiment, $R_{60}$ is

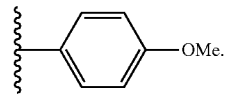

In another embodiment, $R_{60}$ is

In another embodiment, $R_{60}$ is

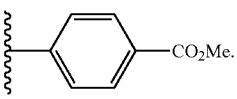

In another embodiment, $R_{60}$ is

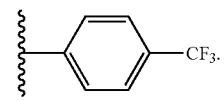

In another embodiment, $R_{60}$ is

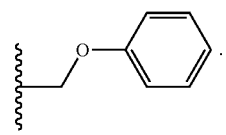

In another embodiment, $R_{60}$ is

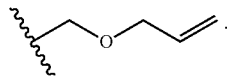

In one embodiment, $R_{61}$ and $R_{62}$ bond or fuse to form a ring. In one embodiment, $R_{61}$ and $R_{62}$ bond or fuse to form

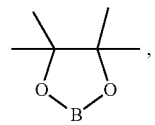

together with the boron atom of Formula (VI).

In one embodiment, $R_{63}$ is $C_1$-$C_6$ alkyl. In one embodiment, $R_{63}$ is methyl.

In one embodiment, the alcohol substituted alkene is a compound of Formula (VII):

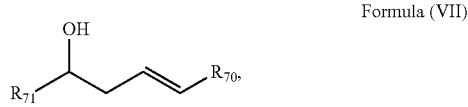

Formula (VII)

wherein $R_{70}$ is selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, nitrile, C(=O)OR$_{72}$, and combinations thereof;

$R_{71}$ is selected from the group consisting of hydrogen, deuterium, $C_1$-$C_6$ alkyl, $C_1$-$C_6$ alkenyl, $C_6$-$C_{12}$ aryl, and combinations thereof; and $R_{72}$ is selected from the group consisting of hydrogen, deuterium, and $C_1$-$C_6$ alkyl.

In one embodiment, $R_{70}$ is hydrogen.

In one embodiment, $R_{71}$ is hydrogen. In another embodiment, $R_{71}$ is propyl. In another embodiment, $R_{71}$ is butyl. In another embodiment, $R_{71}$ is isobutyl. In another embodiment, $R_{71}$ is pentyl. In another embodiment, $R_{71}$ is propenyl. In another embodiment, $R_{71}$ is butylenyl. In some embodiments, $R_{71}$ is alpha butylenyl. In some embodiments, $R_{71}$ is isobutylenyl. In another embodiment, $R_{71}$ is pentenyl. In some embodiments, $R_{71}$ is 1-pentenyl. In another embodiment, $R_{71}$ is phenyl. In another embodiment, $R_{71}$ is —CH$_2$-phenyl. In another embodiment, $R_{71}$ is —(CH$_2$)$_2$-phenyl. In another embodiment, $R_{71}$ is

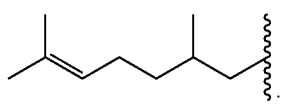 [SMILES: *CC(C)CCC=C(C)C]

In one embodiment, $R_{72}$ is $C_1$-$C_6$ alkyl. In one embodiment, $R_{72}$ is methyl. In some embodiments, the compound of Formula (VI) and the compound of Formula (VII) are reacted to form a boronic ester-tethered 1,7-enyne of Formula (Ib). In one embodiment, the compound of Formula (VI) is contacted with the compound of Formula (VII) in the presence of n-butyllithium. In one embodiment, the stereochemistry of the alcohol of Formula (VII) is maintained in the 1,7-enyne of Formula (Ib).

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1: Access to Highly Functionalized Cyclopentenones Via Diastereoselective Pauson-Khand Reaction of Siloxy-Tethered 1,7-Enynes Materials and Methods All reagent grade solvents and chemicals were purchased from commercial vendors and used without further purification, unless otherwise referenced. All reactions were magnetically stirred and conducted under an atmosphere of nitrogen in oven- or vacuum flame-dried glassware with commercially available anhydrous solvents; tetrahydrofuran (THF), diethyl ether ($Et_2O$), methylene chloride ($CH_2Cl_2$), toluene (PhMe), and o-xylenes, unless otherwise noted. All reactions were monitored by thin-layer chromatography (TLC) using 250 μm precoated silica gel plates and were visualized by UV, CAM, and/or $KMnO_4$ staining and heat. Flash column chromatography using silica gel (230-400 mesh, Silicycle). Purified compounds were dried on a high vacuum line (0.2 torr) to remove trace solvent. Yields refer to chromatographically and spectroscopically pure compounds, unless otherwise stated. All melting points were obtained on a Thomas-Hoover apparatus and are uncorrected. Optical rotations were measured on a Jasco P-2000 polarimeter using a 100 mm path-length cell at 589 nm. $^1H$ and $^{13}C$ NMR spectra were recorded on a Varian 400 MR (at 400 MHz and 101 MHz, respectively), or a Varian Inova 500 (at 500 MHz and 126 MHz, respectively). NMR data is reported relative to internal $CDCl_3$ ($^1H$, δ=7.26), $CDCl_3$ ($^{13}C$, δ 77.16). Data for $^1H$ NMR spectra are reported as follows: chemical shift (6 ppm) (multiplicity, coupling constant (Hz), integration). Multiplicity and qualifier abbreviations are as follows: (s=singlet, d=doublet, t=triplet, q=quartet, qn=quintet, dd=doublet of doublets, ddd=doublet of doublet of doublets, ddt=doublet of doublet of triplets, dt=doublet of triplets, m=multiplet, b=broad). $^{13}C$-NMR spectra are tabulated by observed peak. IR spectra were recorded on a PerkinElmer 100 FT-IR spectrometer and are reported in frequency of absorption ($cm^{-1}$). Analytical chiral SFC was performed with a Mettler SFC supercritical $CO_2$ analytical chromatography system ($CO_2$=1450 psi, column temperature=40° C.) with Chiralcel AD-H, OD-H, columns (4.6 mm×25 cm). High-resolution mass spectra (HRMS) were acquired at the Drexel Mass Spectral Facility on a Thermo-Electron LTQ-FT 7T Fourier transform ion cyclotron resonance (FT-ICR) Spectrometer with an atmospheric pressure chemical ionization (APCI) source with direct infusion run in positive ion mode at 5 kV. Single crystal X-ray structures were determined at the University of Pennsylvania. X-ray intensity data were collected on a Rigaku Mercury CCD or Bruker APEXII CCD area detector employing graphite-monochromated Mo-Ka radiation (1=0.71073 Å at a temperature of 143(1)K.

X-Ray Structure Determination:

Low-temperature diffraction data (φ- and ω-scans) were collected on a Bruker AXS D8 VENTURE KAPPA diffractometer coupled to a PHOTON 100 CMOS detector with Mo-Kα radiation (λ=0.71073 Å) from an IμS HB micro-focused X-ray tube. All diffractometer manipulations, including data collection integration, and scaling were carried out using the Bruker APEXII software. Absorption corrections were applied using SADABS. The structure was solved by direct methods using SHELXS4 or by using intrinsic phasing using SHELXT and refined against F2 on all data by full-matrix least squares with SHELXL-20145 using established refinement techniques. All non-hydrogen atoms were refined anisotropically. All hydrogen atoms were included in the model at geometrically calculated positions and refined using a riding model. Crystallographic data for L1ØNiCl2 and 6c can be obtained free of charge from The Cambridge Crystallographic Data Centre (CCDC) under CCDC eposition numbers 1547483-1547485. Graphical representation of structures with 50% probability thermal ellipsoids was generated using Mercury visualization software.

Abbreviations:

4-OMeBnSMe—4-Methoxybenzyl methyl sulfide; 4-FBnSMe—4-Fluorobenzyl methyl sulfide; BnSMe—Benzyl methyl sulfide; n-BuSMe—nButyl methyl sulfide; CyNH2—Cyclohexylamine; DCM—dichloromethane; DMAP—4-dimethylaminopyridine; dr—diasteromeric ratio; ee—enantiomeric excess; Et20—diethyl ether; EtOAc—ethyl acetate; FTIR—Fourier transform infrared; FurfurylSMe—2-((methylthio)methyl)furan; NMO—N-Methylmorpholine N-Oxide NMR—nuclear magnetic resonance; PhMe—toluene; PhSMe—methyl(phenyl)sulfane; SFC—supercritical fluid chromatography; THE—tetrahydrofuran; TLC—thin layer chromatography; TMANO—Trimethylamine N-Oxide; UV—ultraviolet.

Experimental Procedures:

A. Substrate Preparation

The synthesis of the propargyl alcohols S1-(–)S19, allyldiisopropylchlorosilane S20, and 4-fluorobenzyl methyl sulfide 21 below were prepared according to the previously reported procedures.

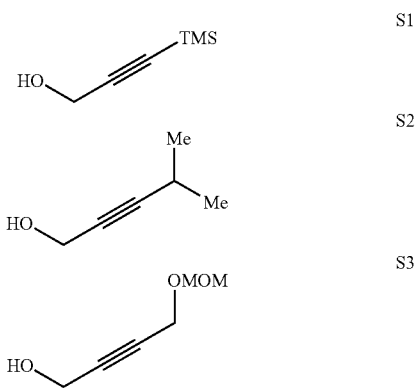

| | |
|---|---|
| 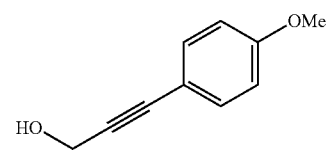 | S4 |
| 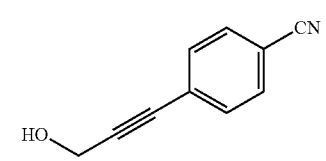 | S5 |
| 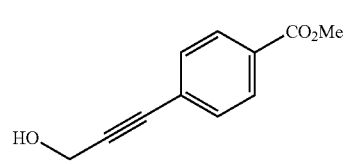 | S6 |
| 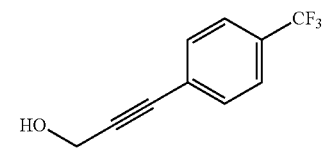 | S7 |
| 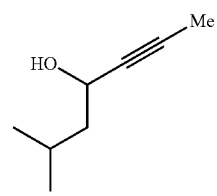 | S8 |
| 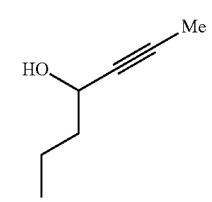 | S9 |
| 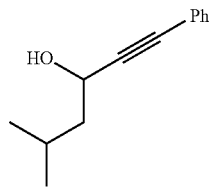 | S10 |
| 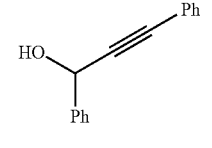 | S11 |
| 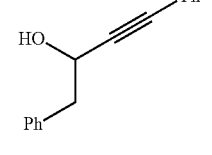 | S12 |
| 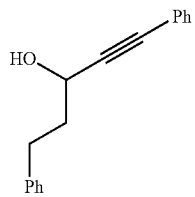 | S13 |
| 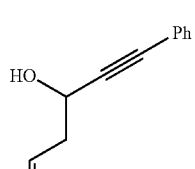 | S14 |
| 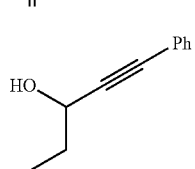 | S15 |
| 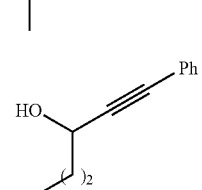 | S16 |
| 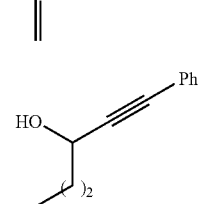 | S17 |
| 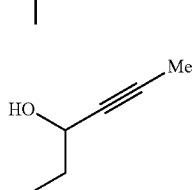 | S18 |
| 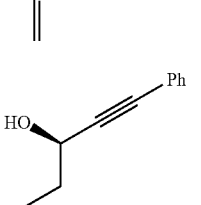 | (-) S19 |
| 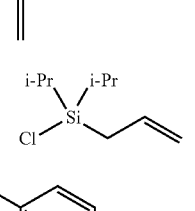 | S20 |
| 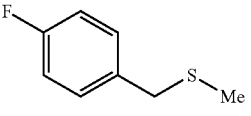 | S21 |

Propargyl alcohols S19-S21 (Acros) purchased from aforementioned commercial sources and used as is without further purification.

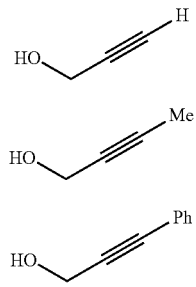

B. Synthesis of Enynes General Procedure A

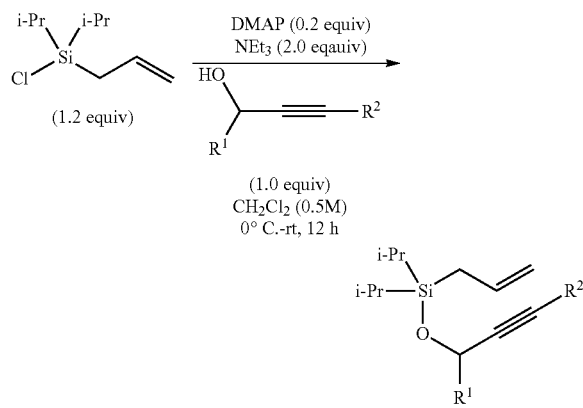

A flame dried round-bottom flask equipped with a magnetic stir-bar was charged sequentially with dry DCM (0.5M), allyldiisopropylchlorosilane S20 (1.2 equiv), DMAP (0.2 equiv), NEt$_3$ (2.0 equiv). The reaction mixture was cooled to 0° C. in an ice/water bath. In a separate flame-dried pear-shaped flask, the propargyl alcohol S1-S19 and S21-S23 (1.0 equiv) was diluted in dry DCM (1.0M) and added dropwise to the 0° C. reaction mixture via syringe. This was followed by rinsing the pear-shaped flask with an additional portion of DCM (0.5 mL). The cooling bath was then removed and the reaction mixture allowed to stir at room temperature (23° C.) for 12 h. The resulting reaction mixture was quenched with sat. aq. NH$_4$Cl. The layers were separated, the aqueous layer was extracted with DCM (3×20 mL), and the combined organic layers were washed with brine, dried with MgSO$_4$, filtered, and concentrated under reduced pressure. The crude material was purified by column chromatography to provide enynes 1a-j and 5a-k.

Allyl(but-2-yn-1-yloxy)diisopropylsilane (1a)

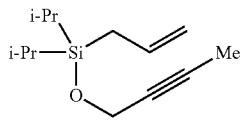

Prepared from but-2-yn-1-ol (S22) (xx mL, xx mmol) and allylchlorodiisopropylsilane (1.00 g, 14.27 mmol), following General Procedure A, the product was purified by flash chromatography on silica (hexanes—0.25% Et$_2$O/hexanes) to afford 1a (2.47 g, 0.121 mmol, 77%) as a colorless oil. Rf: 0.8 (silica, 1% EtOAc/hexanes).

1H NMR (400 MHz, CDCl3): δ 5.89 (ddt, J=17.0, 10.1, 8.1 Hz, 1H), 4.97 (ddt, J=17.0, 2.2, 1.3 Hz, 1H), 4.87 (ddt, J=10.1, 2.2, 1.1 Hz, 1H), 4.33 (q, J=2.4 Hz, 2H), 1.83 (t, J=2.4 Hz, 3H), 1.75 (dt, J=8.1, 1.3 Hz, 2H), 1.09-1.00 (m, 16H).

13C NMR (101 MHz, CDCl3): δ 134.56, 113.97, 81.08, 77.83, 52.35, 18.95, 17.58, 17.57, 12.64, 3.75.

IR (neat, cm-1): 2944, 2867, 1630, 1464, 1371, 1263, 1145, 1064, 994, 882, 774.

HRMS (C+, m/z): calculated for C13H23OSi [M−H] 233.15127, found 223.15146.

Allyldiisopropyl(prop-2-yn-1-yloxy)silane (1b)

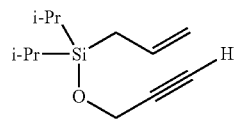

Prepared from prop-2-yn-1-ol (S21) (0.500 g, 8.92 mmol) and allylchlorodiisopropylsilane (2.04 g, 10.7 mmol), following General Procedure A, the product was purified by flash chromatography on silica (hexanes—0.25% Et$_2$O/hexanes) to afford 1 h (1.43 g, 6.78 mmol, 76%) as a colorless oil.

Rf: 0.8 (1% EtOAc/hexanes).

1H NMR (400 MHz, CDCl3): δ 5.89 (ddt, J=16.9, 10.0, 1.3 Hz, 1H), 4.98 (ddt, J=16.9, 2.2, 1.5 Hz, 1H), 4.88 (ddt, J=10.0, 2.2, 1.1 Hz, 1H), 4.38 (dd, J=2.4, 0.6 Hz, 2H), 2.40 (td, J=2.4, 0.6 Hz, 1H), 1.76 (dt, J=8.1, 1.3 Hz, 2H), 1.08-1.04 (m, 15H).

13C NMR (101 MHz, CDCl3): δ 134.33, 114.18, 82.40, 73.04, 51.95, 18.86, 17.56, 17.53, 12.61. IR (neat, cm-1): 2944, 2867, 1630, 1464, 1370, 1264, 1160, 1094, 994, 882, 749.

HRMS (C+, m/z): calculated for C12H21OSi [M−H] 209.13562, found 209.13573.

Allyldiisopropyl((3-(trimethylsilyl)prop-2-yn-1-yl)oxy)silane (1c)

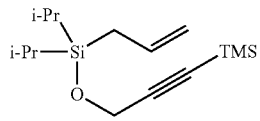 [SMILES: C=CC[Si](OCC#C[Si](C)(C)C)(C(C)C)C(C)C]

Prepared from 3-(trimethylsilyl)prop-2-yn-1-ol (S) (0.400 g, 3.12 mmol) and allylchlorodiisopropylsilane (0.714 g, 3.74 mmol), following General Procedure A, the product was purified by flash chromatography on silica (hexanes—0.25% Et$_2$O/hexanes) to afford 1c (0.714 g, 2.53 mmol, 81%) as a colorless oil.

Rf: 0.8 (1% EtOAc/hexanes).

1H NMR (400 MHz, CDCl3): δ 5.89 (ddt, J=17.0, 10.0, 8.1 Hz, 1H), 4.97 (dt, J=17.0, 2.2, 1.4 Hz, 1H), 4.86 (ddt, J=10.0, 2.2, 1.1 Hz, 1H), 4.36 (s, 2H), 1.76 (dd, J=8.1, 1.3 Hz, 2H), 1.06 (tt, J=4.3, 1.7 Hz, 15H), 0.16 (s, 9H).

13C NMR (101 MHz, CDCl3): δ 134.46, 114.01, 104.52, 89.82, 52.66, 18.97, 17.57, 17.54, 12.70, −0.12.

IR (neat, cm-1): 2945, 2867, 2177, 1630, 1463, 1364, 1250, 1094, 1001, 882, 840, 758.

HRMS (C+, m/z): calculated for C15H30OSi2 [M+] 282.18297, found 2822.18313.

Allyldiisopropyl((4-methylpent-2-yn-1-yl)oxy)silane (1d)

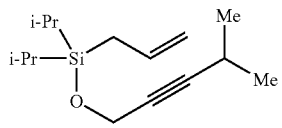 [SMILES: C=CC[Si](OCC#CC(C)C)(C(C)C)C(C)C]

Prepared from 4-methylpent-2-yn-1-ol (S2) (0.500 g, 5.09 mmol) and allylchlorodiisopropylsilane (1.17 g, 6.11 mmol), following General Procedure A, the product was purified by flash chromatography on silica (hexanes—0.25% Et₂O/hexanes) to afford id (0.951 g, 3.77 mmol, 74%) as a colorless oil.

Rf: 0.8 (1% EtOAc/hexanes).

1H NMR (400 MHz, CDCl3): δ 5.90 (ddt, J=17.0, 10.1, 8.1 Hz, 1H), 5.01-4.94 (m, 1H), 4.89-4.84 (m, 1H), 4.36 (dd, J=6.8, 2.0 Hz, 3H), 2.58 (thept, J=6.8, 2.0 Hz, 1H), 1.76 (dt, J=8.0, 1.3 Hz, 3H), 1.16 (dd, J=6.8, 0.5 Hz, 8H), 1.06 (qd, J=2.5, 0.9 Hz, 18H).

13C NMR (101 MHz, CDCl3): δ 134.67, 113.90, 91.02, 77.97, 52.37, 22.99, 20.70, 19.03, 17.61, 17.59, 12.70.

IR (neat, cm-1): 2967, 2942, 2866, 2246, 1630, 1463, 1419, 1384, 1396, 1319, 1262, 1185, 1159, 1127, 1088, 1035,994,932,882,775,749,657.

HRMS (C+, m/z): calculated for C15H29OSi [M+H]+ 253.19822, found 253.19814.

10,10-Diisopropyl-2,4,9-trioxa-10-silatridec-12-en-6-yne (1e)

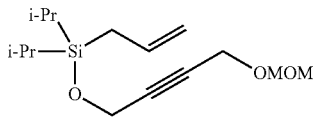

Prepared from 4-(methoxymethoxy)but-2-yn-1-ol (S3) (0.750 g, 5.76 mmol) and allylchlorodiisopropylsilane (1.32 g, 6.92 mmol), following General Procedure A, the product was purified by flash chromatography on silica (hexanes—0.25% Et₂O/hexanes) to afford 1e (1.31 g, 4.61 mmol, 80%) as a colorless oil. Rf: 0.8 (1% EtOAc/hexanes).

1H NMR (400 MHz, CDCl3): δ 5.88 (ddt, J=16.9, 10.0, 8.1 Hz, 1H), 4.97 (ddt, J=16.9, 2.1, 1.5 Hz, 1H), 4.88 (ddt, J=10.1, 2.2, 1.1 Hz, 1H), 4.70 (s, 3H), 4.42 (t, J=1.8 Hz, 2H), 4.26 (t, J=1.8 Hz, 2H), 3.38 (s, 3H), 1.75 (dt, J=8.0, 1.3 Hz, 2H), 1.08-1.04 (m, 16H).

13C NMR (101 MHz, CDCl3): δ 134.33, 114.15, 94.85, 84.85, 80.52, 55.67, 54.49, 52.13, 18.87, 17.56, 17.54, 12.61.

IR (neat, cm-1): 2943, 2867, 1630, 1464, 1371, 1151, 1131, 1084, 1043, 990, 922, 882, 777.

HRMS (CI+) m/z calculated for C15H27OSi [M−H]+ 283.17240, found 283.17248.

Allyldiisopropyl((3-phenylprop-2-yn-1-yl)oxy)silane (1f)

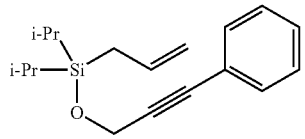 [SMILES: C=CC[Si](OCC#Cc1ccccc1)(C(C)C)C(C)C]

Prepared from 3-phenylprop-2-yn-1-ol (S23) (2.50 g, 18.92 mmol) and allylchlorodiisopropylsilane (4.33 g, 22.70 mmol), following General Procedure A, the product was purified by flash chromatography on silica (hexanes—0.25% Et₂O/hexanes) to afford if (4.61 g, 16.1 mmol, 85%) as a colorless oil.

Rf: 0.8 (1% EtOAc/hexanes).

1H NMR (400 MHz, CDCl3): δ 7.50-7.30 (m, 5H), 5.98 (ddt, J=16.9, 10.1, 8.0 Hz, 1H), 5.05 (ddt, J=16.9, 2.2, 1.5 Hz, 1H), 4.94 (ddt, J=10.1, 2.2, 1.1 Hz, 1H), 4.64 (s, 2H), 1.85 (dt, J=8.0, 1.3 Hz, 2H), 1.15 (dtt, J=5.5, 2.6, 1.5 Hz, 15H).

13C NMR (101 MHz, CDCl3): δ 134.37, 131.68, 128.34, 128.32, 123.08, 114.11, 114.08, 87.89, 84.93, 52.60, 18.97, 17.58, 17.56, 12.69.

IR (neat, cm-1): 3076, 2943, 2893, 2866, 2244, 1630, 1599, 1490, 1463, 1443, 1419, 1369, 1259, 1159, 1086, 1069, 994,962, 882, 775, 754, 690, 658.

HRMS (C+, m/z): calculated for C15H26OSi [M+H]+ 263.14618, found 263.14632.

Allyldiisopropyl((3-(4-methoxyphenyl)prop-2-yn-1-yl)oxy)silane (1 g)

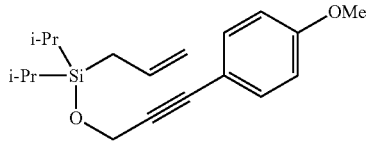 [SMILES: C=CC[Si](OCC#Cc1ccc(OC)cc1)(C(C)C)C(C)C]

Prepared from 3-(4-methoxyphenyl)prop-2-yn-1-ol (S4) (1.0 g, 6.17 mmol) and allylchlorodiisopropylsilane (1.41 g, 7.40 mmol), following General Procedure A, the product was purified by flash chromatography on silica (hexanes—0.25% Et₂O/hexanes) to afford 1 g (1.48 g, 4.68 mmol, 76%) as a colorless oil.

Rf: 0.6 (1% EthOAc/hexanes).

1H NMR (400 MHz, CDCl3): δ 7.39-7.35 (m, 2H), 6.86-6.81 (m, 2H), 5.94 (ddt, J=16.9, 10.1, 8.1 Hz, 1H), 5.00 (ddt, J=16.9, 2.2, 1.2 Hz, 1H), 4.90 (ddt, J=10.1, 2.2, 1.1 Hz, 1H), 4.59 (s, 2H), 3.80 (s, 3H), 1.81 (dt, J=8.0, 1.3 Hz, 2H), 1.12-1.08 (m, 15H).

13C NMR (101 MHz, CDCl3): δ 159.72, 134.51, 133.19, 115.21, 114.06, 114.02, 86.49, 84.87, 55.38, 52.70, 19.01, 17.62, 17.60, 12.72.

IR (neat, cm-1): 2942, 2865, 1629, 1607, 1569, 1509, 1463, 1442, 1418, 1368, 1323, 1291, 1247, 1172, 1084, 1066, 1034,995,964,932, 882, 830,799,775,749,659,618, 563, 535.

4-(3-((Allyldiisopropylsilyl)oxy)prop-1-yn-1-yl)benzonitrile (1 h)

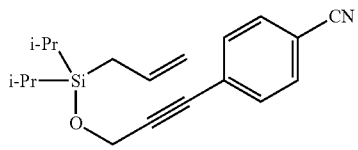 [SMILES: C=CC[Si](OCC#Cc1ccc(C#N)cc1)(C(C)C)C(C)C]

Prepared from 4-(3-hydroxyprop-1-yn-1-yl)benzonitrile (S5) (1.0 g, 6.36 mmol) and allylchlorodiisopropylsilane (1.46 g, 7.64 mmol), following General Procedure A, the product was purified by flash hromatography on silica (hexanes—0.25% Et$_2$O/hexanes) to afford 1 h (1.45 g, 4.65 mmol, 73%) as a colorless oil.

Rf: 0.65 (1% EthOAc/hexanes).

1H NMR (400 MHz, CDCl3): δ 7.62-7.58 (m, 2H), 7.52-7.48 (m, 2H), 5.91 (ddt, J=16.9, 10.0, 8.1 Hz, 1H), 5.00 (ddt, J=16.9, 2.1, 1.2 Hz, 1H), 4.90 (ddt, J=10.0, 2.1, 1.1 Hz, 1H), 4.62 (s, 2H), 1.79 (dt, J=8.1, 1.3 Hz, 2H), 1.09 (td, J=5.0, 4.5, 2.0 Hz, 17H).

13C NMR (101 MHz, CDCl3): δ 134.17, 132.22, 132.16, 132.13, 127.96, 118.52, 114.32, 111.83, 92.54, 83.34, 52.52, 18.87, 17.56, 17.54, 12.64.

IR (neat, cm-1): 2943, 2866, 2229, 1738, 1630, 1605, 1500, 1463, 1369, 1261, 1160, 1088, 994, 961,932,882,839,776,751,659,617,554.

HRMS (C+, m/z): calculated for C19H26NOSi [M+H]+ 312.178986, found 312.178368.

Methyl 4-(3-((allyldiisopropylsilyl)oxy)prop-1-yn-1-yl)benzoate (1i)

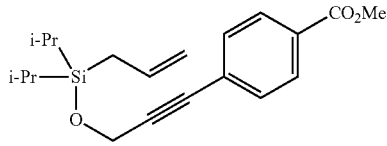 [SMILES: C=CC[Si](OCC#Cc1ccc(C(=O)OC)cc1)(C(C)C)C(C)C]

Prepared from methyl 4-(3-hydroxyprop-1-yn-1-yl)benzoate (S6) (1.0 g, 5.26 mmol) and allylchlorodiisopropylsilane (1.20 g, 6.31 mmol), following General Procedure A, the product was purified by flash chromatography on silica (hexanes—0.25% Et$_2$O/hexanes) to afford 1i (1.41 g, 4.09 mmol, 78%) as a colorless oil.

Rf: 0.55 (1% EthOAc/hexanes).

1H NMR (400 MHz, CDCl3): δ 7.98-7.94 (m, 2H), 7.48-7.44 (m, 2H), 5.91 (ddt, J=17.0, 10.1, 8.1 Hz, 1H), 4.99 (ddt, J=16.9, 2.2, 1.6 Hz, 1H), 4.89 (ddt, J=10.1, 2.2, 1.1 Hz, 1H), 4.60 (s, 2H), 3.89 (s, 3H), 1.79 (dt, J=8.1, 1.3 Hz, 2H), 1.10-1.06 (m, 16H).

13C NMR (101 MHz, CDCl3): δ 166.49, 134.21, 131.54, 129.67, 129.51, 129.48, 127.69, 114.17, 90.95, 84.15, 52.52, 52.23, 18.86, 17.52, 17.50, 12.62.

IR (neat, cm-1): 2945, 2866, 1725, 1630, 1606, 1506, 1463, 1436, 1406, 1367, 1307, 1272, 1192, 1176,1090,1019, 993,966,932,882,857,827,768,738,695,659,620,527.

HRMS (C+, m/z): calculated for C19H29O2Si [M+H]+ 317.19313, found 317.19334.

Allyldiisopropyl((3-(4-(trifluoromethyl)phenyl)prop-2-yn-1-yl)oxy)silane (1j)

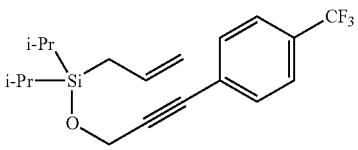 [SMILES: C=CC[Si](OCC#Cc1ccc(C(F)(F)F)cc1)(C(C)C)C(C)C]

Prepared from 3-(4-(trifluoromethyl)phenyl)prop-2-yn-1-ol (S7) (0.500 g, 2.50 mmol) and allylchlorodiisopropylsilane (0.572 g, 3.0 mmol), following General Procedure A, the product was purified by flash chromatography on silica (hexanes—0.25% Et$_2$O/hexanes) to afford 1j (0.647 g, 1.83 mmol, 73%) as a colorless oil.

Rf: 0.7 (1% EthOAc/hexanes)

1H NMR (400 MHz, CDCl3): δ 7.59-7.50 (m, 5H), 5.93 (ddt, J=17.0, 10.0, 8.0 Hz, 1H), 5.01 (ddt, J=17.0, 2.2, 1.2 Hz, 1H), 4.91 (ddt, J=10.0, 2.2, 1.1 Hz, 1H), 4.62 (s, 2H), 1.81 (dt, J=8.0, 1.3 Hz, 2H), 1.12-1.08 (m, 16H).

13C NMR (101 MHz, CDCl3): δ 134.29, 131.96, 130.68, 130.35, 130.03, 129.71, 125.42, 125.40, 125.38, 125.34, 125.31, 114.26, 90.50, 83.63, 52.56, 18.93, 17.58, 17.56, 12.69. (1JC-F=130.68, 130.35.130.03, 129.71)

IR (neat, cm-1): 2945, 2867, 1630, 1617, 1463, 1405, 1367, 1322, 1264, 1167, 1128, 1104, 1065, 1018,995,964, 932,897,882,842,776,740,713,659,619,597,521.

HRMS (C+, m/z): calculated for C19H26F3OSi [M+H]+ 355.16995, found 355.17023.

Allyldiisopropyl((6-methylhept-2-yn-4-yl)oxy)silane (5a)

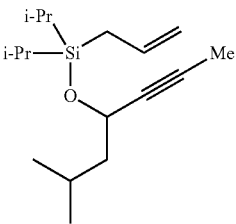 [SMILES: C=CC[Si](OC(C#CC)CC(C)C)(C(C)C)C(C)C]

Prepared from 6-methylhept-2-yn-4-ol (S8) (0.500 g, 3.97 mmol) and allylchlorodiisopropylsilane (0.909 g, 4.76 mmol), following General Procedure A, the product was purified by flash chromatography on silica (hexanes—0.25% Et$_2$O/hexanes) to afford 5a (0.813 g, 2.90 mmol, 73%) as a colorless oil.

Rf: 0.7 (1% EthOAc/hexanes).

1H NMR (400 MHz, CDCl3): δ 5.91 (ddt, J=16.9, 10.1, 8.0 Hz, 1H), 4.96 (ddt, J=17.0, 2.6, 1.3 Hz, 1H), 4.85 (ddt, J=10.1, 2.2, 1.1 Hz, 1H), 4.45 (tq, J=7.2, 3.9 Hz, 1H), 1.81 (dd, J=8.9, 2.2 Hz, 3H), 1.78 (dt, J=8.1, 1.3 Hz, 2H), 1.60-1.46 (m, 2H), 1.09-1.02 (m, 15H), 0.90 (dd, J=8.9, 6.6, 0.8 Hz, 6H).

13C NMR (101 MHz, CDCl3): δ 135.00, 113.67, 81.36, 80.25, 62.09, 48.22, 24.74, 22.87, 22.72, 19.51, 17.76, 17.67, 17.65, 13.03, 12.98, 3.65.

IR (neat, cm-1): 2957, 2867, 1630, 1465, 1386, 1159, 1064, 994, 883, 851, 747.

HRMS (C+, m/z): calculated for C17H33OSi [M+H]+ 281.22952, found 281.22961.

Allyl(hept-2-yn-4-yloxy)diisopropylsilane (5b)

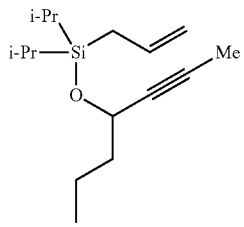 [SMILES: C=CC[Si](OC(C#CC)CCC)(C(C)C)C(C)C]

Prepared from hept-2-yn-4-ol (S9) (0.350 g, 3.12 mmol) and allylchlorodiisopropylsilane (0.714 g, 3.74 mmol), following General Procedure A, the product was purified by flash chromatography on silica (hexanes—0.25% Et$_2$O/hexanes) to afford 5b (0.607 g, 2.28 mmol, 73%) as a colorless oil.

Rf: 0.7 (1% EthOAc/hexanes).

1H NMR (400 MHz, CDCl3): δ 5.91 (ddt, J=17.0, 10.0, 8.1 Hz, 1H), 4.96 (ddt, J=16.9, 2.2, 1.5 Hz, 1H), 4.85 (ddt, J=10.0, 2.2, 1.2 Hz, 1H), 4.41 (tq, J=6.4, 2.1 Hz, 1H), 1.82 (d, J=2.1 Hz, 3H), 1.79-1.75 (m, 2H), 1.66-1.58 (m, 2H), 1.50-1.38 (m, 2H), 1.08-1.02 (m, 14H), 0.92 (t, J=7.4 Hz, 3H).

13C NMR (101 MHz, CDCl3): δ 135.02, 113.66, 81.26, 80.14, 63.30, 41.37, 19.43, 18.62, 17.74, 17.65, 17.63, 14.02, 12.98, 12.92, 3.67.

IR (neat, cm-1): 2963, 2865, 2946, 1631, 1464, 1390, 1348, 1157, 1110, 1065, 1038, 883, 762.

HRMS (C+, m/z): calculated for C16H30OSi [M+] 266,206594, found 266.206481.

Allyldiisopropyl((5-methyl-1-phenylhex-1-yn-3-yl)oxy)silane (5c)

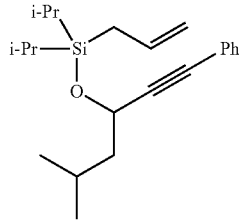 [SMILES: C=CC[Si](OC(C#Cc1ccccc1)CC(C)C)(C(C)C)C(C)C]

Prepared from 5-methyl-1-phenylhex-1-yn-3-ol (S10) (0.500 g, 2.66 mmol) and allylchlorodiisopropylsilane (0.608 g, 3.19 mmol), following General Procedure A, the product was purified by flash chromatography on silica (hexanes—0.25% Et$_2$O/hexanes) to afford 5c (0.729 g, 2.13 mmol, 81%) as a colorless oil.

Rf: 0.7 (1% EthOAc/hexanes).

1H NMR (400 MHz, CDCl3): δ 7.45-7.39 (m, 2H), 7.34-7.28 (m, 3H), 5.96 (ddt, J=16.9, 10.1, 8.1 Hz, 1H), 4.99 (ddt, J=16.9, 2.2, 1.5 Hz, 1H), 4.88 (ddt, J=10.0, 2.2, 1.2 Hz, 1H), 4.50 (d, J=5.3 Hz, 1H), 1.96 (pd, J=6.8, 5.3 Hz, 1H), 1.85 (dq, J=8.2, 1.4 Hz, 2H), 1.14-1.02 (m, 18H).

13C NMR (101 MHz, CDCl3): δ 134.96, 131.64, 128.39, 128.17, 123.43, 113.79, 90.11, 85.03, 69.04, 35.78, 19.52, 18.36, 17.82, 17.80, 17.74, 17.72, 13.11, 13.04.

IR (neat, cm-1): 2956, 2867, 1630, 1492, 1462, 1084, 754, 880.

HRMS (C+, m/z): calculated for C22H35OSi [M+H]+ 343.24517, found 343.24537.

Allyl((1,3-diphenylprop-2-yn-1-yl)oxy)diisopropylsilane (5d)

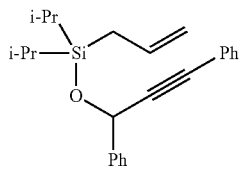 [SMILES: C=CC[Si](OC(C#Cc1ccccc1)c1ccccc1)(C(C)C)C(C)C]

Prepared from 1,3-diphenylprop-2-yn-1-ol (S11) (0.500 g, 2.40 mmol) and allylchlorodiisopropylsilane (0.550 g, 2.88 mmol), following General Procedure A, the product was purified by flash chromatography on silica (hexanes—0.25% Et$_2$O/hexanes) to afford 5d (0.731 g, 2.02 mmol, 84%) as a colorless oil.

Rf: 0.7 (1% EtOAc/hexanes).

1H NMR (400 MHz, CDCl3): δ 7.60-7.56 (m, 2H), 7.46-7.35 (m, 4H), 7.34-7.28 (m, 1H), 5.94 (ddt, J=16.5, 10.0, 8.1 Hz, 1H), 5.82 (s, 1H), 4.99 (ddt, J=16.9, 2.2, 1.5 Hz, 1H), 4.88 (ddt, J=10.0, 2.1, 1.0 Hz, 1H), 1.89 (dt, J=8.1, 1.3 Hz, 3H), 1.28-1.05 (m, 16H).

13C NMR (101 MHz, CDCl3): δ 141.90, 134.60, 131.72, 128.46, 128.39, 127.83, 126.25, 122.99, 114.13, 90.34, 85.72, 65.41, 19.42, 17.75, 17.72, 17.70, 13.00, 12.98.

IR (neat, cm-1): 3073, 2944, 2867, 1694, 1630, 1599, 1492, 1451, 1273, 1060, 885, 755, 692.

HRMS (C+, m/z): calculated for C24H31OSi [M+H]+ 363.21387, found 363.21418.

Allyl((1,4-diphenylbut-3-yn-2-yl)oxy)diisopropylsilane (5e)

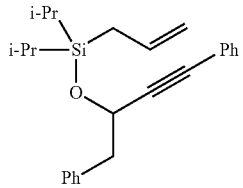 [SMILES: C=CC[Si](OC(C#Cc1ccccc1)Cc1ccccc1)(C(C)C)C(C)C]

Prepared from 1,4-diphenylbut-3-yn-2-ol (S12) (1.0 g, 4.5 mmol) and allylchlorodiisopropylsilane (1.03 g, 5.4 mmol), following General Procedure A, the product was purified by flash chromatography on silica (hexanes—0.25% Et$_2$O/hexanes) to afford 5e (1.37 g, 3.64 mmol, 81%) as a colorless oil.

Rf: 0.7 (1% EtOAc/hexanes).

1H NMR (400 MHz, CDCl3): δ 7.39-7.21 (m, 12H), 5.83 (ddt, J=17.0, 10.0, 8.1 Hz, 1H), 4.93 (ddt, J=16.9, 2.2, 1.5 Hz, 1H), 4.84 (ddt, 1H), 4.81 (d, J=6.6 Hz, 1H), 3.07 (dd, J=7.0, 0.4 Hz, 2H), 1.71 (ddt, J=8.1, 5.4, 1.3 Hz, 2H), 1.07-0.96 (m, 16H).

13C NMR (101 MHz, CDCl3): δ 137.57, 134.74, 131.57, 130.17, 128.39, 128.32, 128.19, 126.70, 123.09, 113.88, 90.66, 85.24, 65.01, 45.47, 19.25, 17.63, 17.58, 12.89, 12.85.

IR (neat, cm-1): 3032, 2944, 2866, 1630, 1490, 1463, 1342, 1266, 1159, 1083, 993, 882, 754, 690. HRMS (C+, m/z): calculated for C25H33OSi [M+H]+ 377.22952, found 377.22973.

Allyl((1,5-diphenylpent-1-yn-3-yl)oxy)diisopropylsilane (5f)

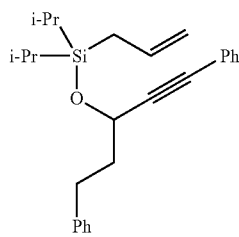 [SMILES: C=CC[Si](OC(C#Cc1ccccc1)CCc1ccccc1)(C(C)C)C(C)C]

Prepared from 1,5-diphenylpent-1-yn-3-ol (S13) (0.750 g, 3.17 mmol) and allylchlorodiisopropylsilane (0.727 g, 3.81 mmol), following General Procedure A, the product was purified by flash chromatography on silica (hexanes—0.25% Et$_2$O/hexanes) to afford 5f (1.02 g, 2.60 mmol, 82%) as a colorless oil.

Rf: 0.7 (1% EtOAc/hexanes).

1H NMR (400 MHz, CDCl3): δ 7.47-7.38 (m, 2H), 7.35-7.15 (m, 8H), 5.93 (ddt, J=17.0, 10.1, 2.0 Hz, 1H), 4.97 (ddt, J=16.9, 3.7, 2.2 Hz, 1H), 4.87 (ddt, J=10.0, 2.1, 1.0 Hz, 1H), 4.72 (td, J=6.3, 1.9 Hz, 1H), 2.90-2.83 (m, 2H), 2.16-2.07 (m, 2H), 1.85-1.80 (m, 2H), 1.14-1.05 (m, 14H).

13C NMR (101 MHz, CDCl3): δ 141.92, 134.76, 131.66, 128.64, 128.52, 128.43, 128.34, 125.99, 123.16, 113.93, 90.77, 84.79, 63.11, 40.56, 31.63, 19.41, 17.77, 17.72, 17.69, 13.02, 12.96.

IR (neat, cm-1): 3027, 2943, 2865, 1630, 1602, 1490, 1462, 1340, 1159, 1090, 991, 882, 843, 754, 690.

HRMS (C+, m/z): calculated for C26H35OSi [M+H]+ 391.24517, found 391.24552.

Allyldiisopropyl((1-phenylhex-5-en-1-yn-3-yl)oxy)silane (5 g)

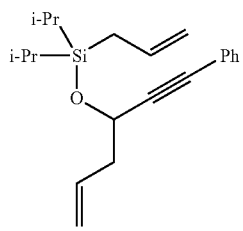 [SMILES: C=CCC(C#Cc1ccccc1)O[Si](CC=C)(C(C)C)C(C)C]

Prepared from 1-phenylhex-5-en-1-yn-3-ol (S14) (2.5 g, 14.5 mmol) and allylchlorodiisopropylsilane (3.33 g, 17.42 mmol), following General Procedure A, the product was purified by flash chromatography on silica (hexanes—0.25% Et$_2$O/hexanes) to afford 5 g (3.79 g, 11.6 mmol, 80%) as a colorless oil.

Rf: 0.8 (1% EtOAc/hexanes).

1H NMR (400 MHz, CDCl3): δ 7.45-7.40 (m, 2H), 7.34-7.29 (m, 3H), 6.03-5.90 (m, 2H), 5.23-5.13 (m, 2H), 5.01 (ddt, J=16.9, 2.3, 1.2 Hz, 1H), 4.90 (dt, J=10.1, 2.2, 1.2 Hz, 1H), 4.73 (dt, J=6.4, 1.1 Hz, 1H), 2.56 (dt, J=7.3, 2.3 Hz, 2H), 1.85 (dt, J=8.0, 1.3 Hz, 2H), 1.15-1.08 (m, 13H).

13C NMR (101 MHz, CDCl3): δ 134.73, 134.07, 131.67, 128.38, 128.30, 123.16, 117.87, 113.95, 90.62, 84.84, 63.54, 43.51, 19.38, 17.73, 17.67, 17.65, 12.98, 12.93.

IR (neat, cm-1): 3079, 2943, 2866, 1630, 1490, 1463, 1342, 1159, 1084, 993, 914, 882, 754, 689.

HRMS (C+, m/z): calculated for C21H31OSi [M+H]+ 327.21387, found 327.21409.

Allyldiisopropyl((I-phenylhex-1-yn-3-yl)oxy)silane (5 h)

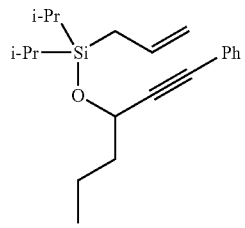 [SMILES: C=CC[Si](OC(C#Cc1ccccc1)CCC)(C(C)C)C(C)C]

Prepared from 1-phenylhex-1-yn-3-ol (S15) (0.750, 4.3 mmol) and allylchlorodiisopropylsilane (0.985 g, 5.17 mmol), following General Procedure A, the product was purified by flash chromatography on silica (hexanes—0.25% Et$_2$O/hexanes) to afford 5 h (1.34 g, 4.08 mmol, 79%) as a colorless oil.

Rf: 0.7 (1% EtOAc/hexanes).

1H NMR (400 MHz, CDCl3): δ 7.43-7.38 (m, 2H), 7.32-7.28 (m, 3H), 5.94 (ddt, J=16.9, 10.0, 8.1 Hz, 1H), 4.98 (ddt, J=16.9, 2.1, 1.5 Hz, 1H), 4.87 (ddt, J=10.0, 2.2, 1.1 Hz, 1H), 4.68 (t, J=6.4 Hz, 1H), 1.82 (dt, J=8.1, 1.4 Hz, 2H), 1.79-1.72 (m, 2H), 1.58-1.47 (m, 2H), 1.16-1.03 (m, 16H), 0.96 (t, J=7.4 Hz, 4H).

13C NMR (101 MHz, CDCl3): δ 134.86, 131.64, 128.38, 128.20, 123.34, 113.85, 91.31, 84.30, 63.58, 41.13, 19.44, 18.68, 17.86, 17.77, 17.71, 17.70, 17.68, 14.05, 13.03, 12.97.

IR (neat, cm-1): 2960, 2942, 2866, 1630, 1490, 1463, 1341, 1111, 1082, 1038, 994, 882, 754, 689. HRMS (C+, m/z): calculated for C21H33OSi [M+H]+ 329.22952, found 329.22952.

Allyldiisopropyl((1-phenyloct-7-en-1-yn-3-yl)oxy)silane (5i)

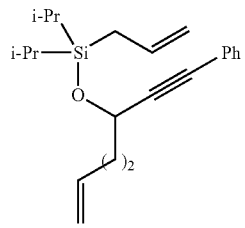

Prepared from 1-phenyloct-7-en-1-yn-3-ol (S16) (0.800 g, 3.99 mmol) and allylchlorodiisopropylsilane (0.915 g, 4.79 mmol), following General Procedure A, the product was purified by flash chromatography on silica (hexanes—10% EthOAc/hexanes) to afford 5i, (1.03 g, 2.91 mmol, 73%) as a white solid.

Rf: 0.5 (10% EthOAc/hexanes).

1H NMR (400 MHz, CDCl3): δ 7.43-7.38 (m, 2H), 7.34-7.28 (m, 4H), 6.00-5.78 (m, 2H), 5.06 (dt, J=2.2, 1.6 Hz, 1H), 5.01 (ddt, J=5.2, 2.2, 1.5 Hz, 1H), 4.98 (dt, J=2.2, 1.2 Hz, 1H), 4.96 (td, J=1.3, 0.6 Hz, 1H), 4.87 (ddt, J=10.0, 2.2, 1.1 Hz, 1H), 4.69 (t, J=6.3 Hz, 1H), 2.12 (tdd, J=14.1, 6.9, 1.4 Hz, 2H), 1.82 (dt, J=8.1, 1.3 Hz, 2H), 1.81-1.75 (m, 2H), 1.66-1.57 (m, 2H), 1.13-1.05 (m, 15H).

13C NMR (101 MHz, CDCl3): δ 138.83, 134.83, 131.64, 128.40, 128.24, 123.27, 114.75, 113.89, 91.14, 84.41, 63.62, 38.34, 33.58, 24.62, 19.42, 17.77, 17.70, 17.69, 13.01, 12.96.

IR (neat, cm-1): 3078, 2943, 2866, 1630, 1490, 1461, 1091, 882, 754.

HRMS (C+, m/z): calculated for C24H35OSi [M+H]+ 355.24517, found 355.24503.

Allyldiisopropyl((1-phenyloct-1-yn-3-yl)oxy)silane (5j)

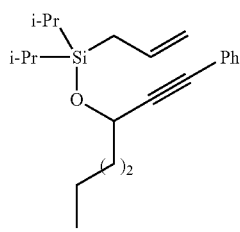

Prepared from 1-phenyloct-1-yn-3-ol (S17) (0.600 g, 2.97 mmol) and allylchlorodiisopropylsilane (0.679 g, 3.56 mmol), following General Procedure A, the product was purified by flash chromatography on silica (hexanes—0.25% Et2O/hexanes) to afford 5j (0.783 mg, 2.20 mmol, 74%) as a colorless oil.

Rf: 0.7 (1% EtOAc/hexanes).

1H NMR (400 MHz, CDCl3): δ 7.47-7.42 (m, 2H), 7.35-7.30 (m, 2H), 5.99 (ddt, J=16.9, 8.6, 1.5 Hz, 1H), 5.03 (dt, J=16.9, 1.8 Hz, 1H), 4.92 (dt, J=10.1, 1.8 Hz, 1H), 4.72 (td, J=6.5, 1.6 Hz, 1H), 1.87 (dd, J=8.1, 1.5 Hz, 2H), 1.85-1.78 (m, 2H), 1.61-1.51 (m, 1H), 1.44-1.34 (m, 4H), 1.19-1.09 (m, 14H), 0.95 (d, J=7.0 Hz, 3H).

13C NMR (101 MHz, CDCl3): δ 134.79, 131.60, 131.59, 128.35, 128.16, 123.32, 113.84, 91.30, 84.30, 63.78, 38.91, 31.69, 25.03, 22.76, 19.41, 17.74, 17.69, 17.67, 17.66, 14.16, 13.00, 12.95. IR (neat, cm-1): 2943, 2865, 1630, 1490, 1464, 1382, 1340, 1159, 1088, 1067, 1041, 993, 882, 754, 689, 658.

HRMS (C+, m/z): calculated for C23H37OSi [M+H]+ 357.26082, found 357.26109.

Allyl(hept-1-en-5-yn-4-yloxy)diisopropylsilane (5k)

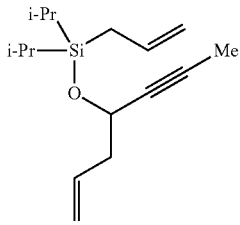 [SMILES: C=CCC(C#CC)O[Si](CC=C)(C(C)C)C(C)C]

Prepared from hept-1-en-5-yn-4-ol (S18) (0.500 g, 4.54 mmol) and allylchlorodiisopropylsilane (1.04 g, 5.45 mmol), following General Procedure A, the product was purified by flash chromatography on silica (hexanes—0.25% Et2O/hexanes) to afford 5k (0.985 g, 3.72 mmol, 82%) as a colorless oil.

Rf: 0.7 (1% EtOAc/hexanes).

1H NMR (400 MHz, CDCl3): δ 5.96-5.82 (m, 2H), 5.14-5.06 (m, 2H), 4.96 (ddt, J=16.9, 2.2, 1.5 Hz, 1H), 4.86 (ddt, J=10.0, 2.2, 1.1 Hz, 1H), 4.43 (tq, J=6.3, 2.1 Hz, 1H), 2.40 (ddt, J=6.8, 1.3 Hz, 7H), 1.83 (d, J=2.1 Hz, 3H), 1.77 (dt, J=8.1, 1.3 Hz, 2H), 1.08-1.02 (m, 15H).

13C NMR (101 MHz, CDCl3): δ 134.75, 134.73, 134.28, 117.45, 117.43, 113.73, 80.60, 63.20, 43.67, 19.32, 17.64, 17.55, 17.53, 12.91, 12.84, 3.56.

IR (neat, cm-1): 3077, 2943, 2867, 1630, 1464, 1343, 1157, 1084, 991, 914, 882, 748.

HRMS (C+, m/z): calculated for C16H29OSi [M+H]+ 265.19822, found 265.19843.

C. Pauson-Khand Reactions of Siloxy-Tethered 1,7-enynes

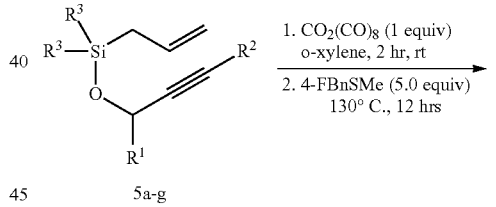

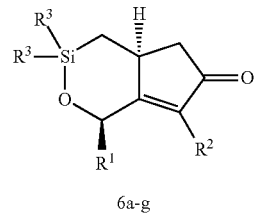

General Procedure B

To a flame dried vial equipped with a magnetic stir-bar, under N2, the enyne (0.334, 1.0 equiv.), dicobalt octacarbonyl (119.9 mg, 0.3507 mmol, 1.05 equiv) in o-xylene (3.4 mL, 0.1M) was stirred for 2 h at room temperature (23° C.). (4-fluorobenzyl)(methyl)sulfane (260.89 mg, 1.67 mmol, 5.0 equiv) was added and the reaction mixture was allowed to stir at 130° C. for 12 h. After 12 h, the solvent was removed under reduced pressure and the crude reaction mixture was purified by flash chromatography on silica (hexanes—5% EthOAc/hexanes) to afford the desired cyclopentenone.

Primary PKRS:

3,3-Diisopropyl-7-methyl-3,4,4a,5 tetrahydrocyclopenta[d][1,2]oxasilin-6(1H)-one (2a)

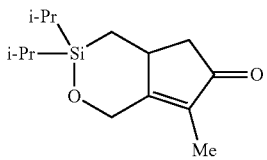 [SMILES: CC1=C2CO[Si](C(C)C)(C(C)C)CC2CC1=O]

Following General Procedure B, the product was purified by flash chromatography on silica (hexanes-5% EthOAc/hexanes) to afford 2a (68.3 mg, 0.271 mmol, 81%) as a colorless oil.

Rf: 0.4 (10% EtOAc/hexanes).

1H NMR (400 MHz, CDCl3): δ 4.92 (d, J=17.4 Hz, 1H), 4.77 (d, J=17.6 Hz, 1H), 3.06 (dddq, J=13.5, 7.3, 3.7, 1.8 Hz, 1H), 2.76 (ddd, J=18.8, 6.2, 1.0 Hz, 1H), 2.07 (dt, J=18.9, 0.9 Hz, 1H), 1.65-1.63 (m, 1H), 1.30 (dd, J=14.5, 5.3 Hz, 1H), 1.09 (tdd, J=4.8, 3.4, 2.0 Hz, 7H), 0.98 (ddt, J=11.2, 4.3, 1.9 Hz, 8H), 0.54 (dd, J=14.5, 13.5 Hz, 1H).

13C NMR (101 MHz, CDCl3): δ 208.09, 172.78, 133.49, 63.38, 45.50, 35.59, 17.38, 17.19, 17.12, 16.98, 14.91, 13.04, 12.70, 7.61.

IR (neat, cm-1): 2940, 2921, 2892, 2865, 1702, 1649, 1463, 1409, 1382, 1329, 1292, 1205, 1163, 1120, 1048,995, 880, 800,759,727.

HRMS (CI+, m/z): calculated for C14H25O2Si [M+H]+ 253.1612483, found 253.16197.

3,3-Diisopropyl-3,4,4a,5-tetrahydrocyclopenta[d][1,2]oxasilin-6(1H)-one (2b)

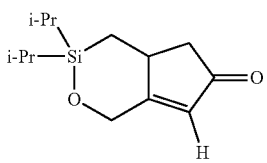 [SMILES: CC(C)[Si]1(C(C)C)CC2CC(=O)C=C2CO1]

Following General Procedure B, the product was purified by flash chromatography on silica (hexanes-5% EthOAc/hexanes) to afford 2b (19.9 mg, 0.084 mmol, 25%) as a colorless oil.

Rf: 0.5 (10% EtOAc/hexanes).

1H NMR (400 MHz, CDCl3): δ 5.90 (dq, J=1.7, 0.9 Hz, 1H), 4.91 (dt, J=16.9, 1.7 Hz, 1H), 4.81 (dt, J=16.8, 1.6 Hz, 1H), 3.16 (dtt, J=13.5, 5.8, 1.6 Hz, 1H), 2.78 (ddd, J=18.7, 6.3, 0.8 Hz, 1H), 2.13-2.07 (m, 1H), 1.33 (dd, J=14.5, 5.6 Hz, 1H), 1.25 (s, 2H), 1.11-1.08 (m, 8H), 1.01-0.95 (m, 6H), 0.61 (dd, J=14.5, 13.5 Hz, 1H) 13C NMR (101 MHz, CDCl3): δ 208.21, 181.53, 126.90, 64.40, 46.54, 37.55, 17.46, 17.29, 17.12, 17.01, 15.17, 12.87, 12.78.

IR (neat, cm-1): 2924, 2865, 1714, 1619, 1463, 1409, 1362, 1232, 1175, 1150, 1084, 1002, 917, 881, 771, 752, 719.

HRMS (CI+, m/z): calculated for C13H23O2Si [M+H]+ 239.14618, found 239.14634.

3,3-Diisopropyl-7-(trimethylsilyl)-3,4,4a,5 tetrahydrocyclopenta[d][1,2]oxasilin-6(1H)-one (2c)

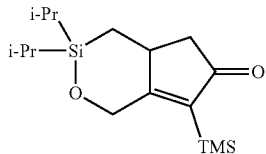 [SMILES: CC(C)[Si]1(C(C)C)CC2CC(=O)C([Si](C)(C)C)=C2CO1]

Following General Procedure B, the product was purified by flash chromatography on silica (hexanes-5% EthOAc/hexanes) to afford 2c (44.6 mg, 0.144 mmol, 43%) as a colorless oil.

Rf: 0.45 (10% EtOAc/hexanes).

1H NMR (400 MHz, CDCl3): δ 5.02 (dt, J=17.8, 1.2 Hz, 1H), 4.86 (dt, J=17.9, 1.2 Hz, 1H), 3.12 (ddddd, J=11.2, 5.3, 4.2, 3.2, 1.5 Hz, 1H), 2.70 (ddd, J=18.5, 6.6, 1.0 Hz, 1H), 2.04 (dd, J=18.3, 2.1 Hz, 1H), 1.30 (dd, J=14.6, 5.3 Hz, 1H), 1.10-1.05 (m, 8H), 1.03-0.94 (m, 8H), 0.57 (dd, J=14.7, 13.6 Hz, 1H), 0.19 (s, 8H).

13C NMR (101 MHz, CDCl3): δ 212.11, 189.37, 136.91, 65.38, 46.60, 38.86, 17.30, 17.23, 17.12, 17.05, 14.90, 13.12, 12.67, –0.55.

IR (neat, cm-1): 2924, 2866, 1693, 1585, 1462, 1408, 1248, 1098, 936, 881, 838, 750.8, 726.

HRMS (CI+, m/z): calculated for C16H3102Si2 [M+H]+ 310.179900, found 310.178437.

3,3,7-Triisopropyl-3,4,4a,5-tetrahydrocyclopenta[d][1,2]oxasilin-6(1H)-one (2d)

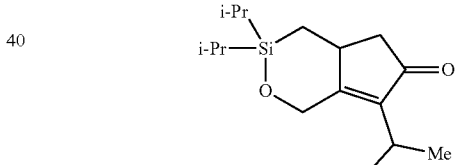

Following General Procedure B, the product was purified by flash chromatography on silica (hexanes-5% EthOAc/hexanes) to afford 2d (69.3 mg, 0.247 mmol, 74%) as a colorless oil.

Rf: 0.4 (10% EthOAc/hexanes).

1H NMR (400 MHz, CDCl3): δ 5.03 (dt, J=17.3, 1.2 Hz, 1H), 4.81 (dt, J=17.3, 1.4 Hz, 1H), 3.01 (dddt, J=13.3, 6.9, 5.3, 1.7 Hz, 1H), 2.75-2.64 (m, 2H), 2.03 (dt, J=18.8, 0.8 Hz, 1H), 1.29 (dd, J=14.6, 5.2 Hz, 1H), 1.12 (dd, J=7.1, 0.9 Hz, 6H), 1.10-1.06 (m, 7H), 1.04-0.94 (m, 7H), 0.52 (dd, J=14.6, 13.5 Hz, 1H).

13C NMR (101 MHz, CDCl3): δ 207.78, 172.28, 142.31, 63.36, 45.95, 35.24, 24.50, 20.50, 20.11, 17.31, 17.16, 17.11, 17.01, 15.02, 13.06, 12.67.

IR (neat, cm-1): 2929, 2893, 2865, 1699, 1635, 1462, 1408, 1362, 1334, 1294, 1154, 1124, 1089, 992,917, 881, 802,761,729.

HRMS (CI+, m/z): calculated for C16H2902Si [M+H]+ 281.19313, found 281.19330.

3,3-Diisopropyl-7-((methoxymethoxy)methyl)-3,4, 4a,5-tetrahydrocyclopenta[d][1,2]oxasilin-6(1H)-one (2e)

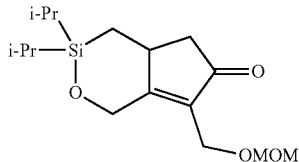

Following General Procedure B, the product was purified by flash chromatography on silica (hexanes–5% EthOAc/hexanes) to afford 2e (69.9 mg, 0.224 mmol, 67%) as a colorless oil.

Rf: 0.4 (10% EtOAc/hexanes).

1H NMR (400 MHz, CDCl3): δ 5.10 (d, J=18.0 Hz, 1H), 4.91 (d, J=18.1 Hz, 1H), 4.59 (s, 2H), 4.20 (d, J=11.8 Hz, 1H), 4.13 (d, J=12.1 Hz, 1H), 3.34 (s, 3H), 3.17-3.07 (m, 1H), 2.78 (ddd, J=18.8, 6.3, 1.0 Hz, 1H), 2.09 (dd, J=18.7, 1.9 Hz, 1H), 1.31 (dd, J=14.6, 5.4 Hz, 1H), 1.10-1.05 (m, 7H), 1.01-0.94 (m, 7H), 0.58 (dd, J=14.6, 13.6 Hz, 1H).

13C NMR (101 MHz, CDCl3): δ 206.33, 178.33, 133.77, 96.38, 63.22, 58.29, 55.50, 45.62, 36.08, 17.37, 17.18, 17.15, 16.99, 14.66, 13.02, 12.66.

IR (neat, cm-1): 2927, 2893, 2865, 1702, 1648, 1463, 1409, 1291, 1210, 1151, 1103, 1039, 1021, 919, 881, 802, 763, 733.

HRMS (CI+, m/z): calculated for C16H27O2Si [M−H] 311.16731, found 311.16775.

3,3-Diisopropyl-7-phenyl-3,4,4a,5-tetrahydrocyclopenta[d][1,2]oxasilin-6(1H)-one (2f)

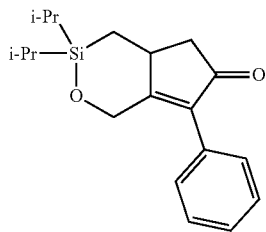 [SMILES: CC(C)[Si]1(C(C)C)CC2CC(=O)C(c3ccccc3)=C2CO1]

Following General Procedure B, the product was purified by flash chromatography on silica (hexanes–5% EthOAc/hexanes) to afford 2f (83.0 mg, 0.264 mmol, 79%) as a colorless oil.

Rf: 0.35 (10% EthOAc/hexanes).

1H NMR (400 MHz, CDCl3): δ 7.43-7.37 (m, 2H), 7.35-7.29 (m, 1H), 7.25-7.21 (m, 2H), 5.02 (dt, J=17.1, 1.1 Hz, 1H), 4.92 (dt, J=17.1, 1.7 Hz, 1H), 3.28-3.19 (m, 1H), 2.94 (ddd, J=18.8, 6.4, 0.9 Hz, 1H), 2.27 (dd, J=18.9, 1.9 Hz, 1H), 1.41 (dd, J=14.5, 5.4 Hz, 1H), 1.25 (s, 1H), 1.13 (q, J=1.4 Hz, 4H), 1.00-0.95 (m, 6H), 0.68 (dd, J=14.5, 13.4 Hz, 1H).

13C NMR (101 MHz, CDCl3): δ 206.12, 174.43, 137.55, 130.88, 128.92, 128.45, 128.13, 63.78, 46.21, 35.79, 17.43, 17.25, 17.13, 16.99, 15.54, 12.89, 12.72.

IR (neat, cm-1): 2924, 2864, 1695, 1623, 1463, 1294, 1092, 1009, 982, 884, 764, 706.

HRMS (CI+, m/z): calculated for C19H27O2Si [M+H]+ 315.17762, found 315.17748.

3,3-Diisopropyl-7-(4-methoxyphenyl)-3,4,4a,5-tetrahydrocyclopenta[d][1,2]oxasilin-6(1H)-one (2 g)

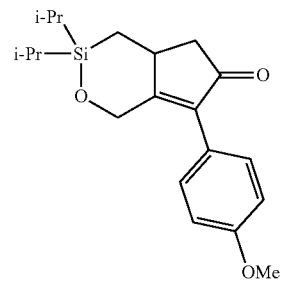 [SMILES: COc1ccc(C2=C3CO[Si](C(C)C)(C(C)C)CC3CC2=O)cc1]

Following General Procedure B, the product was purified by flash chromatography on silica (hexanes–5% EthOAc/hexanes) to afford 2 g (74.8 mg, 0.217 mmol, 65%) as a colorless oil.

Rf: 0.3 (10% EtOAchexanes).

1H NMR (400 MHz, CDCl3): δ 7.21-7.16 (m, 2H), 6.96-6.90 (m, 2H), 5.03 (dt, J=17.1, 1.1 Hz, 1H), 4.92 (dt, J=17.0, 1.7 Hz, 1H), 3.82 (s, 3H), 3.26-3.17 (m, 1H), 2.91 (ddd, J=18.8, 6.4, 0.9 Hz, 1H), 2.24 (dd, J=18.7, 1.9 Hz, 1H), 1.40 (dd, J=14.5, 5.4 Hz, 1H), 1.26 (s, 1H), 1.12 (qd, J=4.0, 3.2, 1.5 Hz, 7H), 1.00-0.93 (m, 7H), 0.66 (dd, J=14.5, 13.4 Hz, 1H).

13C NMR (101 MHz, CDCl3): δ 206.56, 173.41, 159.48, 137.04, 130.25, 123.22, 114.02, 63.96, 55.42, 46.27, 35.70, 17.48, 17.30, 17.18, 17.05, 15.63, 12.96, 12.79.

IR (neat, cm-1): 2925, 2864, 1699, 1606, 1510, 1462. 1289, 1247, 1177, 1095, 1032, 988, 915, 881, 827, 783, 761, HRMS (CI+, m/z): calculated for C20H29O3Si [M+H]+ 344.180943, found 344.180773.

4-(3,3-Diisopropyl-6-oxo-1,3,4,4a,5,6-hexahydrocyclopenta[d][1,2]oxasilin-7-yl)benzonitrile (2 h)

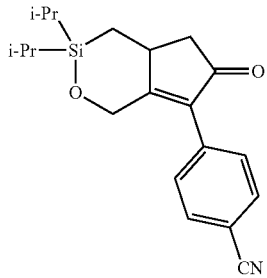 [SMILES: CC(C)[Si]1(C(C)C)CC2CC(=O)C(c3ccc(C#N)cc3)=C2CO1]

Following General Procedure B, the product was purified by flash chromatography on silica (hexanes—5% EthOAc/hexanes) to afford 2 h (81.6 mg, 0.240 mmol, 72%) as a colorless oil.

Rf: 0.3 (10% EtOAc/hexanes).

1H NMR (400 MHz, CDCl3): δ 7.68 (d, J=8.1 Hz, 2H), 7.35 (d, J=8.1 Hz, 2H), 4.94 (dd, J=20.1, 3.5 Hz, 2H), 3.26 (dt, J=13.1, 5.7 Hz, 1H), 2.94 (dd, J=19.0, 6.4 Hz, 1H), 2.28 (dd, J=18.9, 1.9 Hz, 1H), 1.43 (dd, J=14.6, 5.4 Hz, 1H), 1.24 (s, 1H), 1.11 (d, J=5.5 Hz, 6H), 0.96 (d, J=6.7 Hz, 7H), 0.68 (t, J=14.0 Hz, 1H).

13C NMR (101 MHz, CDCl3): δ 205.14, 176.75, 135.86, 135.70, 132.21, 129.65, 118.74, 111.82, 63.55, 46.06, 36.18, 29.80, 17.37, 17.19, 17.10, 16.96, 15.41, 12.84, 12.64.

IR (neat, cm-1): 2941, 2864, 2227, 1701, 1605, 1503, 1462, 1406, 1336, 1293, 1098, 989, 915, 881,829,759,735, 652,600,551,527,457.

HRMS (CI+, m/z): calculated for C20H26NO2Si [M+H]+ 339.165700, found 339.165458.

Methyl-4-(3,3-diisopropyl-6-oxo-1,3,4,4a,5,6-hexahydrocyclopenta[d][1,2]oxasilin-7-yl)benzoate (2i)

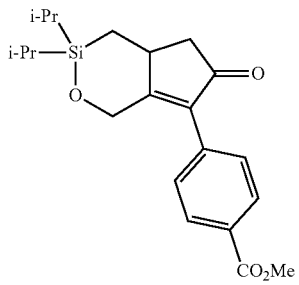 [SMILES: COC(=O)c1ccc(C2=C3CO[Si](C(C)C)(C(C)C)CC3CC2=O)cc1]

Following General Procedure B, the product was purified by flash chromatography on silica (hexanes—10% EthOAc/hexanes) to afford 21 (94.6 mg, 0.254 mmol, 76%) as a colorless oil.

Rf: 0.25 (10% EtOAc/hexanes).

1H NMR (400 MHz, CDCl3): δ 8.09-8.02 (m, 2H), 7.34-7.28 (m, 2H), 4.99 (dt, J=17.3, 1.1 Hz, 1H), 4.92 (dt, J=17.3, 1.6 Hz, 1H), 3.91 (s, 3H), 3.29-3.21 (m, 1H), 2.94 (ddd, J=18.9, 6.4, 0.8 Hz, 1H), 2.27 (dd, J=18.8, 2.0 Hz, 1H), 1.41 (dd, J=14.6, 5.4 Hz, 1H), 1.26 (d, J=8.0 Hz, 2H), 1.13-1.08 (m, 6H), 0.99-0.94 (m, 6H), 0.68 (dd, J=14.6, 13.4 Hz, 1H), 13C NMR (101 MHz, CDCl3): δ 205.57, 175.92, 166.85, 136.69, 135.60, 129.69, 128.96, 63.71, 52.30, 46.17, 36.05, 17.40, 17.23, 17.12, 16.99, 15.46, 12.89, 12.68.

IR (neat, cm-1): 2943, 2864, 1720, 1702, 1607, 1462, 1435, 1406, 1334, 1273, 1184, 1099, 989, 916,881,780,771, 704,649,591.

HRMS (CI+, m/z): calculated for C21H29O4Si [M+H]+ 372.176548, found 372.175688.

3,3-Diisopropyl-7-(4-(trifluoromethyl)phenyl)-3,4, 4a,5-tetrahydrocyclopenta[d][1,2]oxasilin-6(1H)-one (2j)

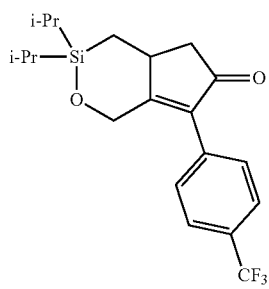 [SMILES: CC(C)[Si]1(C(C)C)CC2CC(=O)C(c3ccc(C(F)(F)F)cc3)=C2CO1]

Following General Procedure B, the product was purified by flash chromatography on silica (hexanes-5% EthOAc/hexanes) to afford 2j (98.4 mg, 0.257 mmol, 77%) as a colorless oil.

Rf: 0.3 (10% EthOAc/hexanes).

1H NMR (400 MHz, CDCl3): δ 7.65 (d, J=8.1 Hz, 2H), 7.35 (d, J=8.0 Hz, 2H), 4.99 (dt, J=17.3, 1.6 Hz, 1H), 4.93 (dd, J=17.3, 1.6 Hz, 1H), 3.31-3.22 (m, 1H), 2.95 (dd, J=18.9, 6.4 Hz, 1H), 2.28 (dd, J=18.9, 1.9 Hz, 1H), 1.43 (dd, J=14.6, 5.5 Hz, 1H), 1.20-1.05 (m, 7H), 1.03-0.89 (m, 7H), 0.68 (dd, J=14.6, 13.4 Hz, 1H).

13C NMR (101 MHz, CDCl3): δ δ 205.55, 176.10, 136.36, 134.62, 134.60, 130.64, 130.32, 130.00, 129.67, 129.31, 125.49, 125.46, 125.42, 125.38, 122.79, 63.62, 46.12, 36.09, 29.83, 17.40, 17.21, 17.11, 16.98, 15.46, 12.89, 12.70. (1JC-F=130.64, 130.32, 130.00, 129.67) IR (neat, cm-1): 2943, 2866, 1702, 1615, 1463, 1408, 1322, 1293, 1165, 1120, 1065, 1019, 989, 880,831,813,760,745, 728,683,649,604.

HRMS (CI+, m/z): calculated for C20H26F3O2Si [M+H]+ 382.156432, found 382.157593.

Secondary PKRS (1S,4aR)-1-isobutyl-3,3-diisopropyl-7-methyl-3,4, 4a,5-tetrahydrocyclopenta[d][1,2]oxasilin-6(1H)-one (6a)

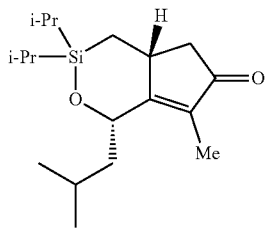 [SMILES: CC1=C2[C@@H](CC1=O)C[Si](C(C)C)(C(C)C)O[C@H]2CC(C)C]

Following General Procedure A, the product was purified by flash chromatography on silica (hexanes—10% EthOAc/hexanes) to afford 6c, d.r. 3:1 (31.1 mg, 0.100 mmol, 30%) as a white solid.

Rf: 0.4 (10% EthOAc/hexanes).

1H NMR (400 MHz, CDCl3): δ 5.00 (dd, J=10.1, 3.3 Hz, 1H), 3.07-2.97 (m, 1H), 2.70 (dd, J=18.8, 6.2 Hz, 1H), 2.06 (d, J=18.8 Hz, 1H), 1.99-1.88 (m, 1H), 1.64 (d, J=1.9 Hz, 3H), 1.32-1.11 (m, 2H), 1.04 (p, J=5.8 Hz, 6H), 1.00-0.88 (m, 12H), 0.44 (dd, J=14.5, 13.2 Hz, 1H).

13C NMR (101 MHz, CDCl3): δ 208.98, 177.70, 132.92, 70.53, 45.92, 45.67, 34.03, 24.41, 23.74, 21.57, 17.24, 17.14, 17.05, 17.02, 16.10, 13.40, 13.05, 8.02.

IR (neat, cm-1): 2925, 2866, 1703, 1647, 1464, 1383, 991, 880, 759.

HRMS (CI+, m/z): calculated for C18H33O2Si [M+H]+ 309.224984, found 309.226161.

(1S,4aR)-3,3-diisopropyl-7-methyl-1-propyl-3,4,4a, 5-tetrahydrocyclopenta[d][1,2]oxasilin-6(1H)-one (6b)

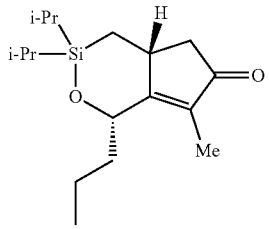

Following General Procedure A, the product was purified by flash chromatography on silica (hexanes—10% EthOAc/hexanes) to afford 6c, d.r. 4:1 (26.6 mg, 0.090 mmol, 27%) as a white solid.

Rf: 0.4 (10% EthOAc/hexanes).

1H NMR (400 MHz, CDCl3): 1H NMR (400 MHz, Chloroform-d) δ 4.97 (dd, J=8.4, 3.4 Hz, 1H), 3.01 (dtd, J=13.3, 5.8, 1.7 Hz, 1H), 2.72 (dd, J=18.8, 6.1 Hz, 1H), 2.07 (dd, J=18.9, 1.1 Hz, 1H), 1.66 (d, J=1.8 Hz, 4H), 1.55-1.39 (m, 2H), 1.29 (dd, J=14.5, 5.7 Hz, 1H), 1.09-1.00 (m, 9H), 0.98-0.89 (m, 11H), 0.45 (dd, J=14.5, 13.2 Hz, 1H).

13C NMR (101 MHz, CDCl3): δ 209.00, 177.23, 133.33, 72.03, 45.62, 39.28, 34.28, 18.54, 17.20, 17.07, 17.01, 16.98, 16.08, 14.01, 13.36, 13.03, 8.14.

IR (neat, cm-1): 2925, 2867, 1703, 1644, 1463, 1411, 1386, 1335, 1297, 1170, 1140, 1106, 1068, 1036,985, 881, 805,779,690.

HRMS (CI+, m/z): calculated for C17H31O2Si [M+H]+ 295.20878, found 295.20884.

(1S,4aR)-1-isobutyl-3,3-diisopropyl-7-phenyl-3,4,4a,5-tetrahydrocyclopenta[d][1,2]oxasilin-6(1H)-one
(6c)

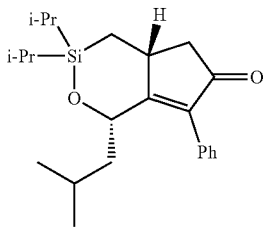 [SMILES: CC(C)C[C@@H]1O[Si](C(C)C)(C(C)C)C[C@@H]2CC(=O)C(c3ccccc3)=C21]

Following General Procedure A, the product was purified by flash chromatography on silica (hexanes—10% EthOAc/hexanes) to afford 6c, d.r. 4:1 (100.26 mg, 0.271 mmol, 81%) as a white solid.

Rf: 0.4 (10% EthOAc/hexanes).

1H NMR (400 MHz, CDCl3): δ 7.41-7.26 (m, 3H), 7.20-7.15 (m, 2H), 5.31 (d, J=11.3 Hz, 1H), 3.32-3.22 (m, 1H), 2.93 (ddd, J=18.6, 6.3, 1.2 Hz, 1H), 2.22 (dd, J=18.5, 2.9 Hz, 1H), 1.87-1.73 (m, 1H), 1.38-1.28 (m, 2H), 1.18-1.09 (m, 7H), 1.09-0.95 (m, 7H), 0.90 (ddd, J=13.7, 8.5, 6.5 Hz, 1H), 0.68 (d, J=6.8 Hz, 3H), 0.58 (d, J=6.5 Hz, 3H).

13C NMR (101 MHz, CDCl3): δ 205.83, 180.35, 137.95, 132.25, 128.95, 128.51, 127.94, 72.13, 46.06, 46.05, 36.78, 23.88, 23.43, 20.17, 18.15, 17.83, 17.26, 17.14, 15.56, 13.80, 12.66.

IR (neat, cm-1): 2953, 2866, 1702, 1466, 1143, 1131, 1085, 1017, 881, 755, 697.

HRMS (CI+, m/z): calculated for C23H35O2Si [M+H]+ 371.24008, found 371.24017.

(1S,4aR)-1-benzyl-3,3-diisopropyl-7-phenyl-3,4,4a,5-tetrahydrocyclopenta[d][1,2]oxasilin-6(1H)-one
(6e)

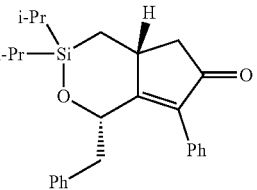

Following General Procedure A, the product was purified by flash chromatography on silica (hexanes—10% EthOAc/hexanes) to afford 6e, d.r. 13:1 (118.9 mg, 0.294 mmol, 88%) as a white solid.

Rf: 0.4 (10% EthOAc/hexanes).

1H NMR (400 MHz, CDCl3): δ 7.44-7.38 (m, 2H), 7.35-7.29 (m, 1H), 7.26-7.11 (m, 5H), 6.98-6.93 (m, 2H), 5.48 (dt, J=10.4, 1.8 Hz, 1H), 3.29 (ddt, J=13.8, 6.5, 2.6 Hz, 1H), 2.97 (ddd, J=18.7, 6.4, 1.0 Hz, 1H), 2.74 (dd, J=14.7, 2.5 Hz, 1H), 2.57 (dd, J=14.7, 10.5 Hz, 1H), 2.29 (dd, J=18.6, 2.7 Hz, 1H), 1.41 (dd, J=14.6, 4.5 Hz, 1H), 1.18-0.90 (m, 13H), 0.75 (t, J=14.4 Hz, 1H).

13C NMR (101 MHz, CDCl3): δ 206.23, 177.83, 138.81, 138.78, 132.34, 129.09, 128.93, 128.77, 128.28, 128.16, 126.26, 75.10, 46.20, 42.84, 37.22, 18.03, 17.72, 17.17, 17.15, 15.15, 14.67, 12.52. IR (neat, cm-1): 2939, 2863, 1594, 1497, 1455, 1686, 1096, 1054, 923, 883, 723, 758, 697. HRMS (CI+, m/z): calculated for C26H33O2Si [M+H]+ 405.22443, found 405.22429.

(1S,4aR)-3,3-diisopropyl-1-phenethyl-7-phenyl-3,4,4a,5-tetrahydrocyclopenta[d][1,2]oxasilin-6(1H)-one
(6f)

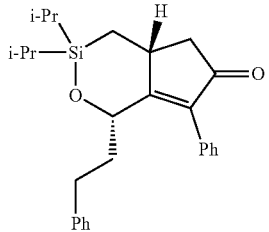 [SMILES: CC(C)[Si]1(C(C)C)C[C@@H]2CC(=O)C(c3ccccc3)=C2[C@H](CCc2ccccc2)O1]

Following General Procedure A, the product was purified by flash chromatography on silica (hexanes—10% EthOAc/hexanes) to afford 6c, d.r. 3:1 (100.0 mg, 0.281 mmol, 84%) as a white solid.

Rf: 0.4 (10% EthOAc/hexanes).

1H NMR (400 MHz, CDCl3): δ 7.34-7.29 (m, 3H), 7.22-7.12 (m, 3H), 7.08-7.02 (m, 2H), 6.85-6.79 (m, 2H), 5.14 (ddt, J=10.8, 2.5, 1.3 Hz, 1H), 3.30-3.21 (m, 1H), 2.92 (ddd, J=18.7, 6.4, 1.2 Hz, 1H), 2.70 (ddd, J=13.2, 8.4, 4.5 Hz, 1H), 2.58 (dt, J=13.7, 8.3 Hz, 1H), 2.23 (dd, J=18.6, 2.8 Hz, 1H), 1.76-1.53 (m, 2H), 1.36 (dd, J=14.7, 4.3 Hz, 1H), 1.29-1.25 (m, 1H), 1.23-1.03 (m, 9H), 1.03-0.82 (m, 1H), 0.69 (t, J=14.5 Hz, 1H).

13C NMR (101 MHz, CDCl3): δ 205.97, 179.30, 140.77, 138.16, 132.23, 128.75, 128.69, 128.64, 128.35, 127.91, 125.92, 72.89, 46.03, 37.92, 36.73, 32.09, 18.11, 17.83, 17.57, 17.25, 15.43, 14.01, 12.77.

IR (neat, cm-1): 3027, 2924, 2864, 1702, 1495, 1462, 1407, 1290, 1129, 1097, 1074, 1050, 989, 919, 881, 857, 805,754,696,667.

HRMS (CI+, m/z): calculated for C27H35O2Si [M+H]+ 419.24008, found 419.24024.

(1S,4aR)-1-allyl-3,3-diisopropyl-7-phenyl-3,4,4a,5-tetrahydrocyclopenta[d][1,2]oxasilin-6(1H)-one (6 g)

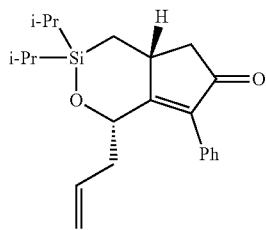 [SMILES: CCC[C@@H]1O[Si](C(C)C)(C(C)C)C[C@@H]2CC(=O)C(c3ccccc3)=C21]

Following General Procedure A, the product was purified by flash chromatography on silica (hexanes—10% EthOAc/hexanes) to afford 6 g as a single diastereomer (103.0 mg, 0.291 mmol, 87%) as a white solid.

Rf: 0.4 (10% EtOAc/hexanes).

1H NMR (400 MHz, CDCl3): δ 7.35 (dt, J=29.6, 7.5 Hz, 3H), 7.19 (d, J=7.4 Hz, 2H), 5.75 (ddt, J=17.1, 11.9, 5.4 Hz, 1H), 5.30 (d, J=10.0 Hz, 1H), 4.94 (d, J=10.3 Hz, 1H), 4.75 (d, J=17.1 Hz, 1H), 3.31-3.22 (m, 1H), 2.94 (dd, J=18.7, 6.3 Hz, 1H), 2.24 (dd, J=18.7, 2.7 Hz, 1H), 2.19-1.99 (m, 3H), 1.37 (dd, J=14.7, 4.3 Hz, 1H), 1.18-0.96 (m, 16H), 0.68 (t, J=14.4 Hz, 1H) 13C NMR (101 MHz, CDCl3): δ 206.01, 177.89, 138.41, 135.02, 132.24, 128.83, 128.63, 128.13, 117.08, 74.50, 46.03, 40.92, 36.81, 18.08, 17.77, 17.31, 17.11, 15.20, 14.21, 12.62.

IR (neat, cm-1): 2937, 2863, 1696, 1463, 1406, 1292, 1141, 1123, 1082, 915, 882, 808, 758, 698, 669.

HRMS (CI+, m/z): calculated for C22H31O2Si [M+H]+ 355.20878, found 355.20860.

(1S,4aR)-3,3-diisopropyl-7-phenyl-1-propyl-3,4,4a,5-tetrahydrocyclopenta[d][1,2]oxasilin-6(1H)-one (6 h)

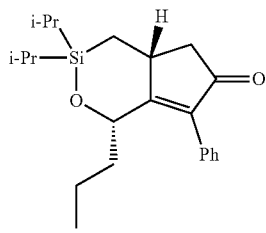

Following General Procedure A, the product was purified by flash chromatography on silica (hexanes—10% EthOAc/hexanes) to afford 6 h, d.r. 3.4:1 (88.1 mg, 0.247 mmol, 74%) as a white solid.

Rf: 0.4 (10% EtOAc/hexanes).

1H NMR (400 MHz, CDCl3): δ 7.40-7.34 (m, 2H), 7.33-7.27 (m, 1H), 7.21-7.15 (m, 2H), 5.23 (dd, J=9.4, 3.4 Hz, 1H), 3.31-3.22 (m, 1H), 2.93 (dd, J=18.6, 6.3 Hz, 1H), 2.23 (dd, J=18.5, 2.8 Hz, 1H), 1.51-1.20 (m, 5H), 1.18-1.10 (m, 7H), 1.08-0.98 (m, 5H), 0.97-0.83 (m, 1H), 0.65 (q, J=7.3 Hz, 3H).

13C NMR (101 MHz, CDCl3): δ 206.05, 179.67, 138.06, 132.37, 128.84, 128.56, 127.97, 73.47, 46.05, 38.87, 36.83, 18.98, 18.13, 17.81, 17.34, 17.17, 15.28, 13.93, 13.11, 12.70.

IR (neat, cm-1): 2942, 2865, 1702, 1495, 1463, 1408, 1288, 1225, 1127, 1071, 1034, 1012, 919, 881, 756, 697, 667.

HRMS (CI+, m/z): calculated for C23H33O2Si [M+H]+ 357.22443, found 357.22439.

(1S,4aR)-3,3-diisopropyl-1-(pent-4-en-1-yl)-7-phenyl-3,4,4a,5-tetrahydrocyclopenta[d][1,2]oxasilin-6(1H)-one (6i)

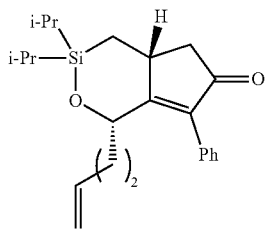

Following General Procedure A, the product was purified by flash chromatography on silica (hexanes—10% EthOAc/hexanes) to afford 61 as a single diastereomer (113.7 mg, 0.297 mmol, 89%) as a white solid.

Rf: 0.4 (10% EtOAc/hexanes).

1H NMR (400 MHz, CDCl3): δ 7.43-7.37 (m, 2H), 7.36-7.30 (m, 1H), 7.21-7.17 (m, 2H), 5.62 (ddt, J=16.9, 10.1, 2.0 Hz, 1H), 5.06-5.03 (m, 1H), 4.80-4.70 (m, 2H), 3.23-3.15 (m, 1H), 2.72 (dd, J=19.1, 6.7 Hz, 1H), 2.30-2.21 (m, OH), 2.14-2.00 (m, 3H), 1.68-1.57 (m, 3H), 1.44 (dt, J=8.1, 1.4 Hz, 2H), 1.28-1.10 (m, 1H), 0.93-0.74 (m, 15H).

13C NMR (101 MHz, CDCl3): δ 207.47, 176.87, 136.10, 134.17, 131.07, 129.14, 128.38, 128.02, 113.82, 64.75, 41.78, 36.11, 35.92, 35.62, 19.50, 19.19, 17.54, 17.47, 17.41, 12.72, 12.68.

IR (neat, cm-1): 2938, 1865, 1705, 1630, 1463, 1449, 1291, 1138, 1114, 1072, 1026, 929, 882, 828, 785, 758, 712, 697.

HRMS (CI+, m/z): calculated for C24H35O2Si [M+H]+ 383.24008, found 383.24012.

(1R,4aS)-3,3-diisopropyl-1-pentyl-7-phenyl-3,4,4a,5-tetrahydrocyclopenta[d][1,2]oxasilin-6(1H)-one (6j)

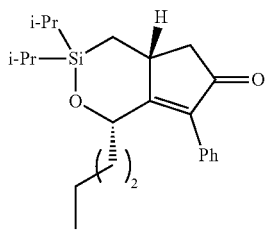

Following General Procedure A, the product was purified by flash chromatography on silica (hexanes—10% EthOAc/hexanes) to afford 6c, d.r. xx (xx mg, xx mmol, xx %) as a white solid.

Rf: 0.4 (10% EthOAc/hexanes).

1H NMR (400 MHz, CDCl3): δ 7.44-7.26 (m, 3H), 7.21-7.13 (m, 2H), 5.21 (d, J=9.7 Hz, 1H), 3.30-3.22 (m, 1H), 2.92 (ddd, J=18.5, 6.3, 1.2 Hz, 1H), 2.22 (dd, J=18.6, 2.8 Hz, 1H), 1.49-1.17 (m, 3H), 1.16-0.98 (m, 11H), 0.98-0.87 (m, 2H), 0.75 (t, J=7.1 Hz, 2H), 0.67 (t, J=14.5 Hz, 1H).

13C NMR (101 MHz, CDCl3): δ 206.05, 179.69, 132.42, 128.83, 128.60, 127.97, 73.99, 46.07, 36.84, 36.79, 30.82, 25.54, 22.32, 18.16, 17.83, 17.37, 17.17, 15.34, 14.03, 13.96, 12.71.

IR (neat, cm-1): 2926, 2863, 1689, 1460, 1143, 1123, 1081, 1015, 920, 881, 859, 808, 765, 703.

HRMS (CI+, m/z): calculated for C24H37O2Si [M+H]+ 385.25573, found 385.25566.

(1S,4aR)-1-allyl-3,3-diisopropyl-7-methyl-3,4,4a,5-tetrahydrocyclopenta[d][1,2]oxasilin-6(1H)-one (6k)

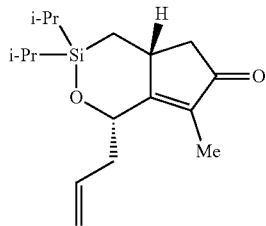

Following General Procedure A, the product was purified by flash chromatography on silica (hexanes—10% EthOAc/hexanes) to afford 6c, d.r. 12:1 (80.1 mg, 0.274 mmol, 82%) as a white solid.

Rf: 0.4 (10% EthOAc/hexanes).

1H NMR (400 MHz, CDCl3): δ 5.96 (ddt, J=17.1, 10.3, 6.6 Hz, 1H), 5.19-5.08 (m, 1H), 5.07-4.77 (m, 2H), 3.08-2.97 (m, 1H), 2.72 (dd, J=18.4, 6.1 Hz, 1H), 2.61-2.51 (m, 1H), 2.45-2.34 (m, 1H), 2.04 (dd, J=18.4, 2.9 Hz, 1H), 1.69 (s, 3H), 1.25 (dd, J=14.4, 4.3 Hz, 2H), 1.14-1.00 (m, 12H), 1.00-0.85 (m, 3H), 0.55 (t, J=14.5 Hz, 1H).

13C NMR (101 MHz, CDCl3): δ 207.91, 175.35, 134.98, 133.48, 117.36, 74.33, 45.42, 41.68, 36.70, 18.07, 17.77, 17.30, 17.11, 15.16, 13.94, 12.52, 9.19.

IR (neat, cm-1): 2942, 2865, 1702, 1638, 1463, 1410, 1382, 1288, 1221, 1141, 1056, 989, 913, 882, 802, 757, 736, 711.

HRMS (CI+, m/z): calculated for C17H29O2Si [M+H]+ 293.19313, found 293.19334.

Chiral Substrates

Allyldiisopropyl((1-phenylhex-5-en-1-yn-3-yl)oxy)silane((−)5 g)

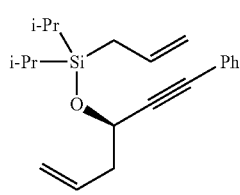 [SMILES: C=CC[C@H](C#Cc1ccccc1)O[Si](CC=C)(C(C)C)C(C)C]

Following General Procedure A, the product was purified by flash chromatography on silica (hexanes—0.25% Et2O/hexanes) to afford (−) 5 g (xx mg, xx mmol, 81%,) as a colorless oil.

Rf: 0.8 (1% EtOAc/hexanes).

$[\alpha]_D^{25}$=−50.5° (c=2.0, CHCl3).

1H NMR (400 MHz, CDCl3): δ 7.41 (dqd, J=7.5, 3.9, 3.4, 1.9 Hz, 2H), 7.31 (td, J=3.7, 2.0 Hz, 3H), 6.02-5.89 (m, 2H), 5.22-5.11 (m, 2H), 4.99 (ddt, J=16.9, 3.7, 1.8 Hz, 1H), 4.88 (ddt, J=10.1, 2.2, 1.1 Hz, 1H), 4.71 (t, J=6.4 Hz, 1H), 2.59-2.52 (m, 2H), 1.83 (dt, J=8.1, 1.4 Hz, 2H), 1.14-1.05 (m, 15H).

13C NMR (101 MHz, CDCl3): δ 134.76, 134.08, 131.68, 128.39, 128.31, 123.16, 117.88, 113.95, 90.62, 84.83, 77.48, 77.16, 76.84, 63.54, 43.50, 19.38, 17.73, 17.67, 17.65, 12.99, 12.93.

IR (neat, cm-1): 3079, 2943, 2866, 1630, 1490, 1463, 1342, 1159, 1084, 993, 914, 882, 754, 689.

HRMS (CI+, m/z): calculated for C21H31OSi [M+H]+ 327.21387, found 327.21409.

1-Allyl-3,3-diisopropyl-7-phenyl-3,4,4a,5-tetrahydrocyclopenta[d][,2]oxasilin-6(1H)-one ((−)6 g)

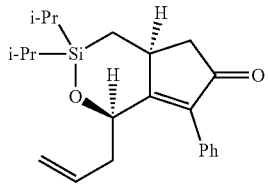

Following General Procedure A, the product was purified by flash chromatography on silica (hexanes—10% EthOAc/hexanes) to afford 6 g as a single diastereomer, 99:1 er. (103.0 mg, 0.291 mmol, 92%) as a white solid.

Rf: 0.4 (10% EtOAc/hexanes).

Chiral SFC: (OD-H, 4 mL/min, 0.1% IPA in CO2, λ=254 nm): tR (major)=4.14 min, tR (minor)=4.54 min.

$[\alpha]_D^{25}$=−22.0° (c=1.0, CHCl3).

1H NMR (400 MHz, CDCl3): δ 7.38 (dd, J=8.1, 6.5 Hz, 2H), 7.31 (dd, J=8.6, 6.4 Hz, 1H), 7.22-7.16 (m, 2H), 5.76 (ddt, J=17.0, 10.2, 6.7 Hz, 1H), 5.30 (d, J=10.0 Hz, 1H), 4.94 (dd, J=10.2, 1.8 Hz, 1H), 4.76 (dt, J=17.1, 1.7 Hz, 1H), 3.31-3.21 (m, 1H), 2.93 (dd, J=18.6, 6.4 Hz, 1H), 2.24 (dd, J=18.6, 2.7 Hz, 1H), 2.10 (dddd, J=24.9, 14.8, 12.4, 4.7 Hz, 2H), 1.37 (dd, J=14.7, 4.4 Hz, 1H), 1.17-1.10 (m, 8H), 1.09-0.91 (m, 8H), 0.68 (t, J=14.4 Hz, 1H).

13C NMR (101 MHz, CDCl3): 13C NMR (101 MHz, cdcl3) δ 205.95, 177.78, 138.45, 135.04, 132.29, 128.87, 128.63, 128.13, 117.05, 77.48, 77.16, 76.84, 74.52, 46.06, 40.93, 36.84, 18.08, 17.78, 17.31, 17.12, 15.17, 14.29, 12.66.

IR (neat, cm-1): 2939, 2864, 1696, 1463, 1407, 1292, 1141, 1123, 1082, 916, 882, 807, 758, 698.

HRMS (CI+, m/z): calculated for C22H31O2Si [M+H]+ 355.20878, found 355.20860.

Functionalized PKR Products (1S,4aR,6R)-1-allyl-3,3-diisopropyl-7-phenyl-1,3,4,4a,5,6-hexahydrocyclopenta[d][1,2]oxasiin-6-ol (7a)

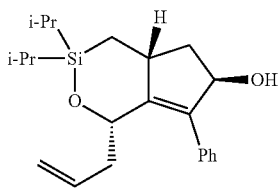 [SMILES: C=CC[C@@H]1O[Si](C(C)C)(C(C)C)C[C@@H]2C[C@@H](O)C(c3ccccc3)=C21]

Adapted from a procedure by Evans and coworkers (Kavanagh, Y. et al., J. Org. Chem., 2008, 73, 8601-8604). Cerium(III) chloride heptahydrate (209 mg, 0.560 mmol, 2 equiv) was added to a solution of the enone 6 g (100 mg, 0.282 mmol, 1 equiv) in methanol/THF (4:1, 8.0 mL: 2.0 mL), at 0° C. After stirring for 10 minutes sodium borohydride (10.3 mg, 0.336 mmol, 1.2 equiv) was added. The reaction was stirred for 30 minutes at 0° C. before water (20 mL) was added. This was extracted using ether (3×20 mL). The combined organic extracts were washed with brine (25 mL), dried over MgSO4, filtered and the solvent removed under reduced pressure. Purification by flash column chromatography (Hexanes-EtOAc; xx %) yielded 7a (63.7 mg, 63%) as a colorless oil.

Rf: 0.4 (10% EtOAc/hexanes).

1H NMR (400 MHz, CDCl3): δ 7.55-7.19 (m, 5H), 5.75 (dddd, J=17.3, 10.3, 7.2, 6.3 Hz, 1H), 4.89 (ddt, J=10.3, 2.3, 1.2 Hz, 1H), 4.79-4.70 (m, 3H), 2.94-2.83 (m, 1H), 2.73 (dt, J=12.6, 7.3 Hz, 1H), 2.13-1.98 (m, 2H), 1.77 (s, 1H), 1.44 (dt, J=13.0, 6.6 Hz, 1H), 1.21 (dd, J=14.4, 4.7 Hz, 1H), 1.10-0.98 (m, 14H), 0.98-0.80 (m, 1H), 0.67 (dd, J=14.5, 13.5 Hz, 1H).

13C NMR (101 MHz, CDCl3): δ 146.12, 137.71, 136.92, 136.11, 128.95, 128.54, 127.40, 116.24, 79.60, 73.56, 44.30, 42.72, 41.00, 18.14, 17.88, 17.43, 17.29, 16.08, 14.69, 12.79.

IR (neat, cm-1): 3347, 3074, 2941, 2921, 2891, 2864, 1640, 1599, 1492, 1463, 1087, 990, 912, 882, 754, 699.

HRMS (C+, m/z): calculated for C22H3102Si [M−H]+ 355.20878, found 355.20911.

(1aS,3aR,7S,7aR)-7-allyl-5,5-diisopropyl-1a-phenyltetrahydro-7H-oxireno[2',3':2,3]cyclopenta[1,2-d][1,2]oxasilin-2(1aH)-one (7b)

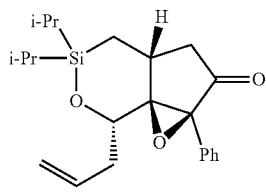 [SMILES: C=CC[C@@H]1O[Si](C(C)C)(C(C)C)C[C@@H]2CC(=O)[C@@]3(c4ccccc4)O[C@]213]

Adapted from a procedure by Schreiber and coworkers (Nelson Jr., S. D., et al., Org. Lett., 2016, 1:6280-6283). A 1 dram vial was charged with a magnetic stir bar, enone 6 g (100 mg, 0.282 mmol, 1.0 equiv), and Methanol/THF (3:1; 6 mL: 2 mL). The solution was cooled to 0° C. and 50% aq. H2O2 solution (0.264 mL, 5.64 mmol, 20 equiv) was added, immediately followed by 4 M aq NaOH solution (0.693 mL, 1.97 mmol, 7.0 equiv). The solution was stirred at 0° C. for 30 min. The reaction was quenched via the addition of 1 M aq. HCl. The solution was diluted with DCM, transferred to a separatory funnel and washed with water. The aqueous layer was extracted with DCM (3×10 mL). Combined organic extracts were dried over Na2SO4, filtered, and concentrated under reduced pressure. The residue was purified via flash chromatography on silica gel (xx % EtOAc/hexanes) to afford the 7b as a white solid.

Rf: 0.67 (10% EtOAc/hexanes).

1H NMR (400 MHz, CDCl3): δ 7.44-7.28 (m, 5H), 5.69 (dddd, J=17.1, 10.2, 7.9, 5.8 Hz, 1H), 4.90 (ddt, J=10.2, 2.3, 1.1 Hz, 1H), 4.84 (ddt, J=17.2, 2.0, 1.6 Hz, 1H), 4.49 (dd, J=10.6, 2.2 Hz, 1H), 2.96 (dd, J=16.5, 7.2 Hz, 1H), 2.89 (ddd, J=12.7, 7.3, 5.3 Hz, 1H), 1.98-1.88 (m, 2H), 1.30-1.15 (m, 3H), 1.15-0.91 (m, 11H), 0.65 (dd, J=14.9, 12.8 Hz, 1H).

13C NMR (101 MHz, CDCl3): δ 210.36, 135.88, 129.30, 128.74, 128.40, 128.28, 116.33, 77.48, 77.16, 76.84, 76.15, 74.53, 68.95, 43.64, 36.60, 34.86, 17.83, 17.58, 17.24, 15.21, 12.27, 11.74.

IR (neat, cm-1): 3082, 2945, 2926, 2866, 1744, 1649, 1462, 1137, 939, 915, 882, 817, 745, HRMS (C+, m/z): calculated for C22H3103Si [M+H]+ 371.20370, found 371.20408.

(R)-3-((S)-1-hydroxybut-3-en-1-yl)-4-((hydroxydiisopropylsilyl)methyl)-2-phenylcyclopent-2-en-1-one (7c)

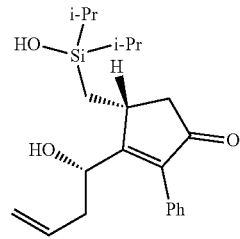 [SMILES: C=CC[C@H](O)C1=C(c2ccccc2)C(=O)C[C@H]1C[Si](O)(C(C)C)C(C)C]

Adapted from a procedure by Gevorgyan and coworkers (Parasram, M. et al., J. Am. Chem. Soc., 2014, 136:17926-17929). To an ice-cooled (0° C.) stirred solution of KH (452 mg, 3.38 mmol, dispersed in mineral oil, 30%, 12 equiv) in 3.5 mL of NMP was added tert-butyl hydroperoxide (3.94 mL, 2.76 mmol, 10 equiv, 70% in water) dropwise. The mixture was allowed to warm up to room temperature, (25° C.) and kept for 10 min, then was added a solution of 6 g (100 mg, 0.282 mmol) in 2.8 mL of NMP. The mixture was stirred overnight and then 1.41 mL TBAF (1.41 mmol, 1.0 M solution in THF) was added. The mixture was stirred for another 3 h and cooled to 0° C. 2.0 g of Na2S2O3.5H2O and 10 mL of water were added. The mixture was stirred at 0° C. for 30 min and neutralized of addition of NH4Cl. The mixture was extracted with diethyl ether (3×10 mL). The combined organic layers were washed with H2O (4×10 mL) and brine (25 mL), dried (Na2SO4), and concentrated. Flash silica gel column chromatography (15% EtOAc/hexanes) purification of the residue gave 7c as a white solid.

Rf: 0.2 (30% EthOAc/Hexanes) 1H NMR (400 MHz, CDCl3): δ 7.42-7.30 (m, 3H), 7.20-7.15 (m, 2H), 5.70 (dddd, J=16.8, 10.2, 7.9, 6.4 Hz, 1H), 5.16-5.07 (m, 2H), 4.82 (dd, J=9.1, 4.0 Hz, 1H), 3.36 (ddt, J=11.5, 6.8, 2.5 Hz, 1H), 2.86 (ddd, J=18.6, 6.7, 0.8 Hz, 1H), 2.56-2.39 (m, 2H), 2.35 (dd, J=18.8, 2.1 Hz, 1H), 2.16 (s, 1H), 1.57 (s, 1H), 1.47 (dd, J=14.7, 2.9 Hz, 1H), 1.25 (s, 1H), 1.14-0.93 (m, 16H), 0.69 (dd, J=14.7, 11.3 Hz, 1H).

13C NMR (101 MHz, CDCl3): IR (neat, cm-1): 3338, 3188, 2957, 2938, 2864, 167, 1625, 1596, 1462, 1343, 1317, 1072, 851, 759, 695.

HRMS (CI+, m/z): calculated for C22H3303Si [M+H]+ 373.21935, found 373.21939.

(R)-3-((S)-1-hydroxy-2-phenylethyl)-4-(hydroxymethyl)-2-phenylcyclopent-2-en-1-one (7d)

Adapted from a procedure by Jeon and coworkers (Hua, Y. et al., J., Org. Lett., 2013, 15:3412-3415). Cesium hydroxide monohydrate (120 mg, 0.988 mmol, 4 equiv), tert-butyl hydroperoxide (0.74 mL, 5.0 M in decane, 3.71 mmol, 15 equiv) and DMF (2.5 mL, 0.1 M) were added to a vial, and tetrabutylammonium fluoride (TBAF, 1.0 M in THF solution, 1.24 mmol) was added to the mixture. Then 6e (100 mg, 0.247 mmol) was added to the mixture, which was stirred at room temperature (25° C.) for 17 hours. The reaction mixture was quenched with sodium thiosulfate and stirred for 10 min. The mixture was extract with ethyl acetate (20 mL×4), and the combined organic layer was washed with aqueous HCl (1.0 M, 20 mL), saturated aqueous sodium bicarbonate (20 mL), brine (20 mL), and dried over anhydrous sodium sulfate. Solvent was removed under reduced pressure and the crude mixture was purified by flash silica gel column chromatography (25% EtOAc/hexanes) purification of the residue gave 7d as a white solid.

Rf: 0.54 (2% Methanol/DCM)

1H NMR (400 MHz, CDCl3): δ 7.46-7.40 (m, 4H), 7.21-7.13 (m, 3H), 6.74 (dd, J=7.7, 2.0 Hz, 2H), 4.10 (ddd, J=14.1, 11.2, 2.8 Hz, 2H), 3.83 (dd, J=11.2, 4.3 Hz, 1H), 3.00-2.95 (m, 1H), 2.82 (dd, J=17.8, 8.9 Hz, 1H), 2.70 (dd, J=13.9, 2.4 Hz, 1H), 2.52 (dd, J=13.8, 10.8 Hz, 1H), 2.18 (dd, J=17.8, 1.2 Hz, 1H), 1.26 (s, 2H), 0.93-0.83 (m, 1H).

13C NMR (101 MHz, CDCl3): δ 208.31, 138.09, 129.17, 129.06, 128.81, 128.64, 128.46, 128.09, 126.74, 73.88, 68.42, 62.97, 39.52, 38.91, 37.55.

IR (neat, cm-1): 3338, 3030, 2928, 1747, 1604, 1496, 1449, 1403, 1267, 1132, 1060, 1029, 841, 749, 733, 699.

HRMS (CI+, m/z): calculated for C20H1903 [M−H]+ 307.13287, found 307.13301.

Results and Discussion

Stereoselective strategies for the synthesis of stereoenriched and highly functionalized cyclopentenones are highly sought after because they enable assembly of structural components present in a broad range biologically active natural products (FIG. 1). The cobalt-mediated Pauson-Khand Reaction (PKR) exemplifies a convergent, atom-economical and fundamental reaction for the synthesis of cyclopentenones. Since Khand and Pauson's initial discovery in 1973, significant advances in the intermolecular PKR have been made. However, this reaction is generally limited to strained or symmetrical olefins due to the difficulty in controlling the alkene regio- and stereoselectivity (FIG. 1). Pioneering studies by the groups of Pericas, Riera, and Verdaguer have shown that chiral bidentate PuPhos, CamPhos, PNSO, and ThaxPhos ligands are effective in cobalt-catalyzed asymmetric intermolecular PKRs. However, these studies are limited to the use of symmetrical and strained norbornadiene. Carreterro et al. reported the first example of an asymmetric intermolecular PKR with unstrained olefins employing stoichiometric cobalt-alkyne complexes and o–(dimethylamino)phenyl vinyl sulfoxide as a chiral auxiliary (Rodriguez Rivero, M. et al., J. Am. Chem. Soc. 2003, 125:14992-14993; Rodriguez Rivero, M. et al., Chem. Eur. J., 2004, 10:5443-5459; Itami, K. et al., Angew. Chem. Int. Ed., 2002, 41:3481-3484; Itami, K. et al., J. Am. Chem., 2004, 126:11058-11066). While the intramolecular PKRs has been showcased in numerous elegant total syntheses, the application of the intermolecular variant has been limited (Iqbal, M. et al., Chembiochem 2005, 6:276-280; Jiang, B. et al., Org. Lett., 2013, 15:871-873; Su, S. et al., J. Am. Chem. Soc., 2011, 133:13922-13925; Rodriguez, R. A. et al., J. Am. Chem. Soc., 2014, 136:15403-15413). Thus, a general stereoselective PKR strategy to access highly functionalized monocyclic cyclopentenones remains elusive.

A tactic to enhance reactivity and control regio- and stereoselectivity is to employ a removable tether, preferably one that allows for further functionalization (FIG. 1). Silicon has proven a practical tethering element in a multitude of transformations. It is particularly useful because it serves as a convenient retron for hydroxyl groups via Tamao-Fleming oxidation (Tamao, K. et al., J. Organomet. Chem., 1983, 254:13-22), as well as a plethora of stereoselective transformations. Reported examples of Si—O tethered PKRs suffer from unexpected by-products (Kagoshima, H. et al., Organometallics, 1996, 15:5439-5441; Reichwein, J. F. et al., Tetrahedron, 2002, 58:3813-3822; Reichwein, J. F. et al., Tetrahedron Lett., 2002, 43:3739-3741), low yields, and/or limited substrate scope (Brummond, K. M. et al., Tetrahedron Lett., 2002, 43:3735-3738; Ishaq, S. et al., Synthetic Communications, 2006, 36:547-557; Dobbs, A. P. et al., Beilstein J. Org. Chem., 2007, 3, No. 21). Brummond and co-workers reported a successful example of an allenic Si—O tethered PKR with stoichiometric Mo(CO)$_6$ (15-25% yields) (Brummond, K. M. et al., Tetrahedron Lett., 2002, 43:3735-3738). Dobbs et al. reported four examples of low to modest yields in room temperature NMO promoted Co$_2$(CO)$_8$-mediated PKRs of diisopropyl Si—O tethered 1,7-enynes derived from primary propargyl alcohols (Dobbs, A. P. et al., Beilstein J. Org. Chem., 2007, 3, No. 21). On the other hand, Porter and co-workers (Ishaq, S. et al., Synthetic Communications, 2006, 36:547-557) investigated Co$_2$(CO)$_8$-mediated PKRs of diphenyl Si—O tethered 1,7-enynes employing Sugihara's (Sugihara, T. et al., Synlett 1999, 6:771-773) n-BuSMe promoted PKR conditions. In one example, Porter reported a secondary propargyl alcohol which furnished the PKR product in low yield and diastereoselectivity (9%; 1:1.5 dr). Inspired by these reports, it was hypothesized that utilizing Si—O tethered 1,7-enynes could lead to a diastereoselective PKR from secondary propargyl alcohols (Cai, H. et al., J. Org. Chem., 2014, 79:5484-5493; Turlington, M. et al., J. Org. Chem. 2010, 75:6941-6952; Sezer, S. et al., Tetrahedron Asymmetry, 2006, 17:2981-2986; Stumpf, A. et al., Bull. Korean Chem. Soc. 2004, 25:1621-1622). An attractive feature of the disclosed approach is the use of enantioenriched secondary propargyl alcohols, readily accessed via well-established methods such as asymmetric hydrogenation of propargyl ketones, asymmetric allylation or alkynylation of aldehydes. Successful execution of such a tactic would provide entry to otherwise difficult to access enantio- and diastereoenriched/highly functionalized cyclopentenones. Central to the disclosed approach is the oxidative cleavage of the Si—C bond (see 7d, FIG. 2), which unveils a useful allylic alcohol moiety for further structural and stereochemical augmentation. The efforts made toward a cobalt-mediated diastereoselective Si—O tethered PKR of 1,7-enynes for the stereroselective synthesis of cyclopentaoxasilinones are described below.

Figure 3:
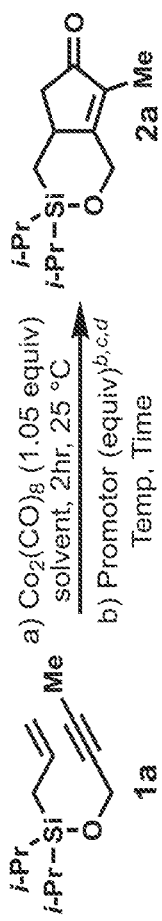
FIG. 3 depicts optimization of the PKR conditions.

Optimization studies (FIG. 3) commenced with an evaluation of solvent, temperature, time, concentration, and promoters in the PKR of model substrate 1a to afford siloxy-tethered cyclopentenone 2a. Treatment with 1.05 equiv of $Co_2(CO)_8$ with N-oxides known to promote the room temperature PKR gave low yields, (FIG. 3, Entries 1-2). Cyclohexylamine (CyNH2) reported (Sugihara, T. et al., Angew. Chem., Int. Ed. Engl. 1997, 36:2801-2804) in thermal PKRs led to similar yields (22%; Entry 3). It was observed that upon treatment with 1.05 equiv of $Co_2(CO)_8$, 3.50 equiv of n-BuSMe in o-xylenes (0.1M) at 130° C. for 12 h resulted in improved yields of 2a (57%; Entry 6). Notably, reducing the reaction time from 24 h to 12 h did not negatively impact the yield (Entry 5 vs Entry 6). However, 24 h was required to give comparable yields of 2a at 110° C. in toluene (Entry 4). Based on Magnus' proposed mechanism of the PKR (Magnus, P. et al., Tetrahedron Letters, 1985, 26:4851-4854), Sugihara's study of thioether promoters (Sugihara, T. et al., Synlett, 1999, 6:771-773), and seminal mechanistic studies of Lewis-base promoted PKRs by the groups of Krafft (Krafft, M. E. et al., J. Am. Chem. Soc., 1993, 115:7199-7207), Nakamura (Yamanaka, M. et al., J. Am. Chem. Soc., 2001, 123:1703-1708), Milet and Gimbert (Del Valle, C. P. et al., Angew. Chem. Int. Ed., 2005, 44:717-5719), it was reasoned that modulating the Lewis basicity of the thioether would impact the rate of alkene insertion, the overall rate of reaction, and lead to improved yields. To test this hypothesis, attention was given to a variety of commercially available and readily accessible thioethers. While PhSMe gave similar yields (55%; Entry 7) to n-BuSMe (57%; Entry 6), BnSMe and 4-OMeBnSMe led to an increase in yield of 2a to 65% and 64% respectively (Entries 8-9). Overall, it was found that 5.0 equiv of both furfuryl methyl sulfide or 4-fluorobenzyl methyl sulfide (4-FBnSMe), affords 2a in improved yields (72 and 81% respectively; Entries 10-11). Moreover, 4-FBnSMe can be prepared on a multi-gram scale in a one-step procedure and can be recovered (83% average) via simple flash chromatography and reused without loss of reactivity. A control experiment, in which the promotor is omitted (36%; Entry 12), demonstrates the value of 4-FBnSMe as a new, efficient, and recoverable/reusable thioether promoter in the PKR.

Figure 4:
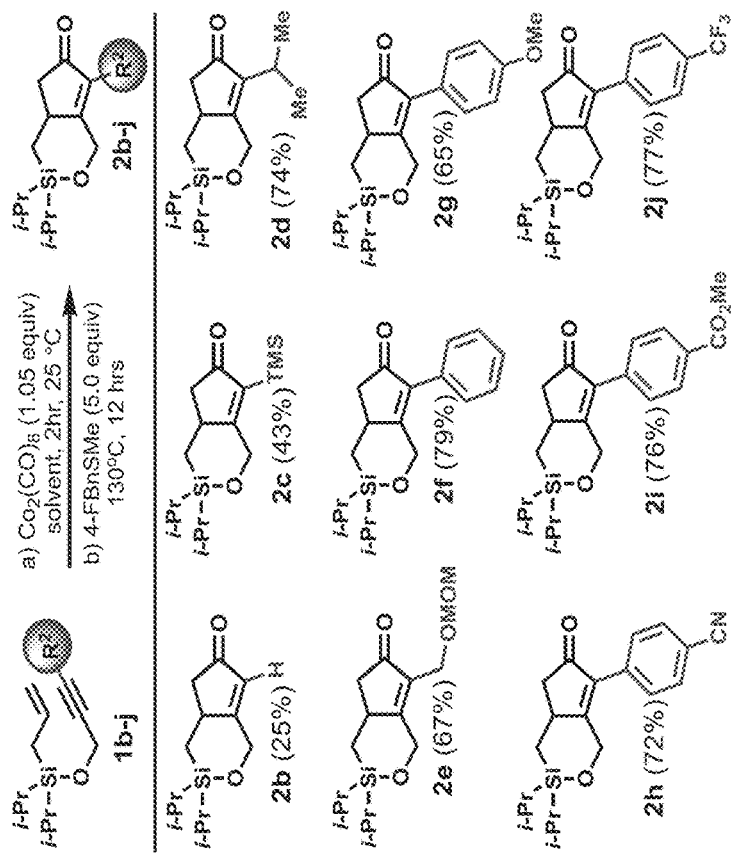
FIG. 4 depicts PKR with variation at the alkynyl position.

With optimized conditions in hand, a systematic study of the scope and limitation of the PKR of Si—O tethered 1,7-enynes 1b-1j containing a variety of alkynyl substituents ($R^2$; FIG. 4) was initiated. Unsubstituted enyne 1b did not perform well under the current reaction conditions providing 2b in 25% yield. Trimethylsilane substituted enyne 1c gave a diminished yield of product 2c (43%), despite a 24 h extended reaction time. In contrast, isopropyl substituted 2d reached full conversion in 12 h and was isolated in 74% yield. Gratifyingly, MOM-protected propargyl ether 2e was furnished in 67% yield, providing an opportunity for post-PKR synthetic manipulations. Phenyl substituted 2f formed in 79% yield while electron-rich analogue with a 4-OMe group gave 2 g in a slightly diminished yield of 65%. Furthermore, electron-withdrawing para-substituted arenes 2 h-j were obtained with good yields and demonstrate good functional group compatibility; —CN (72%), —$CO_2Me$ (76%), —C F3 (77%).

Figure 5:
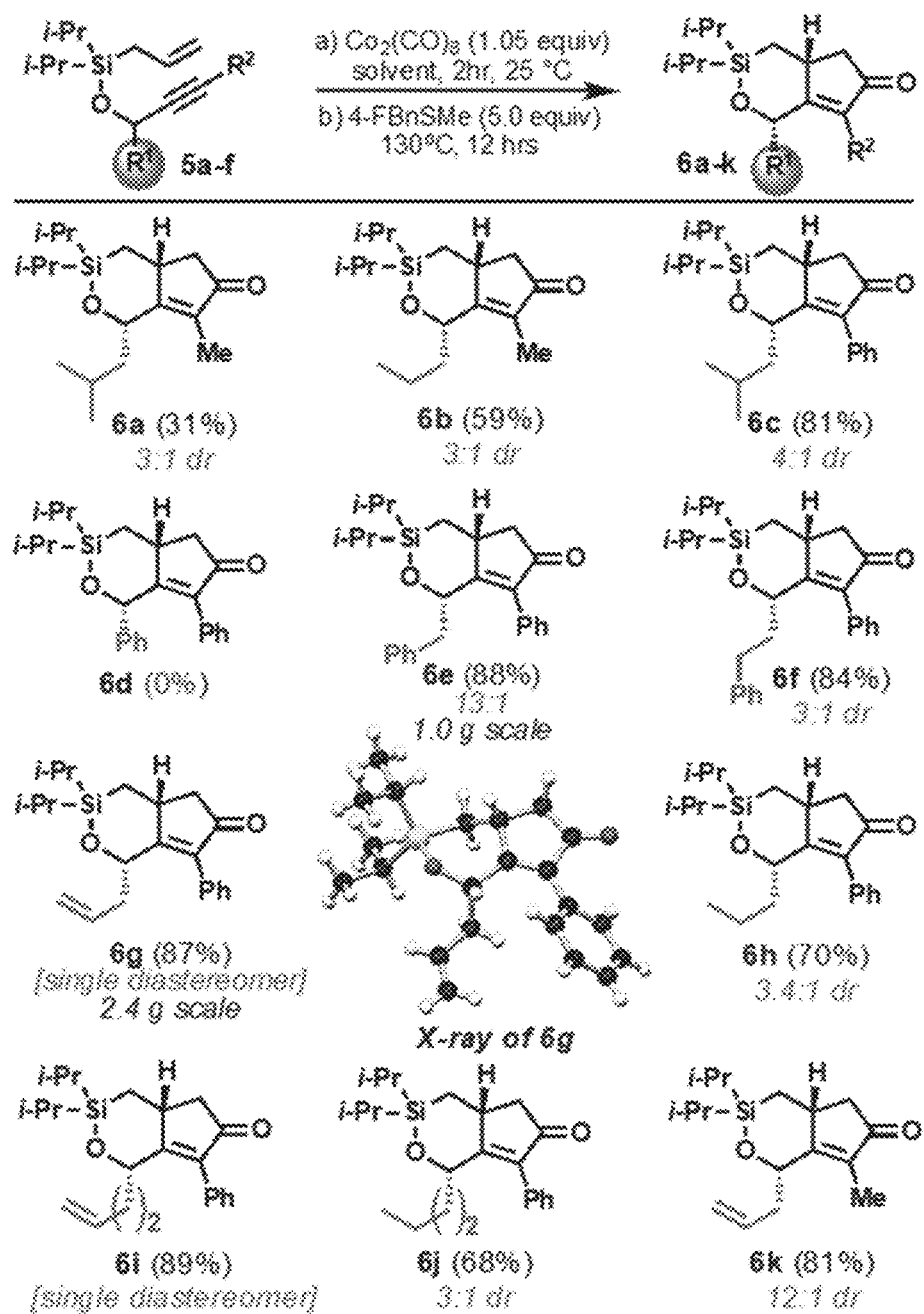
FIG. 5 depicts scope and limitation of the diastereoselective siloxy-tethered PKR.
Figure 6:
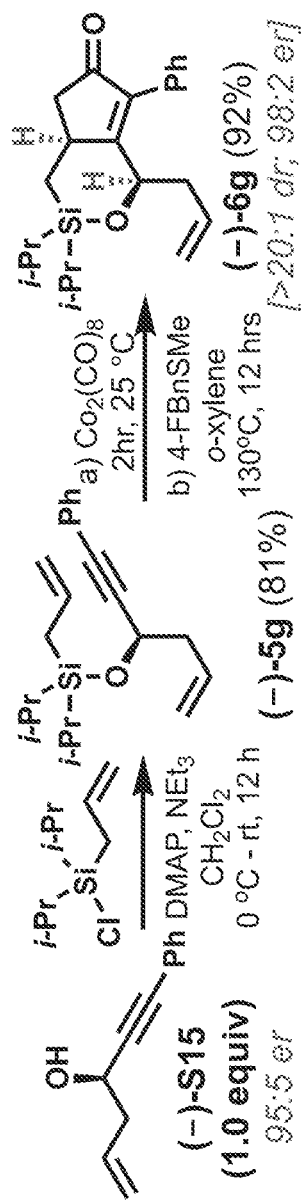
FIG. 6 depicts a synthetic scheme comprising a highly diastereo- and enantioselective siloxy-tethered PKR.

Building on this initial success, the development of a diastereoselective PKR derived from secondary propargyl alcohols was undertaken. Based on prior reports, and guided by molecular models, it was hypothesized that the sterically hindered i-Pr alkyl substituents of silicon would have a dual advantage: i) inducing a Thorpe—Ingold effect, thereby increasing the rate of reaction, and ii) imparting a favorable steric influence on the transition state of the cycloaddition that would lead to improved diasteroselectivity. As delineated in FIG. 5, alkyl substituted propargyl enynes 5a-b provided moderate selectivity (3:1 and 4:1 dr, respectively) of 6a-6b in low yields (30% and 27%, respectively). On the other hand, phenyl substituted 6c was furnished in high yield with similar selectivity (81%; 4:1 dr). Unsurprisingly, decomposition of enyne 5d was observed via TLC analysis upon cobalt complexation, and 6d was not detected. However, benzyl substituted enyne 5e provided the PKR product 6e in improved yield and selectivity (88% yield and 13:1 dr). The reaction was also performed on a gram scale (2.7 mmol), attesting to the robust nature of the reaction. Extending the carbon chain length gave product 6f in 84% yield, albeit with diminished selectivity (3:1 dr). In all cases, mixtures of diastereomers were readily separable via flash chromatography. Surprisingly, enyne 5 g with an appended allyl group provided the product 6 g in 89% isolated yield as a single diastereomer (>20:1 dr) on a 2.4-gram scale (7.4 mmol). The connectivity and selectivity of 6 g and 6e was unambiguously established by single crystal X-ray diffraction studies. Remarkably, extending the terminal olefin, leads to a completely chemo- and diastereoselective PKR that furnishes the product 6i in excellent yield. Notably, no traces of the constitutional isomer, the alternative PKR product, were detected. By contrast, omitting the olefin moiety gives good yields of products 6 h and 6j, however with diminished selectivity (3.4:1 and 3:1 dr, respectively). Surprisingly, enyne 5k with a sterically demanding methyl substituent on the alkynyl position provided product 6k in good yields and selectivity (81%; 12:1 dr). This is in contrast with the outcome of product 6b (vide supra). Illustrated in FIG. 6 is the use of enantioenriched propargyl alcohol (−)-S15 for the synthesis of enyne (−)-5 g in 81% yield. Following the optimized PKR conditions, optically active cyclopentaoxasilinone (−)-6 g was furnished in 92% yield demonstrating that the enantiomeric purity of the propargyl alcohol is preserved in the PKR products As illustrated in FIG. 6, the major product possesses a cis relationship between the propargylic proton and the bridgehead proton of the newly formed stereocenter and was confirmed by a battery of 1D and 2D NMR experiments and/or X-ray crystallographic analysis.

This result is intriguing because: i) implicates the appended π-component as the key structural element responsible for the enhanced selectivity, ii) expands the synthetic utility of the products via the terminal olefin that provides a convenient synthetic handle for further transformations, and iii) accommodates sterically demanding alkyl groups at the alkynyl position, whilst maintaining high yields and selectivity.

Figure 2:
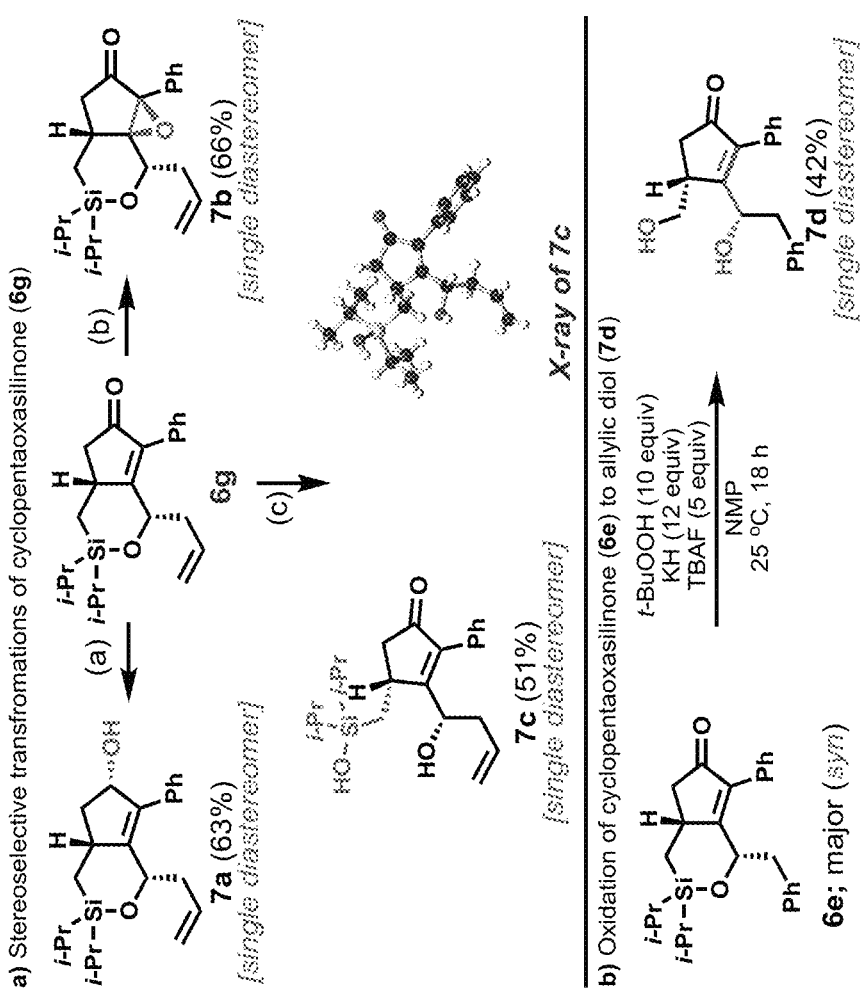
FIG. 2 depicts stereoselective reactions involving cyclopentaoxasilinones.

Highly stereoselective transformations of 6e and 6 g are showcased in FIG. 2. For example, subjecting 6 g to a cerium(III)-mediated Luche reduction smoothly afforded allylic alcohol 7a in 63% yield. Treatment of 6 g with basic hydrogen peroxide provided epoxide 7b in 66% yield. Homoallylic-allylic alcohol/silanol 7c, was obtained in 51% yield. Employing oxidation conditions, allylic diol 7d was isolated in a non-optimized 41% yield. Allylic alcohols 7d and 7c offer unique potential with multiple synthetic handles for complexity building transformations. Importantly, 7a-7d were obtained as single diastereomers and confirmed by 1- and 2D NMR experiments and/or X-ray crystallographic analysis.

Conclusions

In summary, a diastereoselective Si—O tethered Pauson Khand Reaction was developed that utilizes readily available propargyl alcohols and simple starting materials for the synthesis of valuable cyclopentaoxasilinones. This novel strategy provides access to stereoenriched/highly functionalized cyclopentenones that are otherwise inaccessible via intermolecular PKR. A recoverable and reusable thioether promoter, namely 4-fluorobenzyl methyl sulfide (4-FbnSMe) promotes the Si—O tethered PKR in good to high yields. The utility of the PKR products is showcased in facile, highly stereoselective modifications to furnish stereoenriched cyclopentenones with useful functionalities for further synthetic manipulations. Moreover, the cyclopentaoxasilinones are themselves structural chemotypes that are of broad interest to scientific community.

Example 2: Silicon and Boron Tethered Diastereoselective Pauson-Khand Reactions

Figure 7:
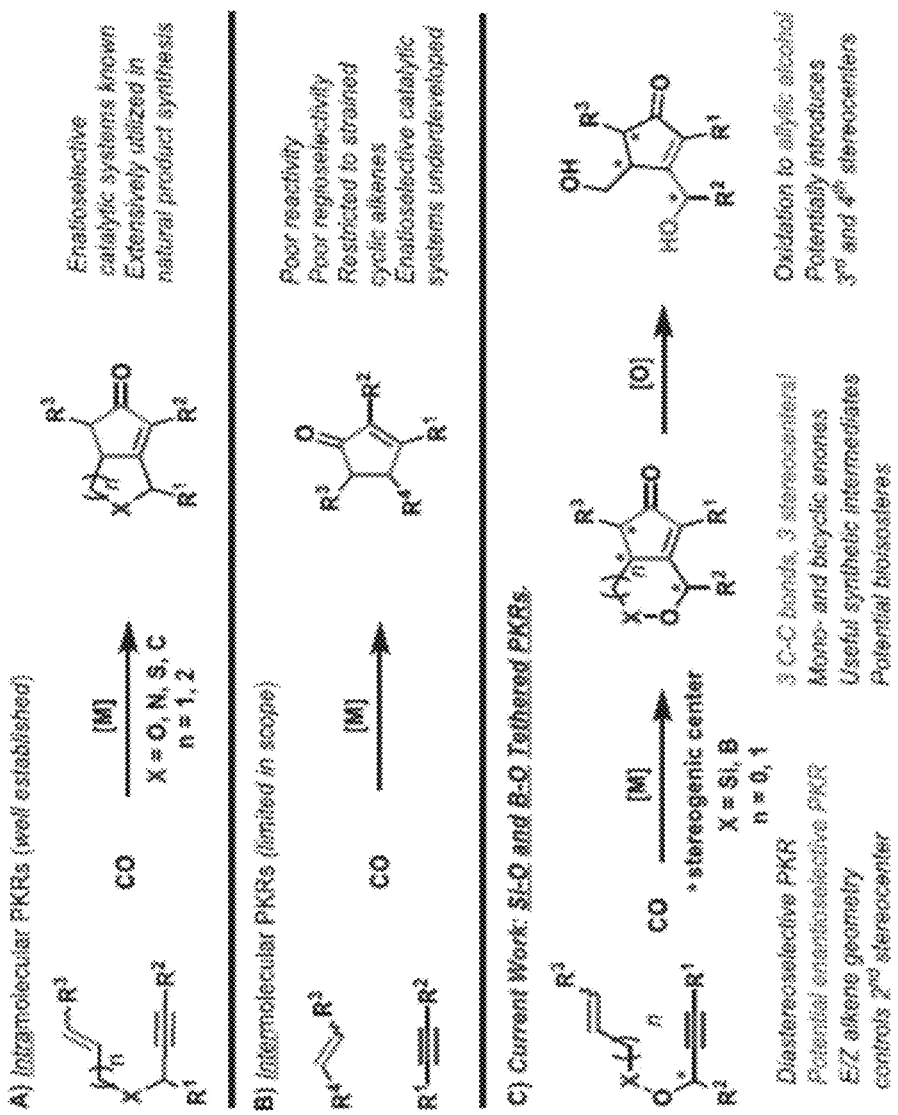
FIG. 7 depicts the PKR.

FIG. 7 depicts the PKR.

Figure 8:
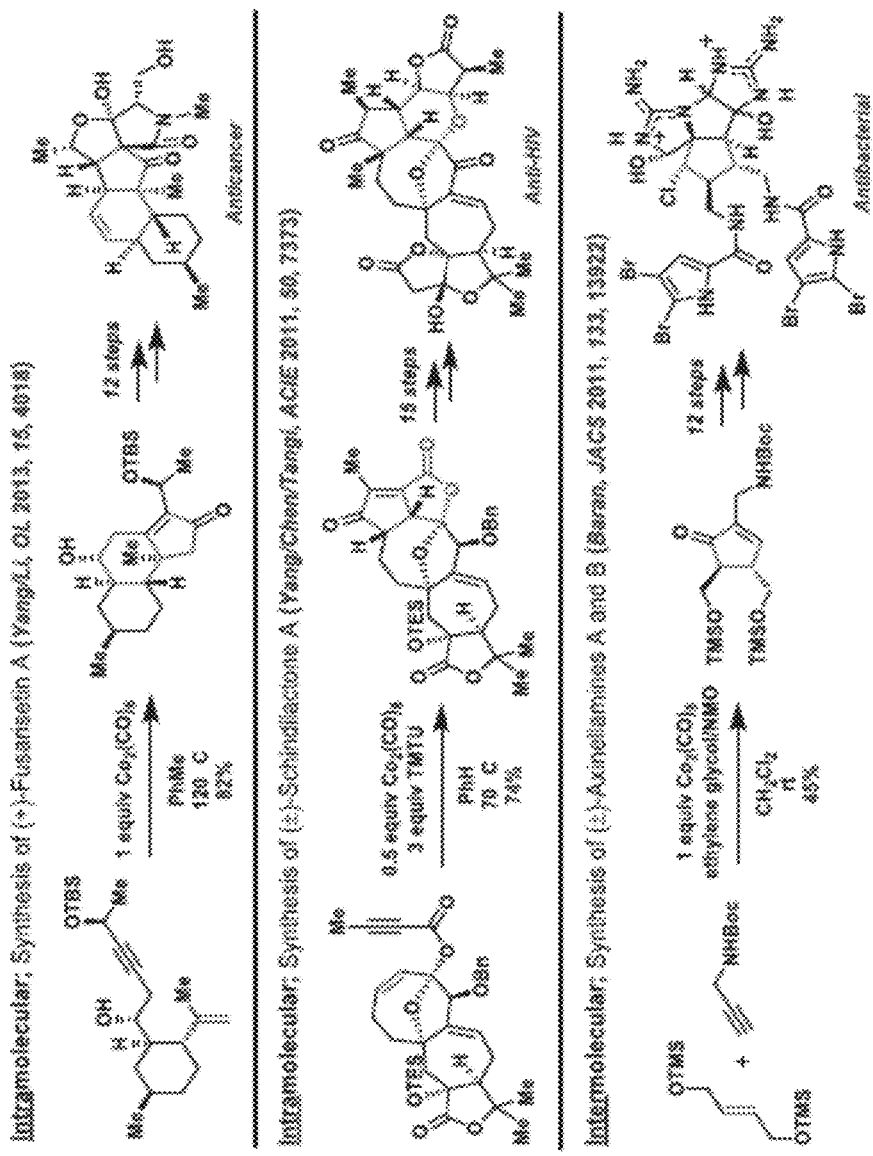
FIG. 8 depicts the PKR in total synthesis.

FIG. 8 depicts the PKR in total synthesis.

Figure 9:
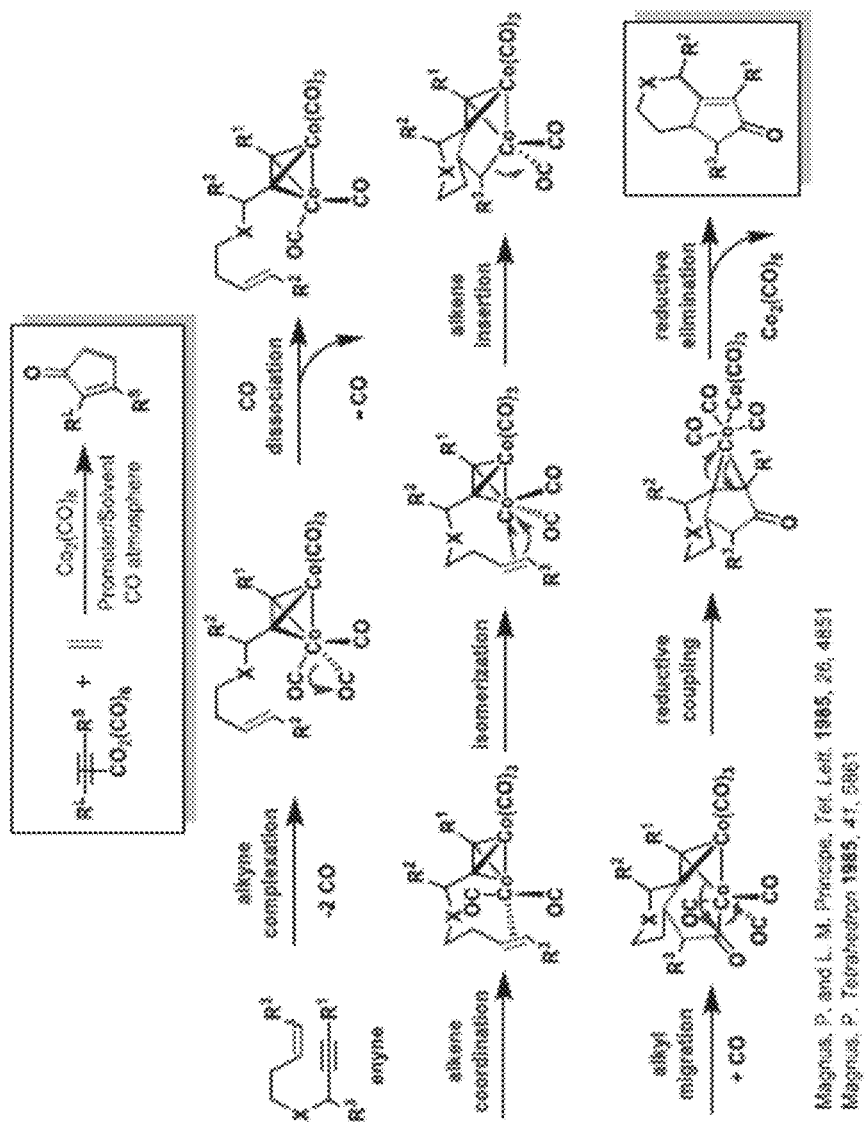
FIG. 9 depicts Magnus' proposed Pauson-Khand mechanism.

FIG. 9 depicts Magnus' proposed Pauson-Khand mechanism.

Figure 10:
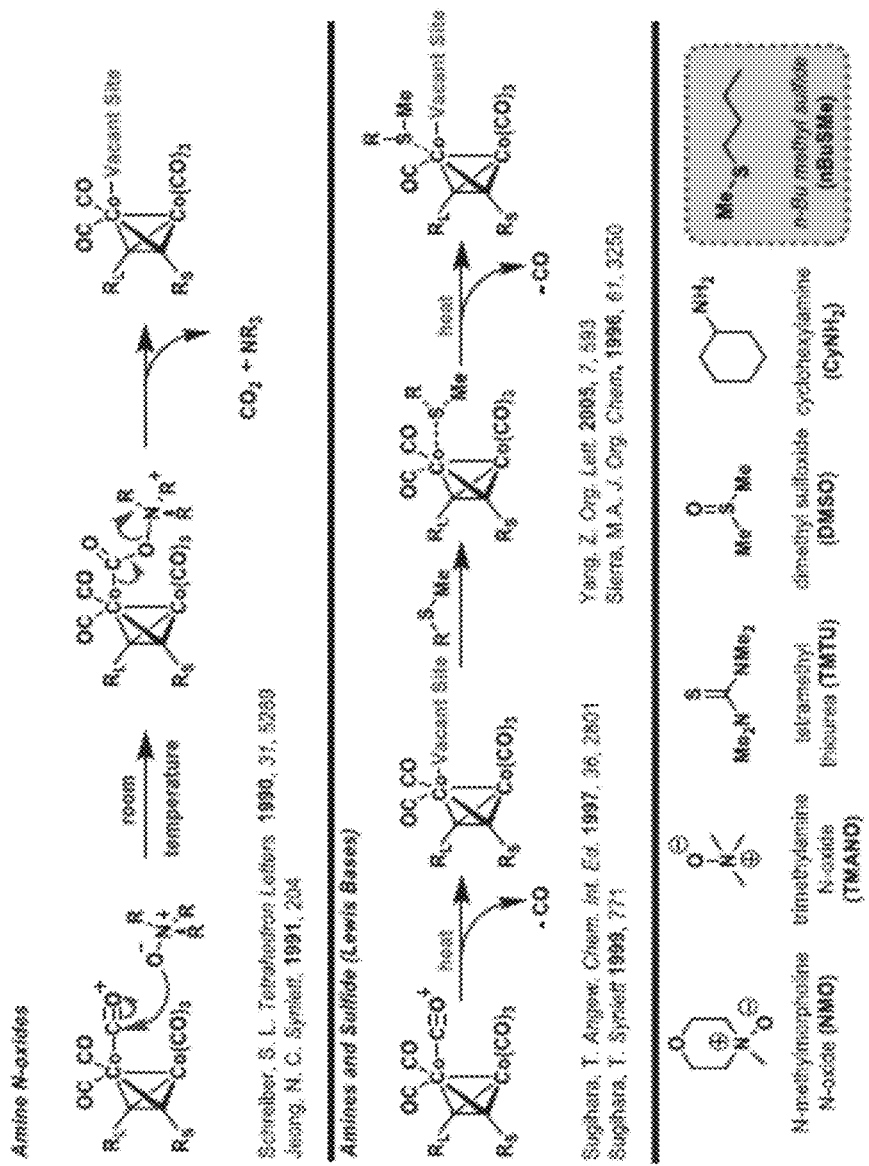
FIG. 10 depicts PKR promoters.

FIG. 10 depicts PKR promoters.

Figure 11:
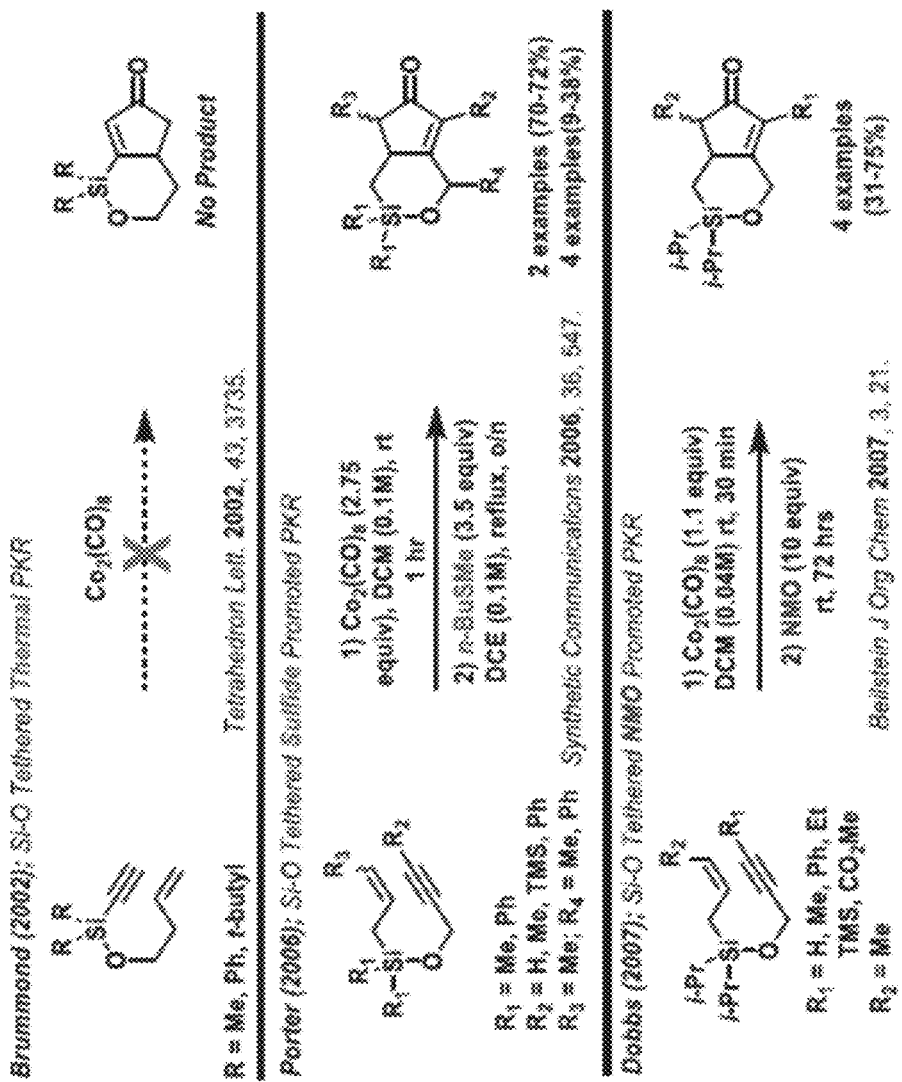
FIG. 11 depicts previous work using the PKR.

FIG. 11 depicts previous work using the PKR.

Figure 12:
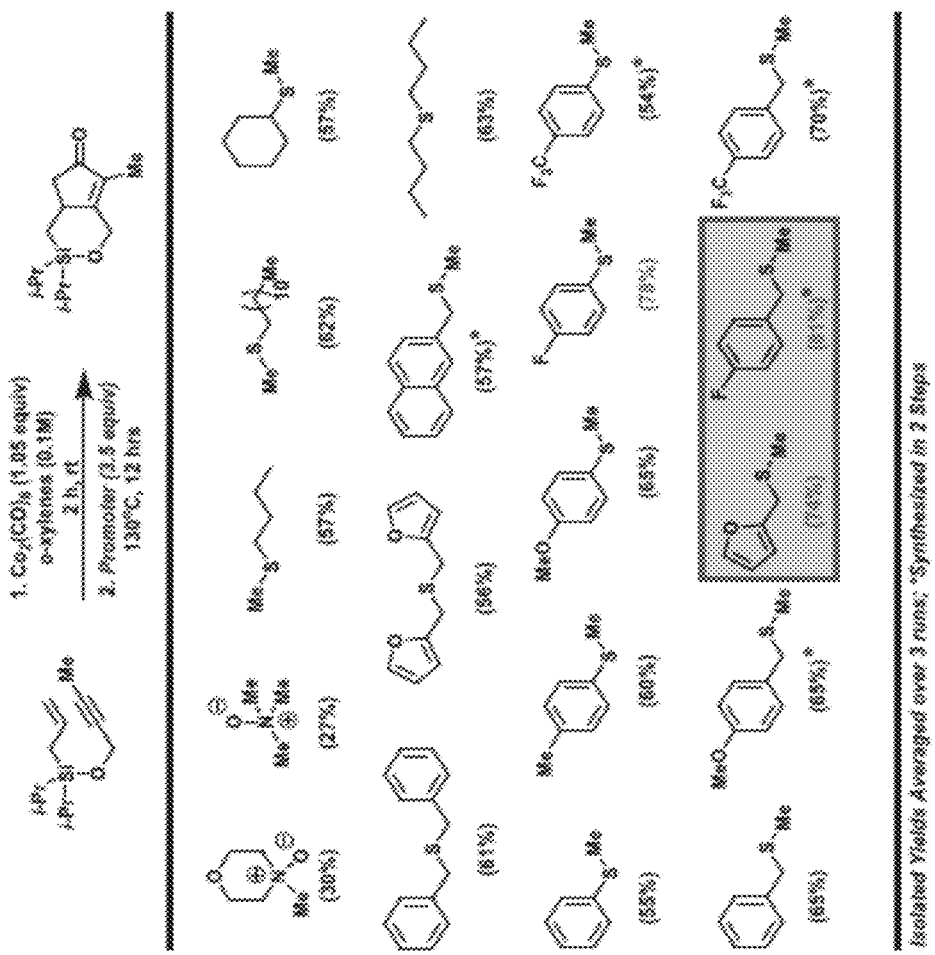
FIG. 12 depicts the discovery of a reusable promoter (4-FBnSMe).

FIG. 12 depicts the discovery of a reusable promoter (4-FBnSMe).

Figure 13:
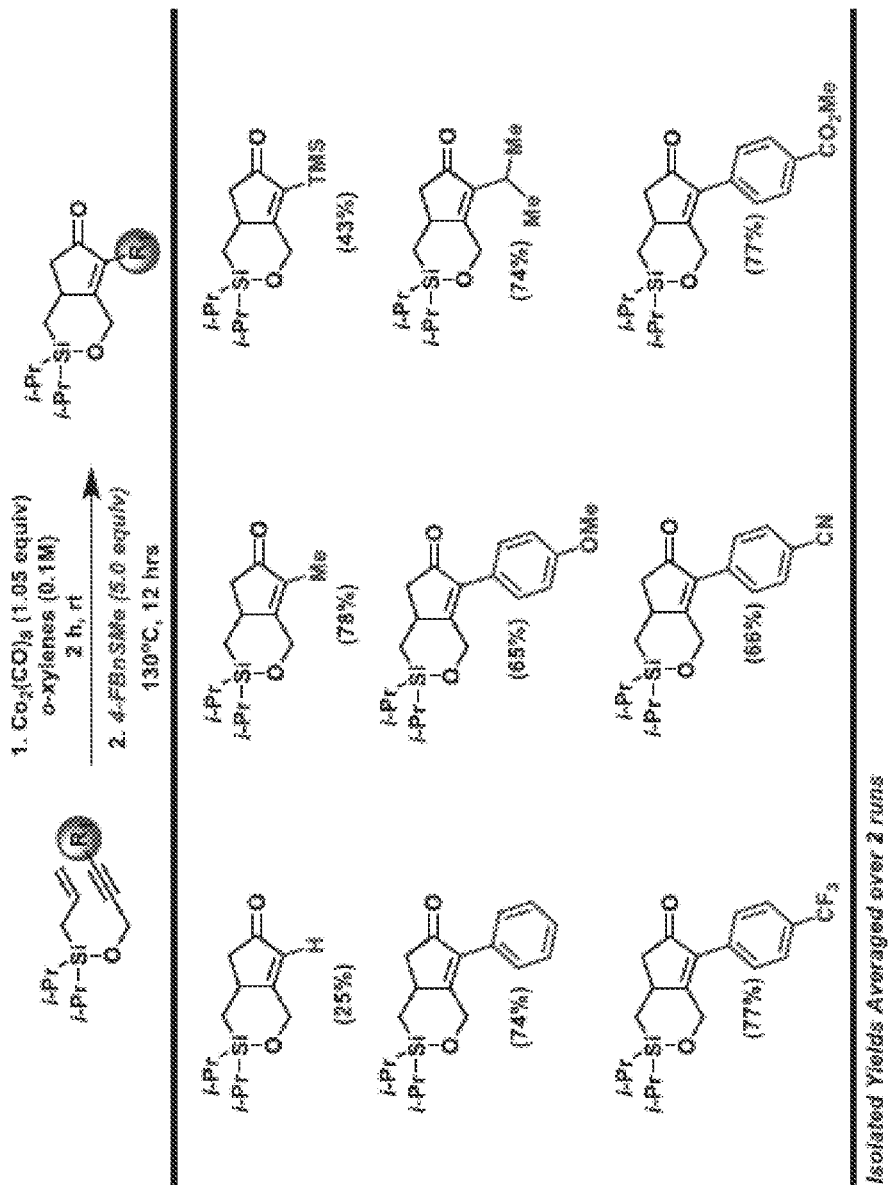
FIG. 13 depicts the substrate scope and limitation of primary enynes.

FIG. 13 depicts the substrate scope and limitation of primary enynes.

Figure 14:
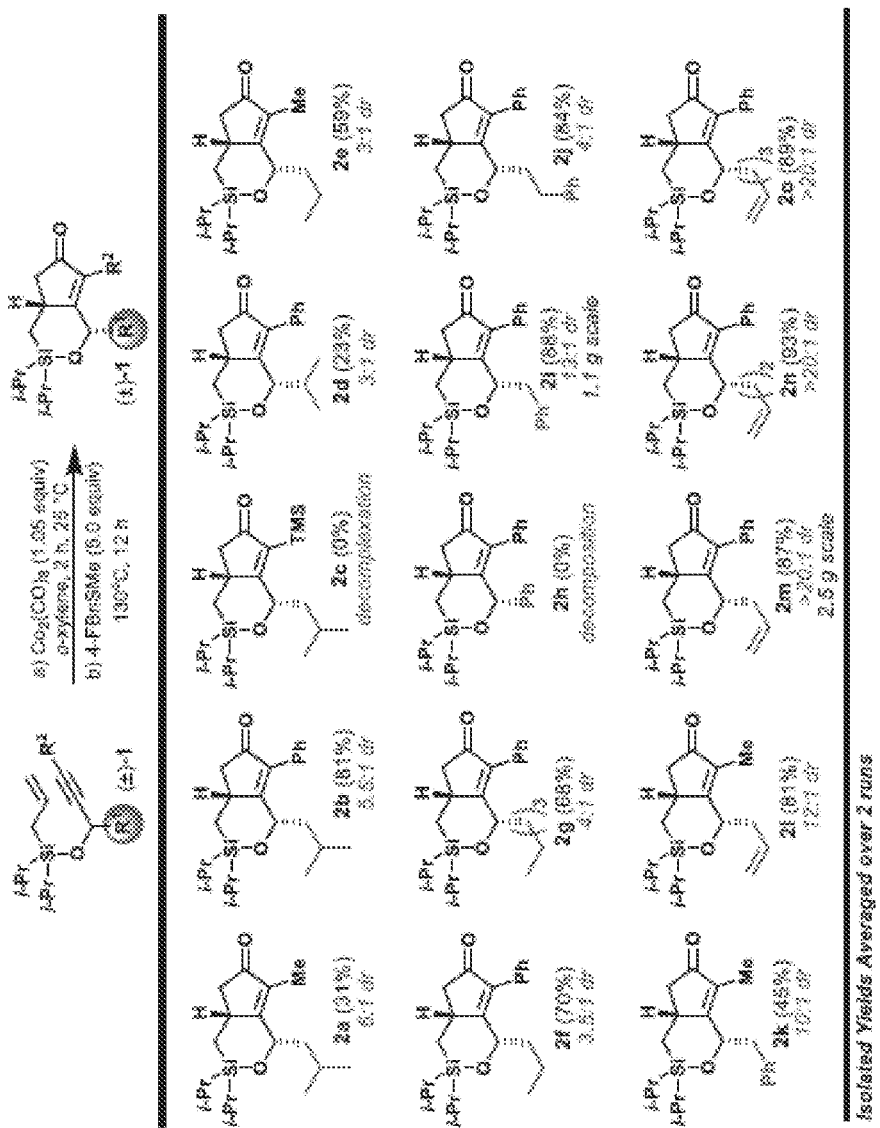
FIG. 14 depicts the scope and limitation of diastereoselective PKR.

FIG. 14 depicts the scope and limination of diastereoselective PKR.

Figure 15:
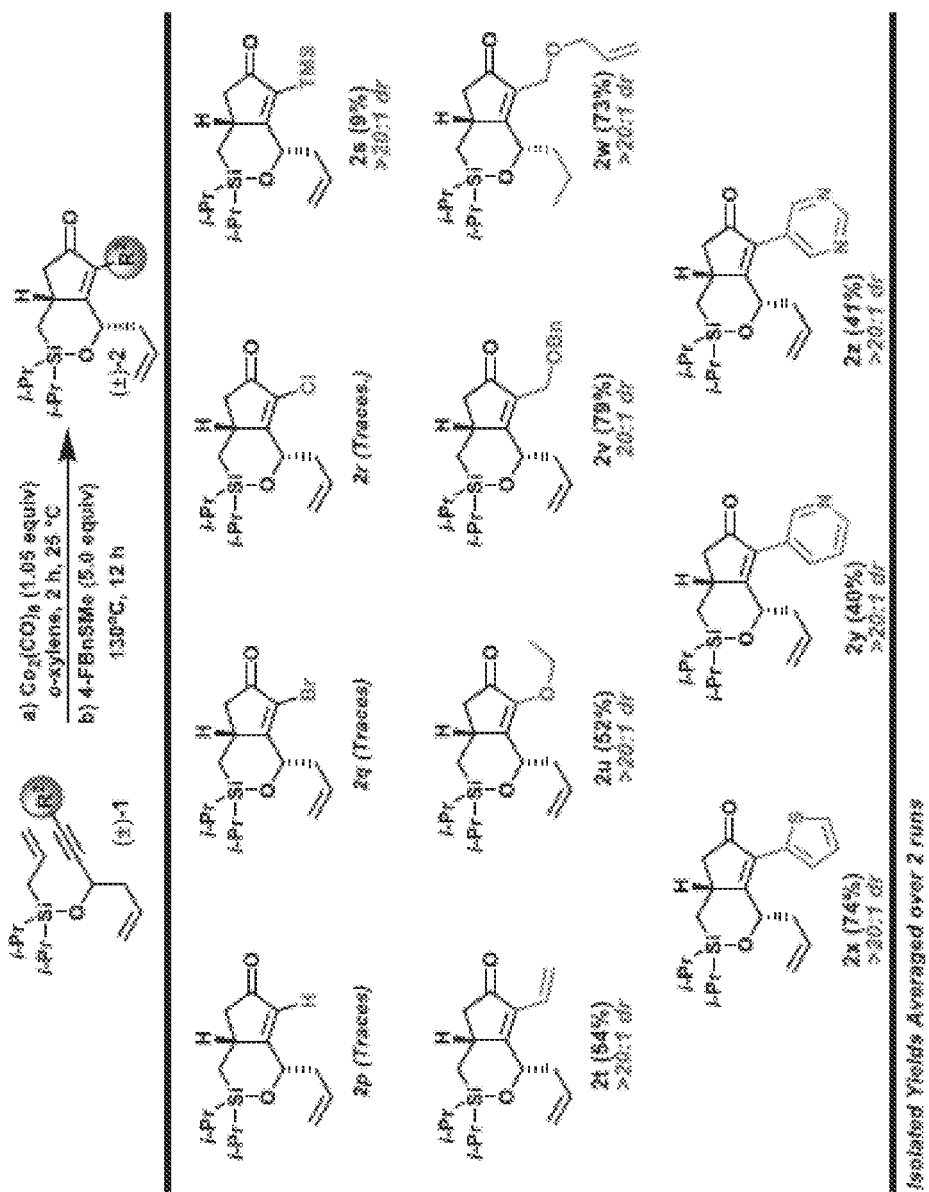
FIG. 15 depicts substrate scope of secondary terminal olefins.

FIG. 15 depicts substrate scope of secondary terminal olefins.

Figure 16:
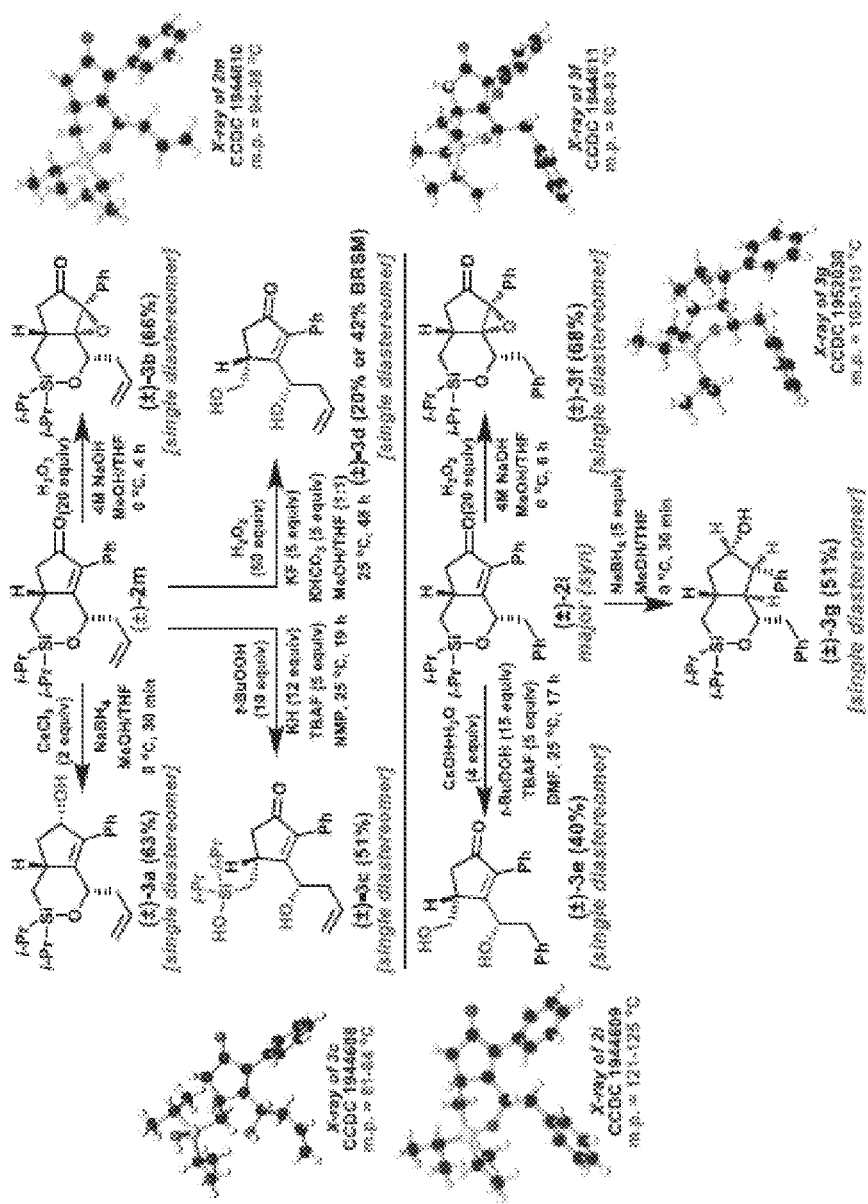
FIG. 16 depicts functionalization of cyclopentaoxasilinones.

FIG. 16 depicts functionalization of cyclopentaoxasilinones.

Figure 17:
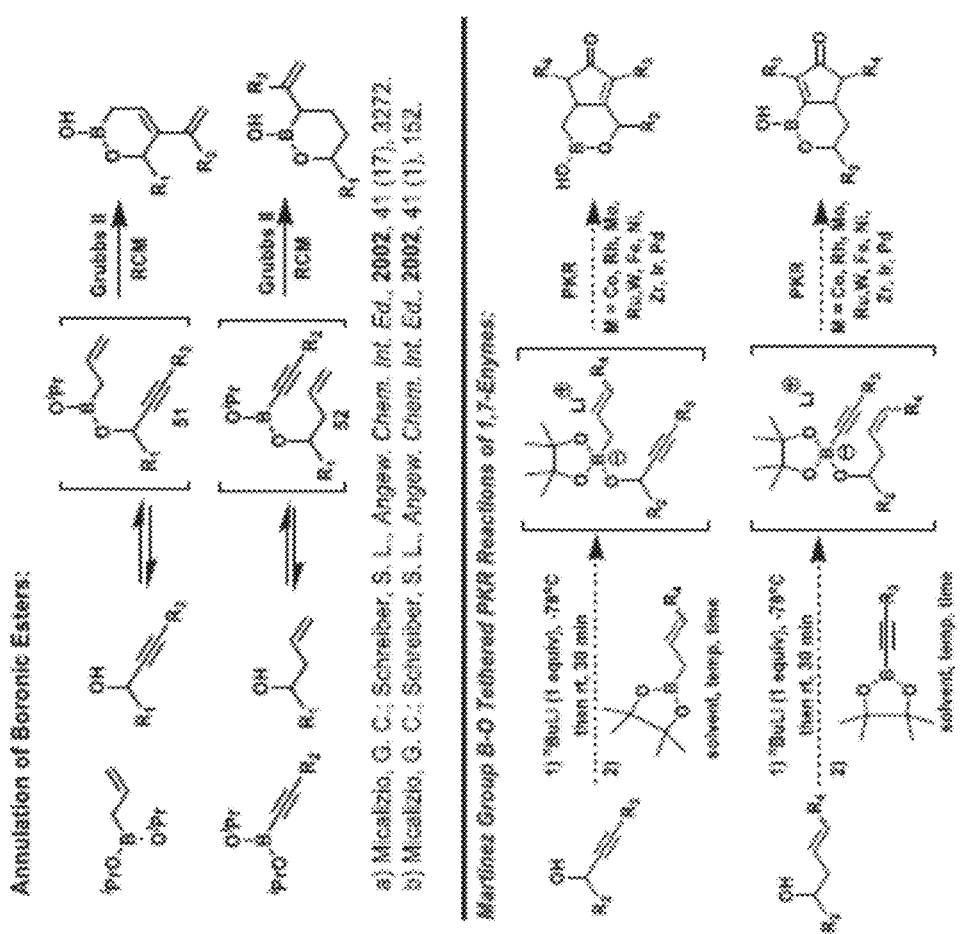
FIG. 17 depicts future work involving boron tethered PKRs.

FIG. 17 depicts future work involving boron tethered PKRs.

Figure 18:
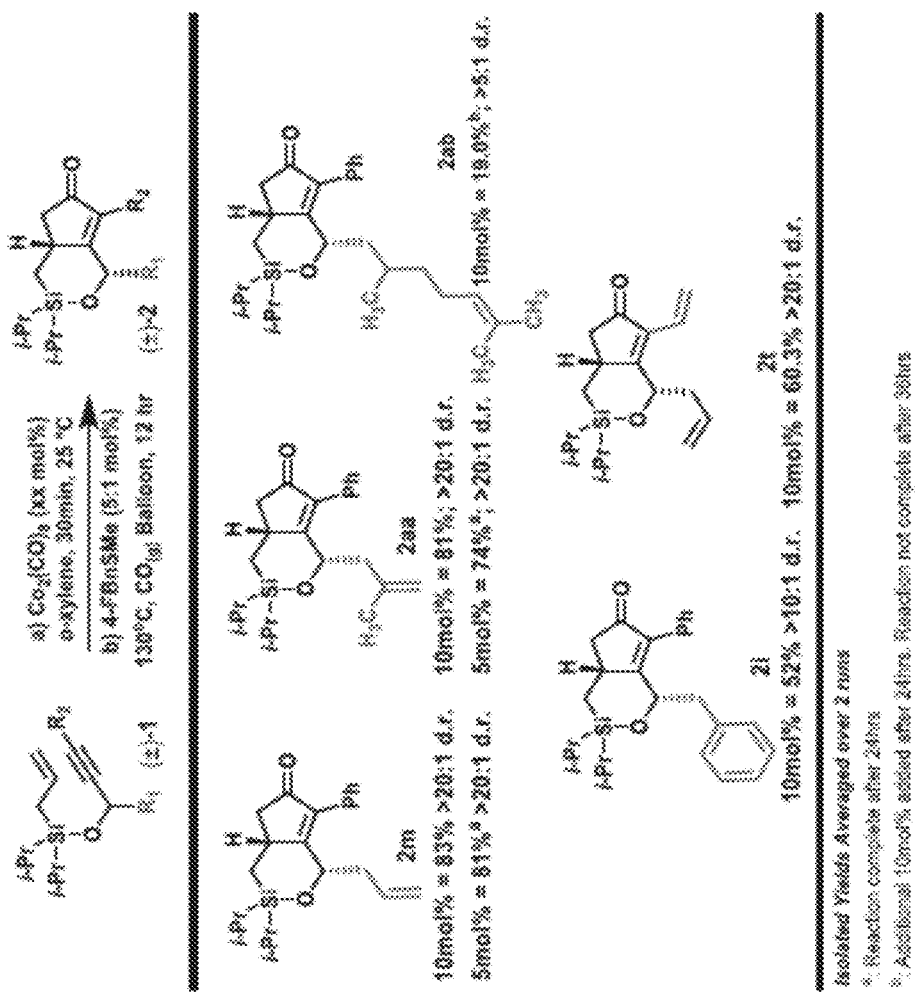
FIG. 18 depicts the preliminary optimization and scope of a catalytic PKR.

Example 3: Highly Functionalized Cyclopentenones Via Catalytic Diastereoselective Pauson-Khand Reaction of Siloxy-Tethered 1,7-Enynes FIG. 18 depicts the preliminary optimization and scope of a catalytic PKR.

Figure 19:
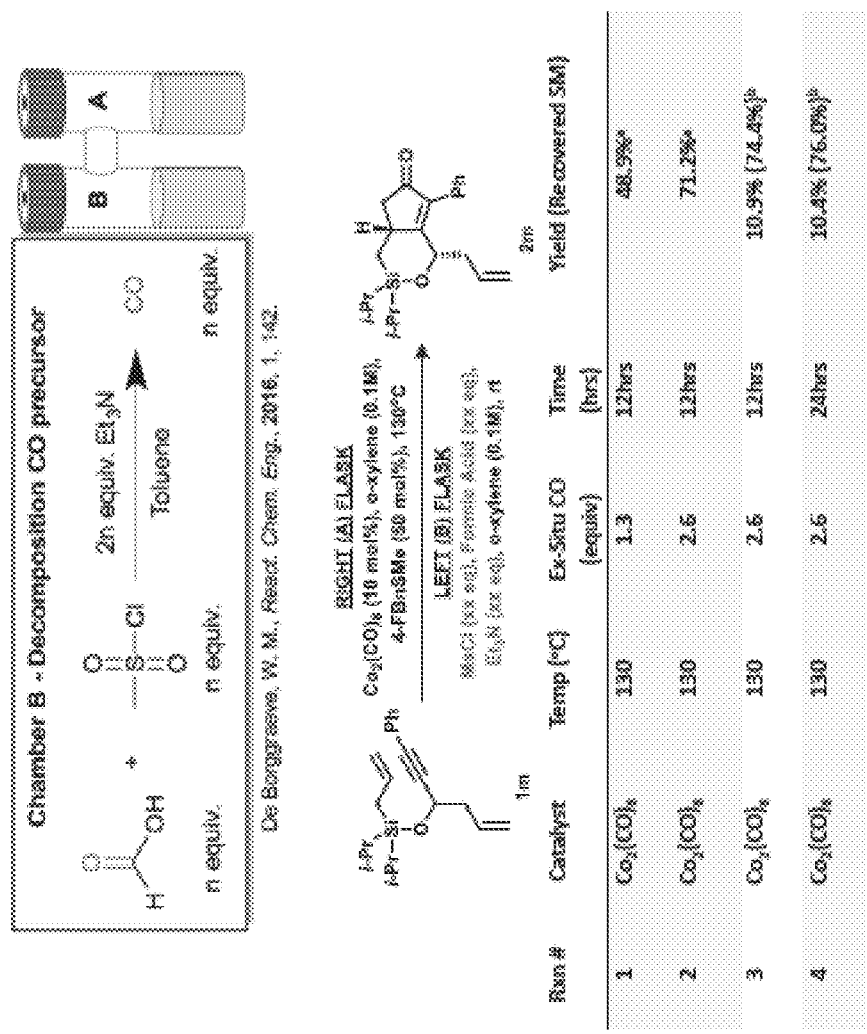
FIG. 19 depicts catalytic PKR by ex-situ generated carbon monoxide.

FIG. 19 depicts catalytic PKR by ex-situ generated carbon monoxide.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method of preparing a cyclopentaoxasilinone or cyclopentaoxaborininone, the method comprising contacting a siloxy-tethered 1,7-enyne or a boronic ester-tethered 1,7-enyne of Formula (Ia) or Formula (Ib) with a thioether promoter to form a cyclopentaoxasilinone or cyclopentaoxaborininone of Formula (II);

wherein Formula (Ia) is as follows:

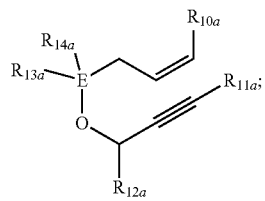

wherein
E is Si or B ;
$R_{10a}$ and $R_{11a}$ are each independently selected from the group consisting of hydrogen, deuterium, $C_1$-$C_6$ alkyl, $C_1$-$C_6$ alkenyl, halogen, $C_1$-$C_6$ alkoxy, $C_6$-$C_{12}$ aryloxy, $C_6$-$C_{12}$ aryl, $C^4$-$C_{10}$ heteroaryl, trialkylsilane, hydroxy, halogen, nitrile, $C(=O)OR_{15a}$, and combinations thereof;
$R_{12a}$ is selected from the group consisting of hydrogen, deuterium, $C_1$-$C_6$ alkyl, $C_1$-$C_6$ alkenyl, $C_6$-$C_{12}$ aryl, and combinations thereof;
$R_{13a}$ and $R_{14a}$ are each independently selected from the group consisting of hydrogen, deuterium, $C_1$-$C_6$ alkyl, $C_1$-$C_6$ alkenyl, $C_1$-$C_6$ alkoxy, hydroxy and combinations thereof, wherein $R_{13a}$ and $R_{14a}$ may optionally fuse or join to form a ring; and
$R_{15a}$ is selected from the group consisting of hydrogen, deuterium, and $C_1$-$C_6$ alkyl;
wherein Formula (Ib) is as follows:

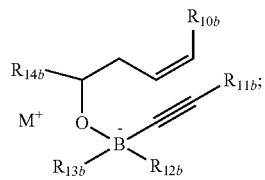

wherein
$M^+$ is an alkali metal cation;
$R_{10b}$ and $R_{11b}$ are each independently selected from the group consisting of hydrogen, deuterium, $C_1$-$C_6$ alkyl, $C_1$-$C_6$ alkenyl, halogen, $C_1$-$C_6$ alkoxy, $C_6$-$C_{12}$ aryloxy, $C_6$-$C_{12}$ aryl, $C_4$-$C_{10}$ heteroaryl, trialkylsilane, hydroxy, halogen, nitrile, $C(=O0)OR_{15b}$, and combinations thereof;
$R_{12b}$ and $R_{13b}$ are each independently selected from the group consisting of $C_1$-$C_6$ alkoxy, hydroxy, and combinations thereof, wherein $R_{12b}$ and $R_{13b}$ may optionally fuse or join to form a ring;
$R_{14b}$ is selected from the group consisting of hydrogen, deuterium, $C_1$-$C_6$ alkyl, $C_1$-$C_6$ alkenyl, $C_6$-$C_{12}$ aryl, and combinations thereof; and
$R_{15b}$ is selected from the group consisting of hydrogen, deuterium, and $C_1$-$C_6$ alkyl;
wherein Formula (II) is as follows:

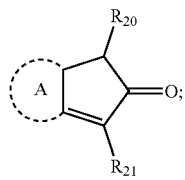

wherein

 is

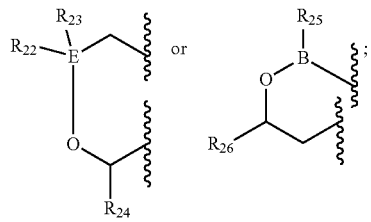

E is Si or B;

$R_{20}$ and $R_{21}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, nitrile, C(=O)O$R_{27}$, and combinations thereof;

$R_{22}$, $R_{23}$, and $R_{25}$ are each present or absent, valency permitting, and each $R_{22}$, $R_{23}$, and $R_{25}$ present is independently selected from the group consisting of hydrogen, deuterium, $C_1$-$C_6$ alkyl, $C_1$-$C_6$ alkenyl, $C_1$-$C_6$ alkoxy, hydroxy, and combinations thereof;

$R_{24}$ and $R_{26}$ are each independently selected from the group consisting of hydrogen, deuterium, $C_1$-$C_6$ alkyl, $C_1$-$C_6$ alkenyl, $C_6$-$C_{12}$ aryl, and combinations thereof; and $R_{27}$ is selected from the group consisting of hydrogen, deuterium, and $C_1$-$C_6$ alkyl; and wherein when E in Formula (Ia) is Si the thioether promoter is 4-FBnSMe.

2. The method of claim 1, wherein the thioether promoter is isolated and reused.

3. The method of claim 1, wherein the thioether promoter is 4-FBnSMe.

4. The method of claim 1, wherein a first diastereomer of the cyclopentaoxasilinone or cyclopentaoxaborininone is formed with higher selectivity than a second diastereomer of the cyclopentaoxasilinone or cyclopentaoxaborininone.

5. The method of claim 1, wherein the step of contacting a siloxy-tethered 1,7-enyne or a boronic ester-tethered 1,7-enyne with a thioether promoter is by the step of contacting the siloxy-tethered 1,7-enyne or boronic ester-tethered 1,7-enyne with a transition metal carbonyl.

6. The method of claim 5, wherein the transition metal carbonyl is dicobalt octacarbonyl.

7. The method of claim 1, wherein the cyclopentaoxasilinone or cyclopentaoxaborininone of Formula (II) is a cyclopentaoxasilinone or cyclopentaoxaborininone of Formula (IIa)

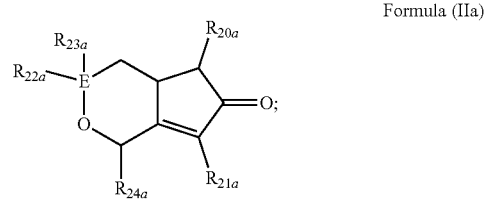

Formula (IIa)

wherein

E is Si or B;

$R_{20a}$ is hydrogen or deuterium;

$R_{21a}$ selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, C(=O)O$R_{25a}$, and combinations thereof, $R_{22a}$ and $R_{23a}$ are each present or absent, valency permitting, and each $R_{22a}$ and $R_{23a}$ present is independently selected from the group consisting of hydrogen, deuterium, $C_1$-$C_6$ alkyl, $C_1$-$C_6$ alkenyl, $C_1$-$C_6$ alkoxy, hydroxy, and combinations thereof, $R_{24a}$ is selected from the group consisting of hydrogen, deuterium, $C_1$-$C_6$ alkyl, $C_1$-$C_6$ alkenyl, $C_6$-$C_{12}$ aryl, and combinations thereof, and $R_{25a}$ is selected from the group consisting of hydrogen, deuterium, and $C_1$-$C_6$ alkyl.

8. The method of claim 7, wherein the cyclopentaoxasilinone or cyclopentaoxaborininone of Formula (IIa) comprises a greater amount of one diastereomer of Formula (IIa) over other diastereomers of Formula (IIa).

9. The method of claim 1, wherein the cyclopentaoxaborininone of Formula (II) is a cyclopentaoxaborininone of Formula (IIb)

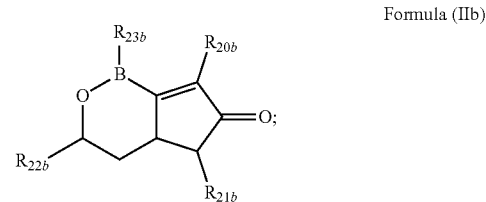

Formula (IIb)

wherein $R_{20b}$ and $R_{21b}$ are each independently selected from the group consisting of hydrogen, deuterium, $C_1$-$C_6$ alkyl, $C_1$-$C_6$ alkenyl, hydroxy, halogen, $C_1$-$C_6$ alkoxy, nitrile, $C_6$-$C_{12}$ aryloxy, $C_6$-$C_{12}$ aryl, $C_4$-$C_{10}$ heteroaryl, trialkylsilane, hydroxy, halogen, nitrile, C(=O)O$R_{24b}$, and combinations thereof;

$R_{22b}$ is selected from the group consisting of hydrogen, deuterium, $C_1$-$C_6$ alkyl, $C_1$-$C_6$ alkenyl, $C_6$-$C_{12}$ aryl, and combinations thereof;

$R_{23b}$ is selected from the group consisting of hydrogen, deuterium, $C_1$-$C_6$ alkyl, $C_1$-$C_6$ alkenyl, $C_1$-$C_6$ alkoxy, hydroxy, and combinations thereof, and $R_{24b}$ is selected from the group consisting of hydrogen, deuterium, and $C_1$-$C_6$ alkyl.

10. The method of claim 9, wherein the cyclopentaoxaborininone of Formula (IIb) comprises a greater amount of one diastereomer of Formula (IIb) over other diastereomers of Formula (IIb).

11. The method of claim 7, wherein the cyclopentaoxasilinone is selected from the group consisting of

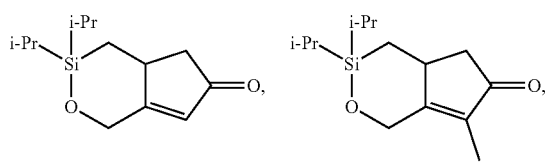

-continued
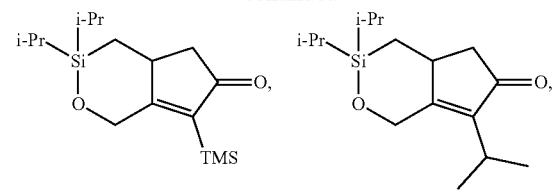
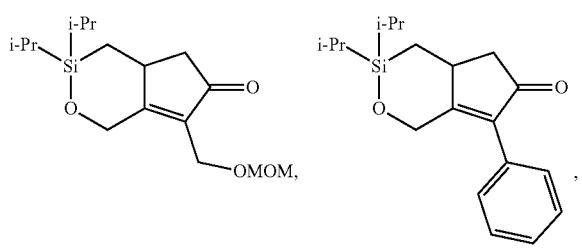
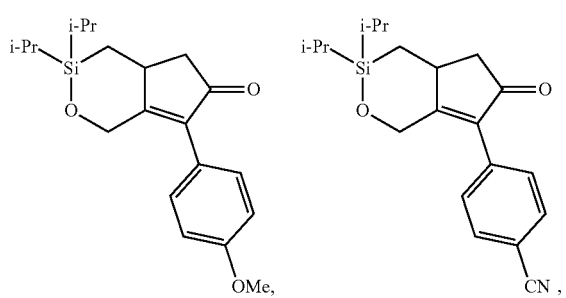
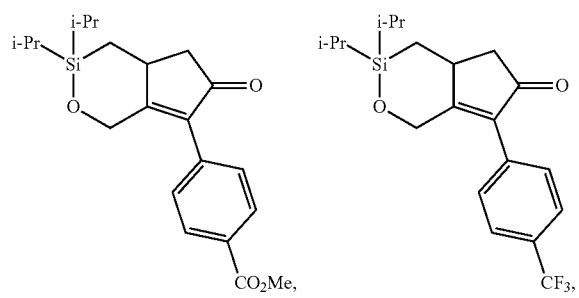
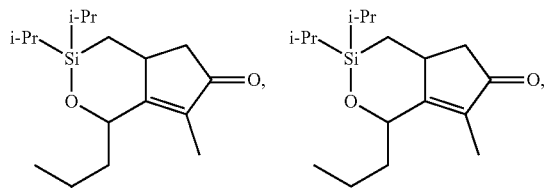
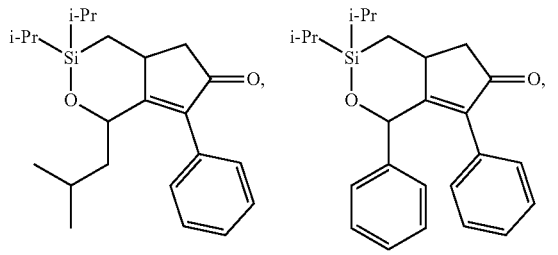
-continued
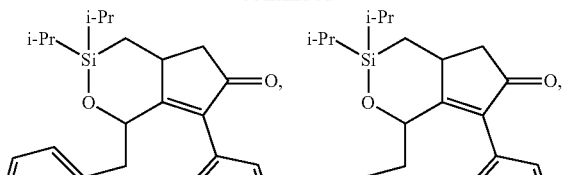
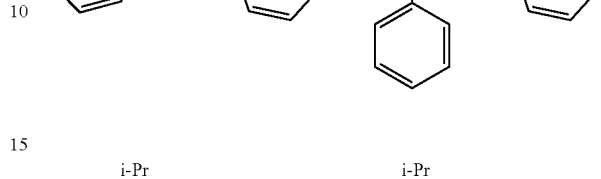
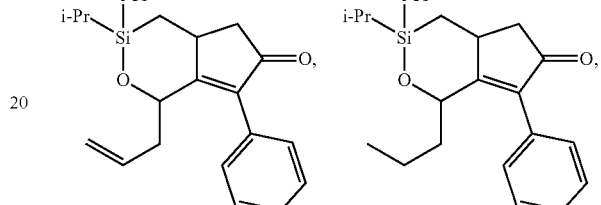
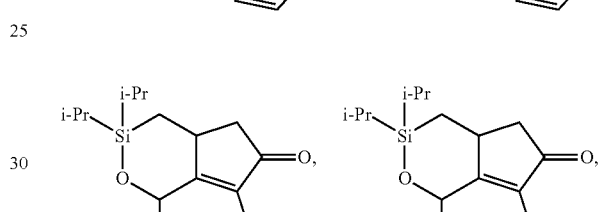
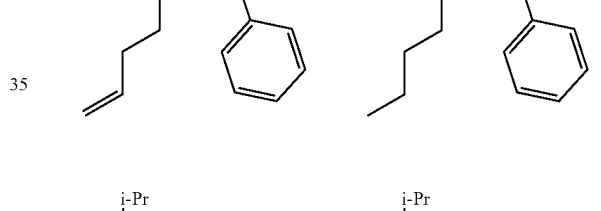
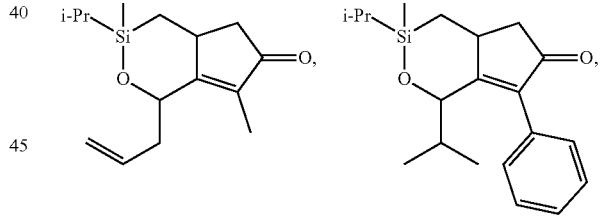
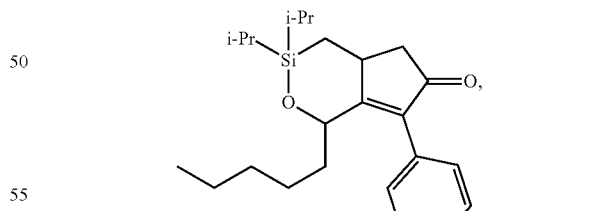
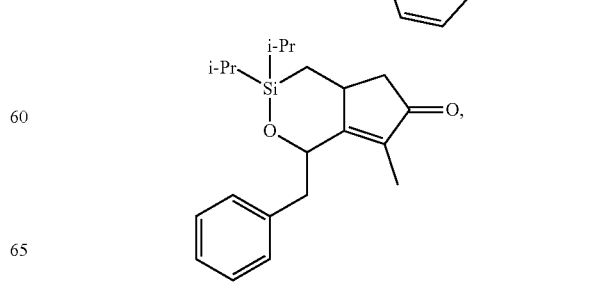

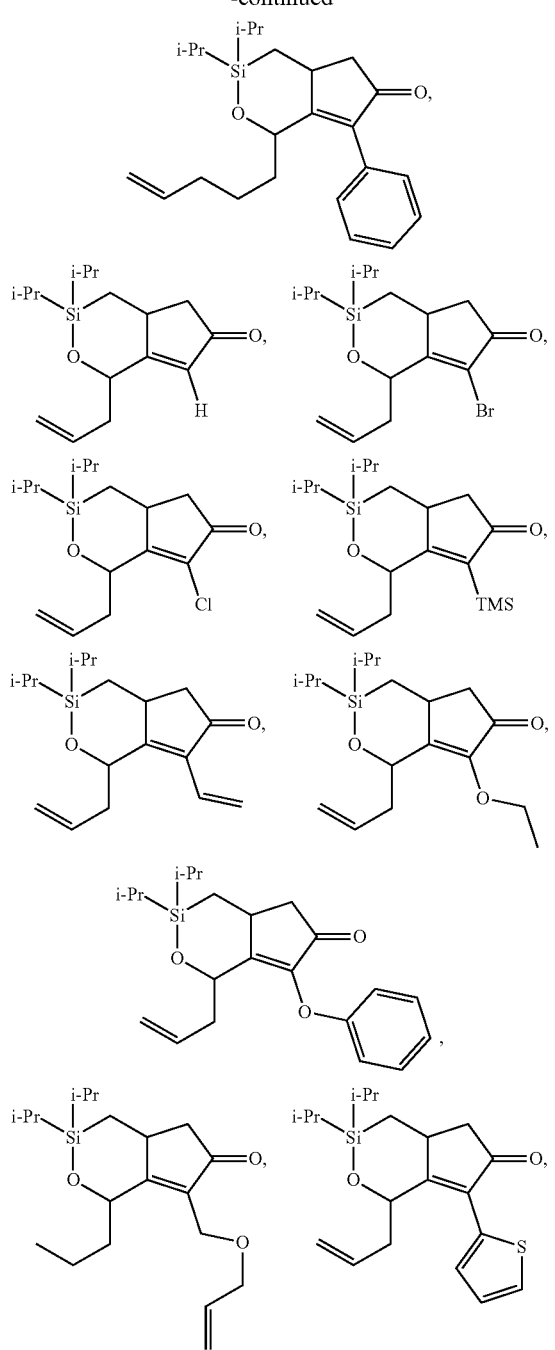

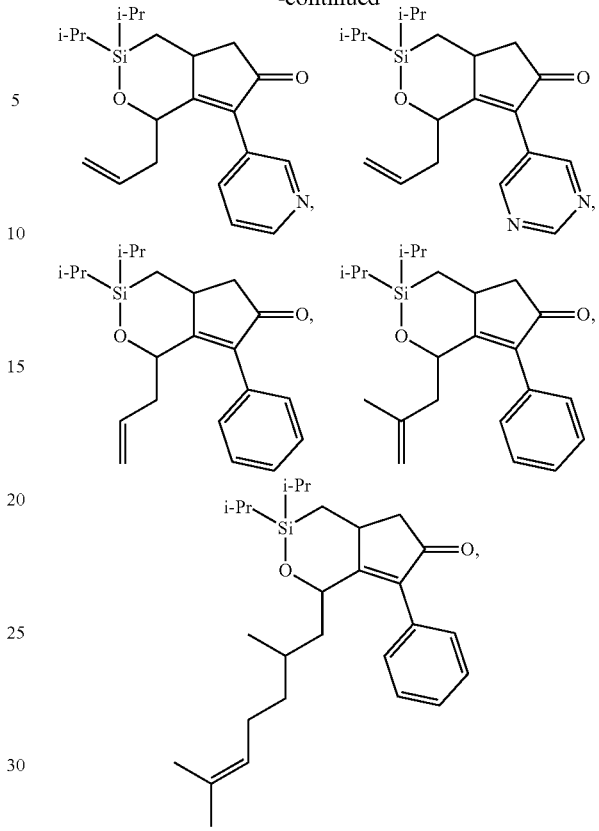

and combinations thereof,
wherein i-Pr is isopropyl, TMS is trimethylsilyl, MOM is methoxymethyl acetyl and Me is methyl.

12. The method of claim 1, wherein the method further comprises the step of reacting the cyclopentaoxasilinone or cyclopentaoxaborininone with one or more additional reagents which oxidize, epoxidize, or reduce the cyclopentaoxasilinone or cyclopentaoxaborininone.

13. The method of claim 12, wherein the cyclopentaoxasilinone or cyclopentaoxaborininone is oxidized to form a cyclopentenone.

14. The method of claim 1, wherein the step contacting a siloxy-tethered 1,7-enyne with a thioether promoter further comprises the step of contacting the siloxy-tethered 1,7-enyne with carbon monoxide.

15. The method of claim 14, wherein the step of contacting a siloxy-tethered 1,7-enyne with a thioether promoter is preceeded by the step of contacting the siloxy-tethered 1,7-enyne with dicobalt octacarbonyl.

* * * * *